US012365094B2

(12) United States Patent
McCall et al.

(10) Patent No.: US 12,365,094 B2
(45) Date of Patent: *Jul. 22, 2025

(54) HEAD AND NECK ASSEMBLY FOR A HUMANOID ROBOT

(71) Applicant: FIGURE AI INC., Sunnyvale, CA (US)

(72) Inventors: David McCall, Sunnyvale, CA (US); Sydney Hardy, Sunnyvale, CA (US); Katarina Rodak, Sunnyvale, CA (US)

(73) Assignee: FIGURE AI INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/919,263

(22) Filed: Oct. 17, 2024

(65) Prior Publication Data
US 2025/0091222 A1    Mar. 20, 2025

Related U.S. Application Data

(63) Continuation-in-part of application No. 18/914,800, filed on Oct. 14, 2024, which is a continuation-in-part
(Continued)

(51) Int. Cl.
B25J 19/00    (2006.01)
B25J 9/00    (2006.01)
B25J 11/00    (2006.01)

(52) U.S. Cl.
CPC ......... B25J 11/0015 (2013.01); B25J 9/0009 (2013.01); B25J 19/00 (2013.01)

(58) Field of Classification Search
CPC ...... B25J 11/0015; B25J 9/0009; B25J 19/02; B25J 19/04; B25J 19/023; B25J 13/00;
(Continued)

(56) References Cited

U.S. PATENT DOCUMENTS 6,732,015 B2 * 5/2004 Maeda ................. B25J 19/0091
446/457
6,980,889 B2 * 12/2005 Ito ........................... G06N 3/08
901/1

(Continued)

FOREIGN PATENT DOCUMENTS

CN    102357889    2/2012
CN    212287717    1/2021
(Continued)

OTHER PUBLICATIONS

Pateromichelakis et al., Head-eyes system and gaze analysis of the humanoid robot Romeo, 2014, IEEE, p. 1374-1379 (Year: 2014).*
(Continued)

Primary Examiner — Mcdieunel Marc

(57) ABSTRACT

A humanoid robot includes an upper region includes a head and neck assembly having a neck portion and a head portion coupled to the neck portion. Said head portion includes: a frontal shell having a rear edge, a rear shell having a frontal edge, and an illumination assembly. The illumination assembly is configured to illuminate a region that: (i) extends between a rear edge of the frontal shell and an extent of the frontal edge of the rear shell, (ii) is positioned adjacent to the extent of the rear edge of the frontal shell, and (iii) is positioned adjacent to the extent of the frontal edge of the rear shell.

23 Claims, 56 Drawing Sheets

Related U.S. Application Data of application No. 18/904,332, filed on Oct. 2, 2024, and a continuation-in-part of application No. 29/935,680, filed on Apr. 3, 2024, which is a continuation-in-part of application No. 29/928,748, filed on Feb. 15, 2024, which is a continuation-in-part of application No. 29/889,764, filed on Apr. 17, 2023.

(60) Provisional application No. 63/707,897, filed on Oct. 16, 2024, provisional application No. 63/708,003, filed on Oct. 16, 2024, provisional application No. 63/707,949, filed on Oct. 16, 2024, provisional application No. 63/707,547, filed on Oct. 15, 2024, provisional application No. 63/626,037, filed on May 28, 2024, provisional application No. 63/634,697, filed on Apr. 16, 2024, provisional application No. 63/573,528, filed on Apr. 3, 2024, provisional application No. 63/573,226, filed on Apr. 2, 2024, provisional application No. 63/566,595, filed on Mar. 18, 2024, provisional application No. 63/564,741, filed on Mar. 13, 2024, provisional application No. 63/626,034, filed on Mar. 13, 2024, provisional application No. 63/561,316, filed on Mar. 5, 2024, provisional application No. 63/626,035, filed on Feb. 27, 2024, provisional application No. 63/626,028, filed on Feb. 27, 2024, provisional application No. 63/626,030, filed on Feb. 21, 2024.

(58) Field of Classification Search
CPC ............ B25J 13/06; G02B 2027/0178; G02B 2027/0138; G02B 2219/39001; G02B 2219/32128; G05B 19/41865
See application file for complete search history.

(56) References Cited

U.S. PATENT DOCUMENTS

| | | | |
|---|---|---|---|
| 7,024,276 B2* | 4/2006 | Ito | G06N 3/008 318/568.15 |
| 7,072,741 B2* | 7/2006 | Nagashima | G06N 3/008 901/33 |
| 7,099,747 B2* | 8/2006 | Mikami | G05D 1/0891 180/8.1 |
| 7,308,336 B2* | 12/2007 | Takenaka | B62D 57/02 901/1 |
| 7,319,918 B2* | 1/2008 | Takenaka | B62D 57/032 901/1 |
| 7,379,789 B2* | 5/2008 | Takenaka | B62D 57/032 901/1 |
| 7,386,364 B2* | 6/2008 | Mikami | B62D 57/02 318/568.22 |
| 7,664,569 B2* | 2/2010 | Shimizu | B62D 57/032 901/1 |
| 7,864,159 B2 | 1/2011 | Sweetser | |
| 8,660,695 B2 | 2/2014 | De La Rosa Tames | |
| 8,770,749 B2 | 7/2014 | Mccabe | |
| 9,134,547 B2 | 9/2015 | Mccabe | |
| 9,205,556 B1 | 12/2015 | Magnusson | |
| 9,205,560 B1 | 12/2015 | Edsinger | |
| 9,346,165 B1 | 5/2016 | Metzger | |
| 9,383,594 B2 | 7/2016 | Mccabe | |
| 9,494,415 B2 | 11/2016 | Sweetser | |
| 9,574,646 B1 | 2/2017 | Edsinger | |
| 9,575,335 B1 | 2/2017 | Mccabe | |
| 9,592,603 B2 | 3/2017 | Hardouin | |
| 9,789,607 B1 | 10/2017 | Whitman | |
| 9,789,612 B2 | 10/2017 | Hoffman | |
| 9,796,078 B2 | 10/2017 | Angle | |
| 9,821,466 B2 | 11/2017 | Bingham | |
| 9,868,210 B1 | 1/2018 | Whitman | |
| 9,910,297 B1 | 3/2018 | Mccabe | |
| 9,992,474 B2 | 6/2018 | Grunnet-Jepsen | |
| 10,007,994 B2 | 6/2018 | Grunnet-Jepsen | |
| 10,018,256 B1 | 7/2018 | Magnusson | |
| 10,189,158 B2 | 1/2019 | Edsinger | |
| 10,203,209 B2 | 2/2019 | Roumeliotis | |
| 10,310,362 B2 | 6/2019 | Grunnet-Jepsen | |
| 10,349,245 B2 | 7/2019 | Tokuchi | |
| 10,537,998 B2 | 1/2020 | Salisbury | |
| 10,656,511 B2 | 5/2020 | Grunnet-Jepsen | |
| 10,780,578 B2 | 9/2020 | Blankespoor | |
| 10,890,921 B2 | 1/2021 | Gillett | |
| 10,921,558 B2 | 2/2021 | Yao | |
| 10,924,638 B2 | 2/2021 | Swaminathan | |
| 10,946,528 B2 | 3/2021 | Gupta | |
| 10,960,539 B1 | 3/2021 | Kalakrishnan | |
| 11,180,205 B2 | 11/2021 | Amino | |
| 11,188,821 B1 | 11/2021 | Kalakrishnan | |
| 11,333,954 B2 | 5/2022 | Bull | |
| 11,347,030 B2 | 5/2022 | Yao | |
| 11,402,726 B2 | 8/2022 | Bull | |
| 11,416,003 B2 | 8/2022 | Whitman | |
| 11,435,745 B2 | 9/2022 | Lee | |
| 11,498,223 B2 | 11/2022 | Williams | |
| 11,546,504 B2 | 1/2023 | Kim | |
| 11,554,484 B2 | 1/2023 | Jung | |
| 11,599,009 B2 | 3/2023 | Bull | |
| 11,600,010 B2 | 3/2023 | Doutre | |
| 11,602,853 B2 | 3/2023 | Stoianovici | |
| 11,686,884 B2 | 6/2023 | Shinohara | |
| 11,707,852 B1 | 7/2023 | Hurst | |
| 11,736,677 B2 | 8/2023 | Grunnet-Jepsen | |
| 11,807,067 B2 | 11/2023 | Mancini | |
| 11,833,680 B2 | 12/2023 | Deits | |
| 11,850,738 B2 | 12/2023 | Chernyak | |
| 11,851,120 B2 | 12/2023 | Fay | |
| 11,999,423 B2 | 6/2024 | Whitman | |
| 12,036,670 B2 | 7/2024 | Geating | |
| 12,054,208 B2 | 8/2024 | Swilling | |
| 12,070,863 B2 | 8/2024 | Whitman | |
| 12,077,229 B2 | 9/2024 | Whitman | |
| 12,097,626 B2 | 9/2024 | Ikeda | |
| 12,122,044 B2 | 10/2024 | Webb | |
| 12,134,181 B2 | 11/2024 | Klingensmith | |
| 12,172,537 B2 | 12/2024 | Gonano et al. | |
| 12,214,497 B2 | 2/2025 | Whitman | |
| 12,235,652 B2 | 2/2025 | Whitman | |
| 12,240,117 B2 | 3/2025 | Chebotar | |
| 12,251,831 B2 | 3/2025 | Murphy | |
| 2004/0103740 A1 | 6/2004 | Townsend | |
| 2010/0280662 A1 | 11/2010 | Abdallah | |
| 2014/0265401 A1 | 9/2014 | Allen Demers | |
| 2016/0052574 A1 | 2/2016 | Khripin | |
| 2017/0075143 A1 | 3/2017 | Saylor | |
| 2017/0106738 A1 | 4/2017 | Gillett | |
| 2017/0299898 A1 | 10/2017 | Gallina | |
| 2019/0025611 A1 | 1/2019 | Saylor | |
| 2019/0105783 A1 | 4/2019 | Al Moubayed | |
| 2019/0278079 A1 | 9/2019 | Mccabe | |
| 2019/0329413 A1 | 10/2019 | Johnson | |
| 2019/0337166 A1 | 11/2019 | Keeney-Ritchie | |
| 2020/0009739 A1 | 1/2020 | Moon | |
| 2020/0096792 A1 | 3/2020 | Mccabe et al. | |
| 2020/0330246 A1 | 10/2020 | Tognetti | |
| 2020/0409183 A1 | 12/2020 | Saylor et al. | |
| 2021/0387346 A1 | 12/2021 | Gillett | |
| 2022/0388174 A1 | 12/2022 | Stathis | |
| 2022/0390952 A1 | 12/2022 | Yu | |
| 2022/0395974 A1 | 12/2022 | Balasubramanian | |
| 2022/0410380 A1 | 12/2022 | Lu | |
| 2023/0143315 A1 | 5/2023 | Whitman | |
| 2023/0173683 A1 | 6/2023 | Gomez | |
| 2023/0182296 A1 | 6/2023 | Sermanet | |
| 2023/0347514 A1 | 11/2023 | Xiao | |
| 2024/0003380 A1 | 1/2024 | Vyas | |
| 2024/0181637 A1 | 6/2024 | Gillett | |
| 2024/0217104 A1 | 7/2024 | Neville | |
| 2024/0228191 A1 | 7/2024 | Kumar | |

(56) References Cited

U.S. PATENT DOCUMENTS

2024/0300109 A1    9/2024   Shaw
2025/0147517 A1    5/2025   Swilling

FOREIGN PATENT DOCUMENTS

| | | |
|---|---|---|
| CN | 112959343 | 6/2021 |
| CN | 115503013 | 12/2022 |
| CN | 117047810 | 11/2023 |
| GB | 2472046 | 4/2013 |
| GB | 2496335 | 5/2013 |
| KR | 20180107353 | 10/2018 |
| WO | 2009030922 | 3/2009 |
| WO | 2019234706 | 12/2019 |
| WO | 2024058844 | 3/2024 |
| WO | 2024085904 | 4/2024 |
| WO | 2024112350 | 5/2024 |
| WO | 2024112351 | 5/2024 |
| WO | 2024123766 | 6/2024 |
| WO | 2024163992 | 8/2024 |
| WO | 2025019583 | 1/2025 |
| WO | 2025042802 | 2/2025 |
| WO | 2025072321 | 4/2025 |

OTHER PUBLICATIONS

Jeung et al., Realization of human neck motion with novel robotic mechanism, 2016, IEEE, p. 482-486 (Year: 2016).*
Barker et al., Natural head movement for HRI with a muscular-skeletal head and neck robot, 2017, IEEE, p. 587-592 (Year: 2017).*
Gao et al., Development of a low motion-noise humanoid neck: Statics analysis and experimental validation, 2010, IEEE, p. 1203-1208 (Year: 2010).*
Park et al., Mechanical design of humanoid robot platform KHR-3 (KAIST Humanoid Robot 3: HUBO), 2005, IEEE, pgl., 321-3226 (Year: 2005).*
Nakada et al., Deep Learning of Neuromuscular and Visuomotor Control of a Biomimetic Simulated Humanoid, 2020, IEEE, p. 3952-3959 (Year: 2020).*
Lim et al., Basic emotional walking using a biped humanoid robot, 1999, IEEE, p. 954-959 (Year: 1999).*
Albers et al., Upper Body of a new Humanoid Robot—the Design of ARMAR III, 2006, IEEE, p. 308-309 (Year: 2006).*
Available online at https://youtu.be/YsdnsNjvwKo?si=bu2dXk8mQaL86C2M, at least as early as Aug. 23, 2023.
Available online at https://www.youtube.com/watch?v=q8ldbodRG14, at least as early as May 22, 2019.
Available online at https://youtu.be/GtPs_ygfaEA?si=7lv6MEFvFoaacKfa, at least as early as Aug. 15, 2023.
Available online at https://www.youtube.com/watch?v=G6JE7mNYz2A, at least as early as Oct. 17, 2024.
Available online at https://www.youtube.com/watch?v=FuNFr7V7KFQ, at least as early as Aug. 19, 2024.
Available online at https://www.youtube.com/watch?v=GzX1qOIO1bE, at least as early as May 13, 2024.
Available online at https://youtu.be/_MBd_XfXy9M?si=PbEHUJpRUFqaxS3J, at least as early as Jun. 26, 2023.
Available online at https://youtu.be/SHPxcRBIXN0?si=VbJqbK7jzUqtZGmn, at least as early as Sep. 26, 2023.
Available online at https://youtu.be/BvFxD-8AhJA?si=Vx1F4a76tbQDUX48, at least as early as Nov. 16, 2023.
Available online at https://www.youtube.com/watch?v=jWTWWuzB6Cg, at least as early as Aug. 27, 2024.
Available online at https://www.youtube.com/watch?v=B-ebMigAHzQ, at least as early as Sep. 30, 2024.
Available online at https://youtu.be/XiQkeWOFwmk?si=1qOPC8gXgmmGvXRT, at least as early as May 16, 2023.
Available online at https://youtu.be/cpraXaw7dyc?si=JvPaT6eMA18psrmU, at least as early as Dec. 13, 2023.
Available online at https://www.youtube.com/watch?v=DrNcXgoFv20, at least as early as Oct. 18, 2024.
Available online at https://youtu.be/BNSZ8Fwcd20?si=_YnVgjYblVuhASk1, at least as early as Oct. 27, 2023.
Available online at https://youtu.be/SS3Ga2HQQ0s?si=Dwr3sJuCsOeUoSLj, at least as early as Nov. 20, 2023.
Available online at https://www.youtube.com/watch?v=iWC8rSjDywU, at least as early as Oct. 18, 2024.
Available online at https://youtu.be/sih1DeJ4Hmk?si=fJsKpvRFPzFejmS6, at least as early as Dec. 27, 2023.
Available online at https://www.youtube.com/watch?v=zkBnFPBV3f0, at least as early as Jul. 11, 2013.
Available online at https://www.youtube.com/watch?v=oXBYZxa25vc&t=1s, at least as early as Apr. 3, 2013.
Available online at https://www.youtube.com/watch?v=LBeml9AmTT4, at least as early as Apr. 7, 2015.
Available online at https://www.youtube.com/watch?v=IE-YBaYjbqY, at least as early as Dec. 10, 2013.
Available online at https://www.youtube.com/watch?v=y-j4dixQQml&t=222s, at least as early as May 22, 2012.
Available online at https://www.youtube.com/watch?v=Bmglbk_Op64&t=1s, at least as early as Nov. 10, 2011.
Available online at https://www.youtube.com/watch?v=20GHG-R9eFl, at least as early as Mar. 6, 2023.
Available online at https://www.youtube.com/watch?v=bUrLuUxv9gE, at least as early as Aug. 30, 2024.
Available online at https://www.youtube.com/watch?v=-9EM5_VFIt8, at least as early as Apr. 16, 2024.
Available online at https://www.youtube.com/watch?v=29ECwExc-_M&t=2s, at least as early as Apr. 17, 2024.
Available online at https://www.youtube.com/watch?v=67CUudkjEG4, at least as early as Oct. 26, 2009.
Available online at https://www.youtube.com/watch?v=yBmatGQ0giY&t=1s, at least as early as Aug. 11, 2022.
Available online at https://www.youtube.com/watch?v=bdVrWxjK2vo, at least as early as Sep. 17, 2024.
Available online at https://www.youtube.com/watch?v=qw2y0kceAv0, at least as early as Oct. 15, 2024.
Available online at https://www.youtube.com/watch?v=B_I2k7MZEKg, at least as early as Jun. 30, 2024.
Available online at https://www.youtube.com/watch?v=CbA9wA9etGA, at least as early as Sep. 19, 2024.
Available online at https://www.youtube.com/watch?v=zLhA-RWBBYU, at least as early as Jul. 5, 2024.
Available online at https://www.youtube.com/watch?v=_mQJw8VhZ7w&t=111s, as least as early as Oct. 5, 2022.
Available online at https://www.youtube.com/watch?v=1fC7b2LjVW4, at least as early as Jul. 12, 2016.
Available online at https://www.youtube.com/watch?v=UPOLcE1vwA0, at least as early as Apr. 28, 2016.
Available online at https://www.youtube.com/watch?v=UBbk18OZbTc, at least as early as Oct. 14, 2024.
Available online at https://www.youtube.com/watch?v=UHe1zSQwep0, at least as early as Oct. 14, 2024.
Available online at https://www.youtube.com/watch?v=MCbGeC-kuBM, at least as early as Aug. 5, 2024.
Available online at https://www.youtube.com/watch?v=ujdK3yd2gHY, at least as early as Jul. 2, 2024.
Available online at https://www.youtube.com/watch?v=-HizP4UQvug, at least as early as Apr. 25, 2024.
Available online at https://www.youtube.com/watch?v=ioOkbUQqmZO, at least as early as Nov. 9, 2022.
Available online at https://www.youtube.com/watch?v=zmqWU2dQKZ8, at least as early as Oct. 24, 2024.
Available online at https://www.youtube.com/watch?v=q8ldbodRG14, at least as early as Feb. 26, 2024.
Available online at https://www.youtube.com/watch?v=CUhuhleQNos, at least as early as May 22, 2019.
Available online at https://www.youtube.com/watch?v=dY57qnD_O7U, at least as early as Jul. 27, 2021.
International Search Report for PCT/US2025/012544.
International Search Report for PCT/US2025/010425.
International Search Report for PCT/US2025/011450.

(56) References Cited

OTHER PUBLICATIONS

Keselman et al., "Intel RealSense stereoscopic depth cameras," in Proceedings of the IEEE Conference on Computer Vision and Pattern Recognition Workshops, pp. 1-10, 2017.

\* cited by examiner

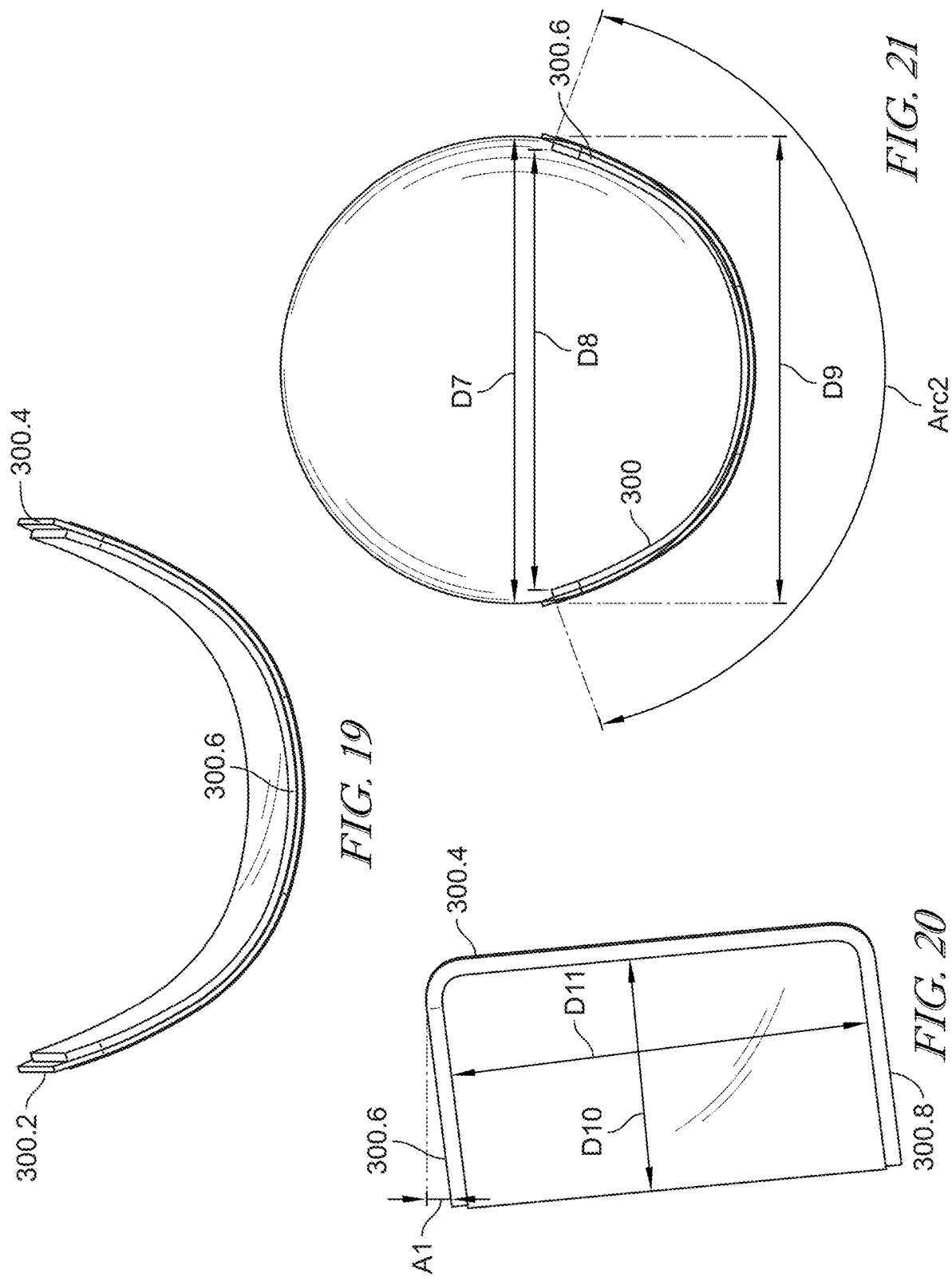

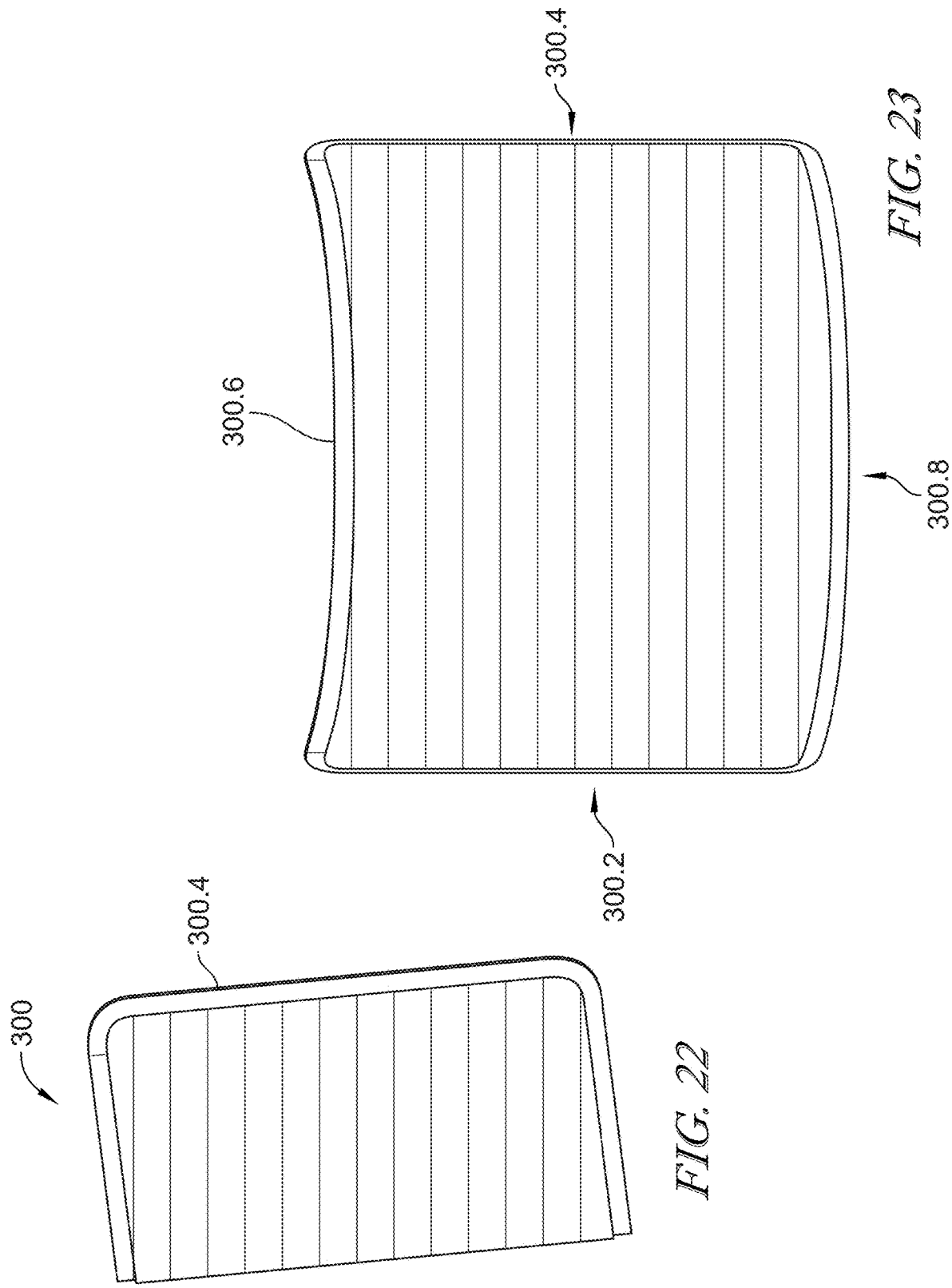

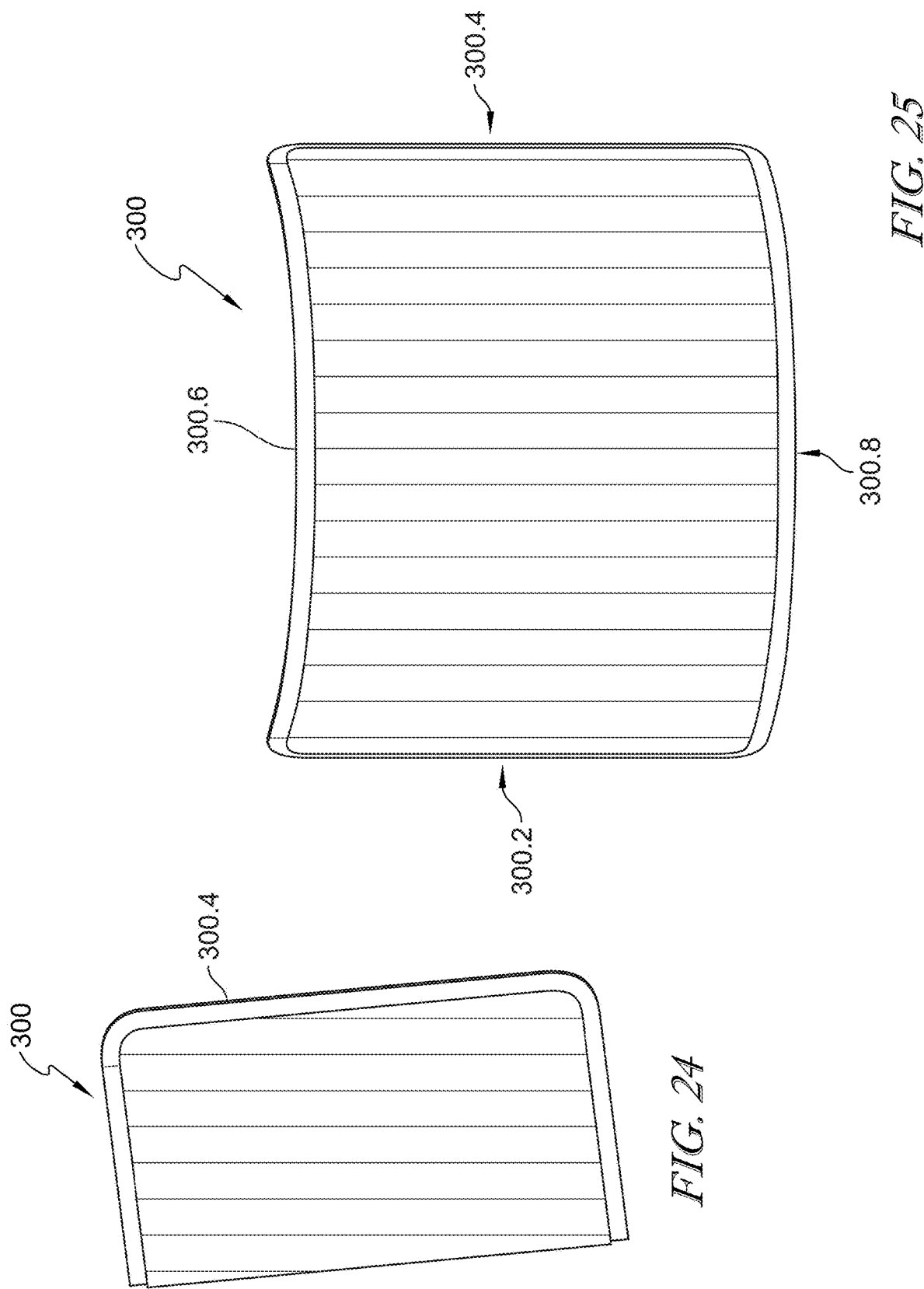

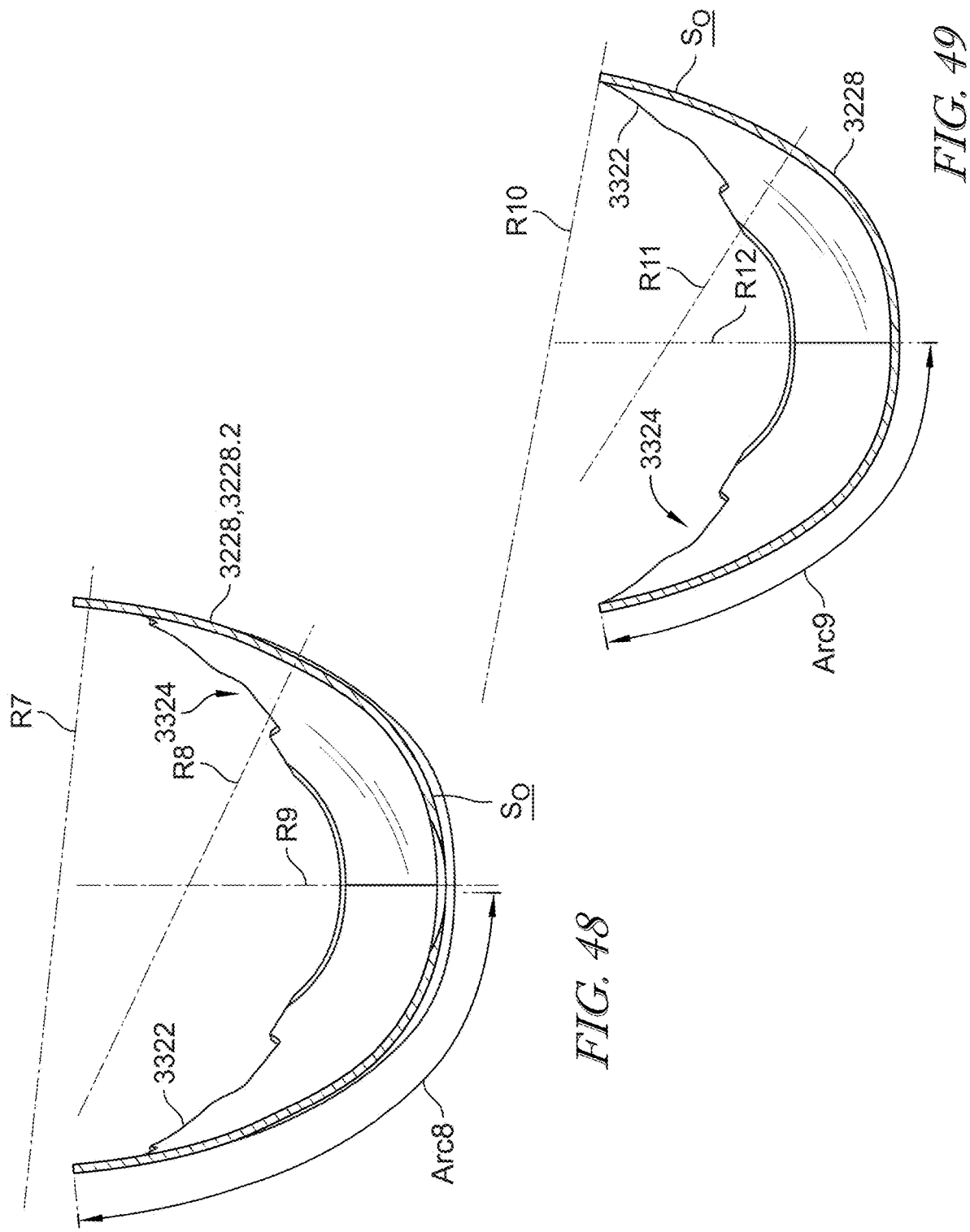

HEAD AND NECK ASSEMBLY FOR A HUMANOID ROBOT

PRIORITY CLAIM AND CROSS-REFERENCE TO RELATED APPLICATIONS

This application is: (i) a continuation in part of U.S. patent application Ser. No. 18/914,800, filed Oct. 14, 2024, which is a continuation in part of U.S. patent application Ser. No. 18/904,332, filed Oct. 2, 2024, (ii) a continuation in part of U.S. Design patent application Ser. No. 29/935,680, filed Apr. 3, 2024, which is a continuation in part of U.S. Design patent application Ser. No. 29/928,748, filed Feb. 15, 2024, which is a continuation in part of U.S. Design patent application Ser. No. 29/889,764, filed Apr. 17, 2023, and (iii) claims priority under 35 U.S.C. § 119 (c) to U.S. Provisional Patent Application No. 63/626,035, filed Feb. 27, 2024, U.S. Provisional Patent Application No. 63/564,741, filed Mar. 13, 2024, U.S. Provisional Patent Application No. 63/626,034, filed Mar. 13, 2024, and U.S. Provisional Patent Application No. 63/626,037, filed May 28, 2024, U.S. Provisional Patent Application No. 63/626,030, filed Feb. 21, 2024, U.S. Provisional Patent Application No. 63/566,595, filed Mar. 18, 2024, U.S. Provisional Patent Application No. 63/626,028, filed Feb. 27, 2024, U.S. Provisional Patent Application No. 63/573,528, filed Apr. 3, 2024, U.S. Provisional Patent Application No. 63/561,316, filed Mar. 5, 2024, U.S. Provisional Patent Application No. 63/634,697, filed Apr. 16, 2024, U.S. Provisional Patent Application No. 63/573,226, filed Apr. 2, 2024, U.S. Provisional Patent Application No. 63/707,949, filed Oct. 16, 2024, U.S. Provisional Patent Application No. 63/707,897, filed Oct. 16, 2024, U.S. Provisional Patent Application No. 63/707,547, filed Oct. 15, 2024, U.S. Provisional Patent Application No. 63/708,003, filed Oct. 16, 2024, each of which is expressly incorporated by reference herein in its entirety.

Reference is hereby made to U.S. Provisional Patent Application No. 63/557,874, filed Feb. 26, 2024, U.S. Provisional Patent Application No. 63/626,040, filed Jan. 28, 2024, U.S. Provisional Patent Application No. 63/626,105, filed Jan. 29, 2024, U.S. Provisional Patent Application No. 63/625,362, filed Jan. 26, 2024, U.S. Provisional Patent Application No. 63/625,370, filed Jan. 26, 2024, U.S. Provisional Patent Application No. 63/625,381, filed Jan. 26, 2024, U.S. Provisional Patent Application No. 63/625,384, filed Jan. 26, 2024, U.S. Provisional Patent Application No. 63/625,389, filed Jan. 26, 2024, U.S. Provisional Patent Application No. 63/625,405, filed Jan. 26, 2024, U.S. Provisional patent application No. 63/625,423, filed Jan. 26, 2024, U.S. Provisional Patent Application No. 63/625,431, filed Jan. 26, 2024, U.S. Provisional Patent Application No. 63/685,856, filed Aug. 22, 2024, U.S. Provisional Patent Application No. 63/696,507, filed Sep. 19, 2024, U.S. Provisional Patent Application No. 63/696,533, filed Sep. 19, 2024, and U.S. Provisional Patent Application No. 63/706,768, filed Oct. 14, 2024, each of which is expressly incorporated by reference herein in its entirety.

TECHNICAL FIELD

This disclosure relates to a head of a robot, specifically a head of a humanoid robot. The head of the humanoid robot includes a plurality of components configured to provide the robot with the ability to communicate with nearby humans using a display that is protected by a frontal shell.

BACKGROUND

The current labor market within the United States is confronting an unprecedented labor shortage, characterized by over 10 million unfilled positions. A significant proportion of these vacancies pertain to occupations that are deemed unsafe, undesirable, or involve hazardous working conditions. This persistent and escalating shortage of available labor has created an urgent imperative for the development and deployment of advanced robotic systems capable of performing tasks that are unattractive or pose risks to human workers. To effectively address this widening gap in the workforce, it has become critical to design and engineer robots that can operate with high efficiency and reliability within human-centric environments. These environments often demand capabilities such as physical dexterity, sustained endurance, precise manipulation, and the ability to navigate complex spaces designed for humans.

Advanced general-purpose humanoid robots have emerged as a promising solution to meet these challenges. These robots are meticulously engineered to replicate the human form and emulate human functionality, typically featuring bipedal locomotion with two legs, bilateral manipulation abilities with two arms, and a display to facilitate interaction with human users. The anthropomorphic design enables these robots to seamlessly integrate into environments originally designed for humans, thereby minimizing the need for extensive modifications to existing infrastructures. As these robots endeavor to mimic the human body, it becomes essential to equip them with a head design that not only meets functional requirements but also enhances aesthetic appeal and durability. The head is a critical component for human-robot interaction, serving as the primary interface through which the robot communicates and engages with nearby humans. A well-designed head can significantly improve the robot's ability to convey information, express intentions, and respond to human cues, thereby fostering a more intuitive and natural interaction experience.

To meet these requirements, the present disclosure introduces an innovative head design that incorporates a versatile display system. This display is capable of adapting its visual output to suit a wide range of operational tasks by rendering icons, graphics, expressive animations, and informative text. The adaptability of the display allows the robot to present contextually relevant information and provide visual feedback, all of which enhance the robot's ability to interact effectively with human users. By making the robot's appearance more relatable and intuitive, the display fosters improved engagement and facilitates smoother human-robot collaboration.

Considering the sensitive and fragile nature of display technologies, and acknowledging the often challenging and harsh environments in which humanoid robots are deployed, it is advantageous to position the display behind a protective shield. This strategic placement serves multiple purposes. Firstly, the shield safeguards the display from potential contaminants such as dust, moisture, chemicals, and particulate matter that could adversely affect its performance and longevity. Secondly, the shield provides protection against physical impacts, vibrations, and mechanical stresses that may occur during operation, especially in industrial or outdoor settings. By mitigating the risks of damage to the display, the shield contributes to the overall robustness and reliability of the robot. Moreover, the integration of the display behind a shield contributes to a sleek and futuristic aesthetic, enhancing the robot's visual appeal.

In summary, the disclosed head design addresses the critical need for a durable, adaptable, and aesthetically pleasing interface for a general-purpose humanoid robot. By combining a versatile display with the frontal shell, the design ensures that the robot can effectively communicate and interact with humans while withstanding the rigors of diverse operational environments. This innovation not only enhances the functionality and user experience but also extends the operational lifespan of the robot, thereby providing a more sustainable and cost-effective solution for addressing the current labor market challenges.

SUMMARY

A need exists for a humanoid robot with an upper region including: (i) a torso, (ii) a pair of arm assemblies coupled to the torso, and (iii) a head and neck assembly coupled to the torso and having a neck portion and a head portion coupled to the neck portion. Said head portion includes: a frontal shell having a rear edge, a rear shell having a frontal edge, and an illumination assembly. The illumination assembly is configured to illuminate a region that: (i) extends between a rear edge of the frontal shell and an extent of the frontal edge of the rear shell, (ii) is positioned adjacent to the extent of the rear edge of the frontal shell, and (iii) is positioned adjacent to the extent of the frontal edge of the rear shell. The humanoid robot also includes: (i) a central region coupled to the upper region, and (ii) a lower region coupled to the central region and spaced apart from the upper region, the lower region including a pair of legs.

There is also a need for a humanoid robot with an upper region including: (i) a torso, (ii) a pair of arm assemblies coupled to the torso, and (iii) a head and neck assembly coupled to the torso and having a neck portion and a head portion coupled to the neck portion. Said head portion includes a frontal shell having a curvilinear periphery, and an outer surface having a nasal region and an orbital region that is not recessed in comparison to said nasal region. The head portion also includes an illumination assembly configured to emit light in a location that is adjacent to the periphery of the frontal shell. Finally, the humanoid robot also includes: (i) a central region coupled to the upper region, and (ii) a lower region coupled to the central region and spaced apart from the upper region, the lower region including a pair of legs.

BRIEF DESCRIPTION OF THE DRAWINGS

The drawing figures depict one or more implementations in accord with the present teachings, by way of example only, not by way of limitation. In the figures, like reference numerals refer to the same or similar elements shown across various other figures.

FIG. 19 is a top view of the display of the head and neck assembly of FIG. 12;

FIG. 20 is a side view of the display of the head and neck assembly of FIG. 12;

FIG. 21 is a top view of the display of the head and neck assembly of FIG. 12;

FIG. 22 is a side view of the display showing a plurality of zones in a horizontal arrangement relative to one another;

FIG. 23 is a front view of the display of FIG. 22;

FIG. 24 is a side view of the display showing a plurality of zones in a vertical arrangement relative to one another;

FIG. 25 is a front view of the display of FIG. 24;

FIG. 48 is a cross-sectional view of the frontal shell of FIG. 41 taken along line 48-48 in FIG. 45 and showing three different radii of curvatures;

FIG. 49 is a cross-sectional view of the frontal shell of FIG. 41 taken along line 49-49 in FIG. 45 and showing three different radii of curvatures;

DETAILED DESCRIPTION

Figure 1:
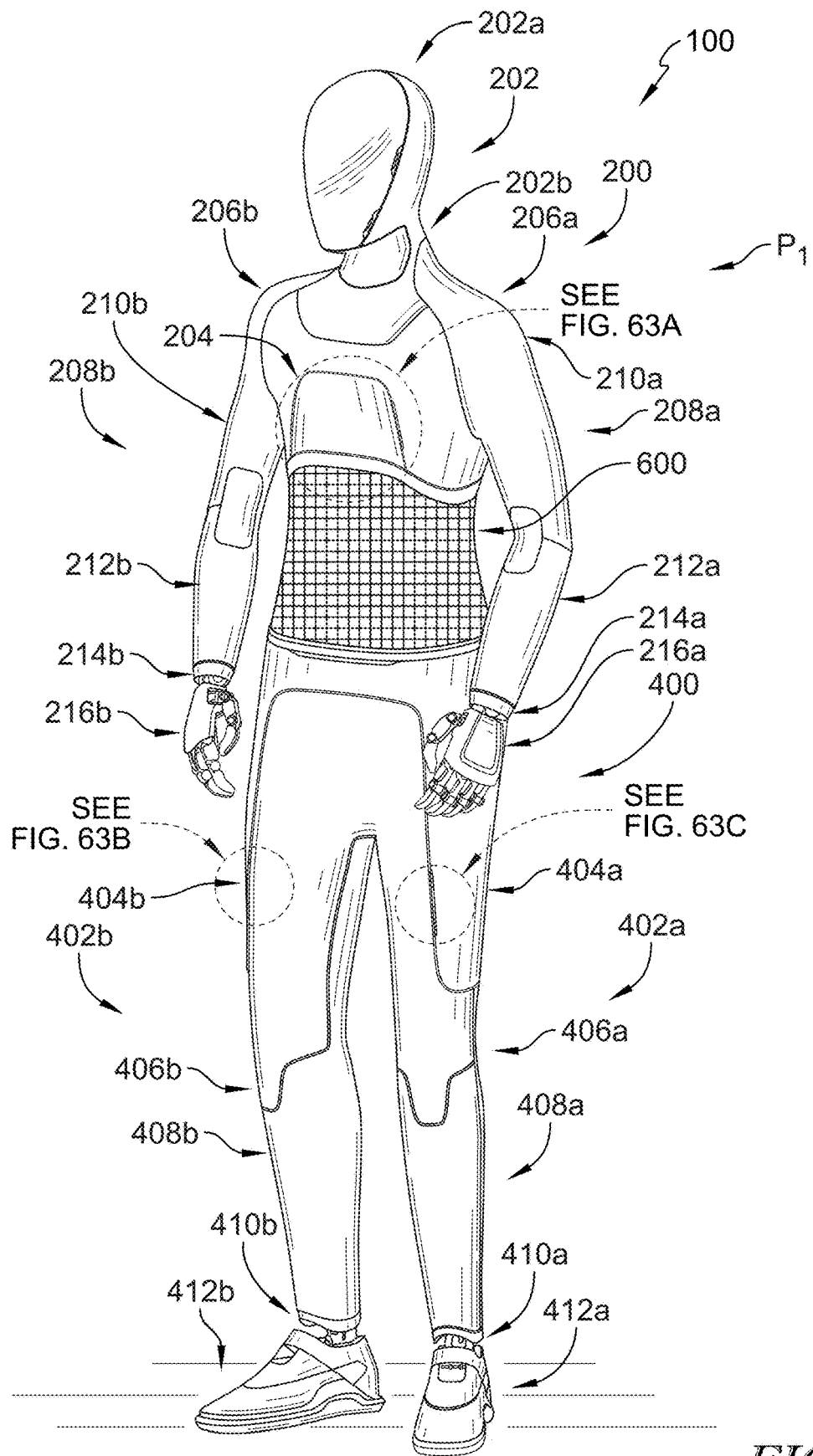
FIG. 1 is a front perspective view of a humanoid robot in an upright, standing position P1 and including: (i) an upper region having the following parts: (a) a head and neck assembly, (b) a torso, (c) left and right shoulders, (d) and left and right arm assemblies each including: (e) a humerus, (f) a forearm, (g) a wrist, and (h) a hand; (ii) a lower region having left and right leg assemblies each including: (a) a thigh, (b) a knee, (c) a shin, (d) an ankle, and (e) a foot; and (iii) a central region connecting the upper portion and the lower portion to one another and configured to allow movement of the upper and lower regions relative to one another.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

A. Introduction

Unlike conventional robots and as described in greater detail below, the disclosed humanoid robot 100 includes an upper region 200 having a head and neck assembly 202. The head and neck assembly 202 is coupled to a torso 204 and has an overall shape that generally resembles a human head. As such, the head and neck assembly 201 includes a head portion 202, 2202, 3202, 4202, 5202, 6202, 7202 that does not include large flat surfaces (e.g., opposed sides of a head, or is not in the shape of: (a) cube, (b) hexagonal prism, or (c) pentagonal prism). Instead, almost all the surfaces of the head are curvilinear or have substantial curvilinear aspects or segments. However, as shown in the Figures, some embodiments of the head do include a recess with a small flat sensor cover or lens, which is recessed in a top portion of the head and is designed to decrease sensor signal distortion that may be caused if the sensor signals are required to travel through a curvilinear shell, cover, shield, or lens. Additionally, while the overall head shape is designed to be human-like, the disclosed head lacks pronounced human facial structures (cheeks, eye peripheral protrusions, a mouth, or other moving structures).

The frontal region of the head is covered by a large freeform frontal shell, frontal head shell, or frontal shield 228, 2228, 3228, 4228, 5228, 6228, 7228 wherein the curvature of the frontal shell varies horizontally and laterally across the head. The freeform nature of the frontal shell causes it to be separate and distinct from the display(s) that is positioned behind the shield. This positional relationship allows the frontal shell to protect the display and electronics contained in the head from damage, which provides a substantial benefit over conventional robot heads that lack this feature. For example, certain tasks (e.g., moving and cutting sheet metal) that the robot may perform on the factory floor may damage or break a display that is not protected behind a shield. As shown in the Figures, the frontal shell does not extend over the entirety of the upper head shell, behind an ear region, nor does it extend into the rear region. However, the frontal shell extends to the chin region and, in some embodiments, includes a substantial opening or recess formed along the upper extent of the shield. The opening or recess formed along the upper edge allows for the inclusion of a small flat sensor cover or secondary lens. Due to the formation of this opening or recess, the shield includes two wing-shaped structures that extend upwards from a main body and surround lateral extents of the sensors positioned behind the small flat sensor cover.

Unlike conventional robot heads, the disclosed head includes a display 300, 2300, 3300, 4200, 5300, 6300, 7300 that is preferably curved in a single direction, or at least one direction, and is positioned on an angle relative to the coronal plane and a horizontal reference plane. The curved nature of the display allows for the inclusion of a larger display with a larger surface area within the head, which increases the amount of information that can be displayed on the display. The larger display provides a benefit over conventional robot heads that lack this feature because those conventional robots must either forgo displaying as much information (while not altering the size of the information) or increase the size of their head (which causes a number of other issues, including increased material costs and assembly costs). Additionally, being able to display more information on the disclosed display is beneficial because the disclosed robot does not include any other internal displays. Further, including only a single display within the robot is beneficial because it: (i) reduces space needed for the displays, (ii) reduces battery usage of the displays, and (iii) at least reduces, and typically eliminates, the inclusion of fragile components within the robot. The display may be configured to display robot status, sensor data, and/or other relevant information to nearby human beings. However, the display is not configured to display human-like facial features (eyes, nose, mouth, etc.) or expressions, but instead is designed to use generic blocks or shapes.

Unlike conventional robot heads, in some embodiments, the disclosed head may include two separate sensor assemblies 2272, 3272, 4272, 5272, 2310, 3310. The first sensor assembly may be positioned within the upper shell or robot's forehead region, while the second sensor assembly may be positioned within the neck assembly or robot's chin region. The position of the first sensor assembly: (i) enables a larger display to be utilized within the head, and (ii) allows the robot to see into a bin that is placed on a high shelf or rack. Including the second sensor assembly enables the robot to look and downward (e.g., to see what it is carrying or looking into a storage bin) without using the first sensor assembly. These are significantly beneficial features over conventional robots that lack a second sensor assembly because the conventional robots must bend and articulate their neck to a greater degree to obtain the data captured from the second sensor assembly. Also, neither sensor assembly in the disclosed head is positioned where a human's eyes would typically be located, above the crown of the head, nor on either side of the robot's head. It should be understood that: (i) both the first and second sensor assemblies may be omitted, (ii) the first or upper sensor assembly may be omitted, while the second or lower sensor assembly is retained, or (iii) the second or lower sensor assembly may be omitted, while the first or upper sensor assembly is retained.

The electronics assembly of the disclosed head portion may include an illumination assembly having at least one light emitter, and preferably a plurality of light emitting assemblies 264, 2264, 3264, 4264, 5264, 6264, 7264, 8264 are positioned adjacent to a rear edge of the frontal shell. The light emitters enable the robot 100 to communicate with humans without using the display that is disposed behind the frontal shell, wherein said light emitters act as or are configured to act as an indicator light. Typically, the light emitters (and in this configuration, indicator lights) can communicate information about the humanoid robot 100 to nearby humans by: (i) emitting light having different wavelengths, wherein said emitted light may be perceived by a nearby human as having different color light, and/or (ii) utilize illumination sequences, durations, and/or brightness. For example, the indicator lights may be used to communicate the working state (e.g., yellow-600 nm), idle state (e.g., green-550 nm), charging state (e.g., blinking or white), error state (e.g., red-665 nm), thinking (e.g., blue-470 nm), or other general states. This is beneficial because it can limit the information that needs to be displayed on the display and allows a human, robot, or machine to receive information from the robot, when the human, robot, or machine is directly to one side of the robot (where the human, robot, or machine could not see the display). Also, the light emitters use less battery power than the display and may be able to relay information more quickly to the human, robot, or machine. Alternatively, the indicator lights can signal an operator to immediately take note of a more complex condition or information that is comprehensively displayed on the display to ensure that an operator properly assesses that complex condition or information for the humanoid robot 100. It should be understood that in other embodiments, illumination assembly may: (i) emit a light that surrounds the periphery of the frontal shell, (ii) emit a light that surrounds the rear edge of the frontal shell, (iii) include a one or more emitter positioned in other robot parts (e.g., torso, knee, leg, arm, hand etc.).

B. Robot Architecture

The humanoid robot 100 is designed to have a substantial similarities in form factor and anatomy to human beings including many of the same major appendages that human beings have. The humanoid robot 100 includes an upper region 200, a lower region 400 spaced apart from the upper region 200, and a central region 600 interconnecting the upper region 200 and the lower region 400. The humanoid robot 100 is shown in FIGS. 1 and 2 in an upright, standing position P1 where a pair of feet 410a, 410b of the lower region 400 are standing on a floor or ground surface G such that the lower region 400 supports the upper region 200 and the central region 600 above the floor.

The upper region 200 includes the following parts: (a) a head and neck assembly 202, (b) a torso 204, (c) left and right shoulders 206a, 206b, (d) and left and right arm assemblies 208a, 208b each including: (c) a humerus 210a, 210b, (f) a forearm 212a, 212b, (g) a wrist 214a, 214b, and (h) a hand 216a, 216b. The lower region 400 includes left and right leg assemblies 402a, 402b each including: (a) a thigh 404a, 404b, (b) a knee 406a, 406b, (c) a shin 408a, 408b, (d) an ankle 410a, 410b, and (c) a foot 412a, 412b. The central region 600 is located generally in, or provides, a pelvis region of the humanoid robot 100. Each of the components of the upper region 200 and the lower region 400 noted above includes at least one actuator configured to move the components relative to one another. The central region 600 is also configured to allow movement of the upper and lower regions 200, 400 relative to one another in a three-dimensional manner.

C. Head and Neck Assembly

Figure 2:
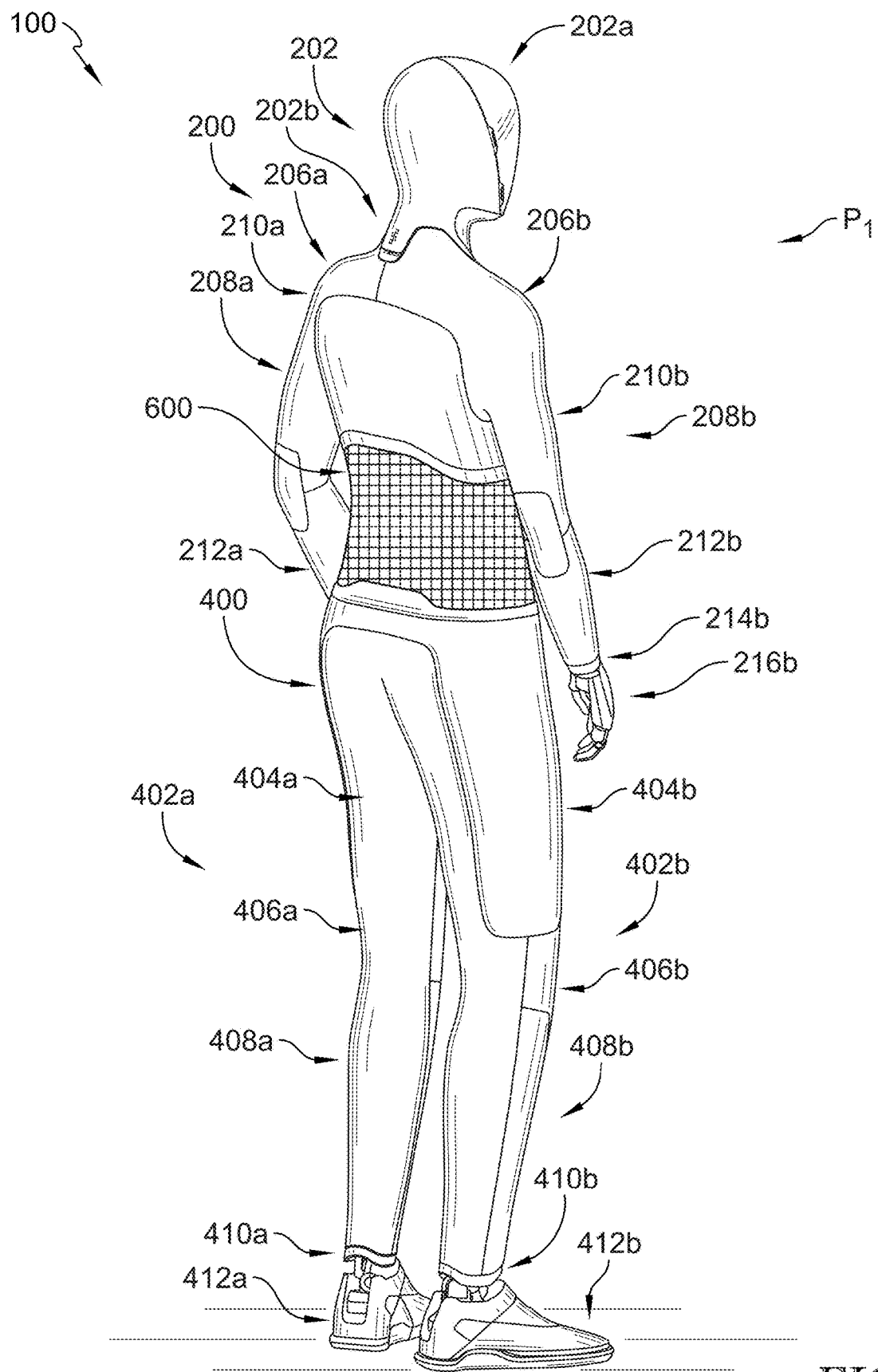
FIG. 2 is a rear perspective view of the humanoid robot of FIG. 1 in the upright, standing position P1.

As shown in FIG. 1, it can be seen that the head and neck assembly 202 of the robot 100 extends from the torso 204 and is designed to: (i) provide the robot 100 with a humanoid shape, (ii) house and protect one or more electronic components (e.g., display, light emitters, sensors, and/or the head actuators), and (iii) provide information to a nearby human using at a display and/or indicator lights. As shown in FIGS. 7-30, the head and neck assembly 202 includes: (i) a head portion 202a, and (ii) a neck portion 202b coupled to a lower end or extent of said head portion 202a.

1. Exterior Head Shape

Figure 3:
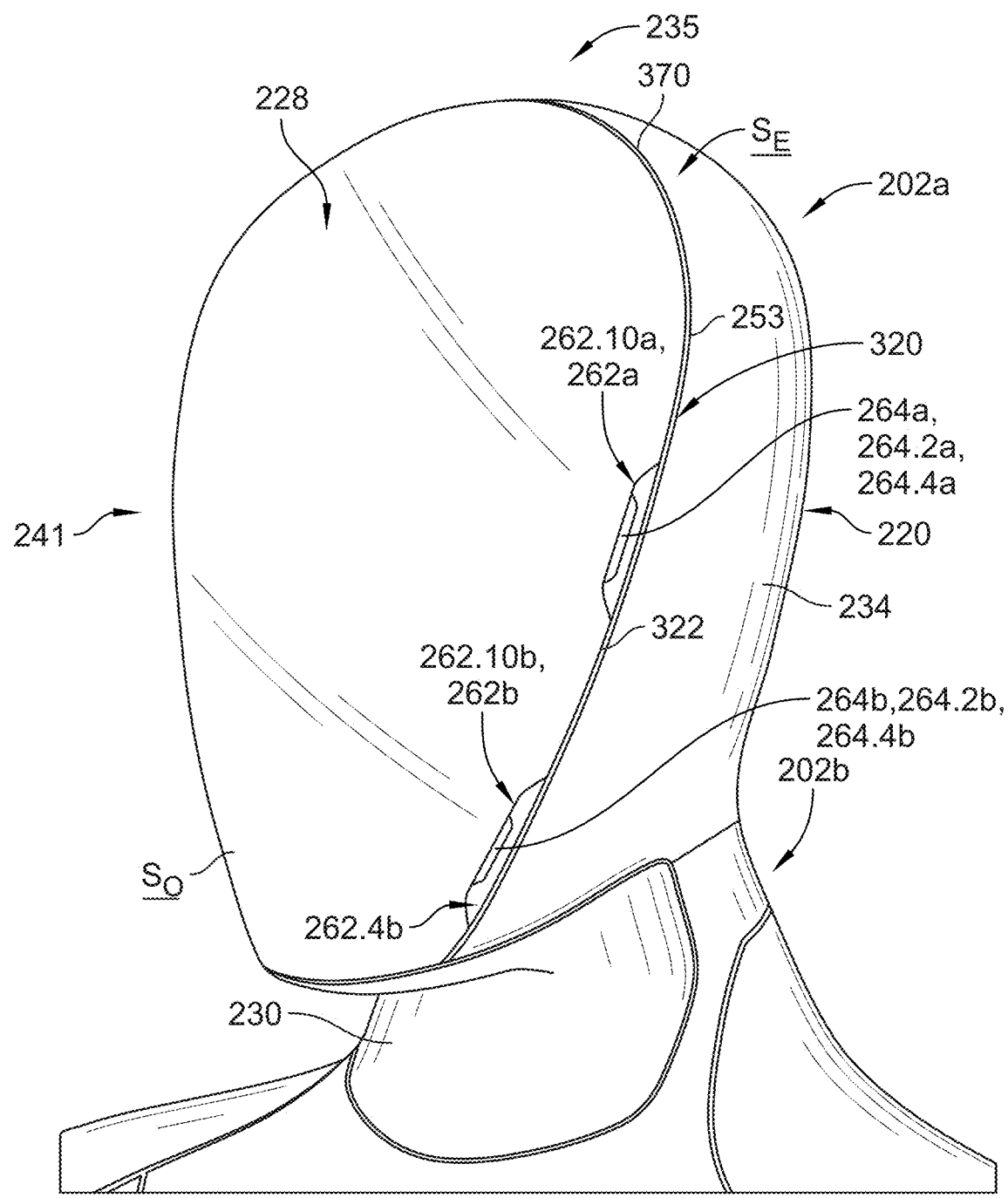
FIG. 3 is a perspective view of the head and neck assembly of the humanoid robot of FIG. 1 showing the head and neck assembly including: (i) a head portion having: (a) a head housing assembly with a frontal shell and a rear shell, (b) a head electronics assembly with an illumination assembly having at least one light emitter configured to emit light between an extent of the frontal shell and rear shell, and (ii) a neck portion having: (a) a neck housing assembly with a cover, and (b) a neck electronics assembly.
Figure 4:
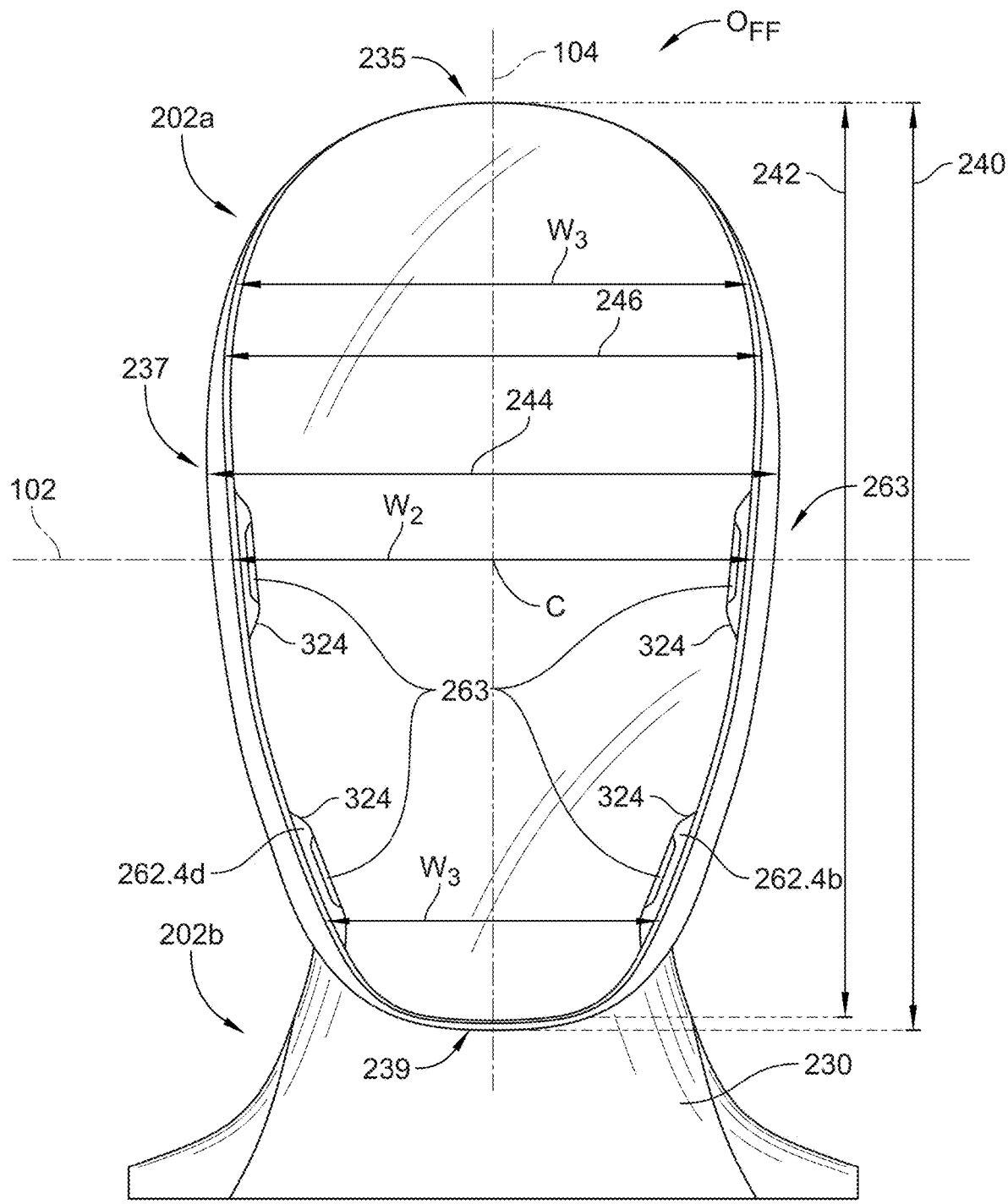
FIG. 4 is a front view of the head and neck assembly of FIG. 3 showing: (i) the frontal shell coupled to the rear shell, and (ii) a plurality of light emitters of the illumination assembly located at a junction between the frontal shell and the rear shell.
Figure 7:
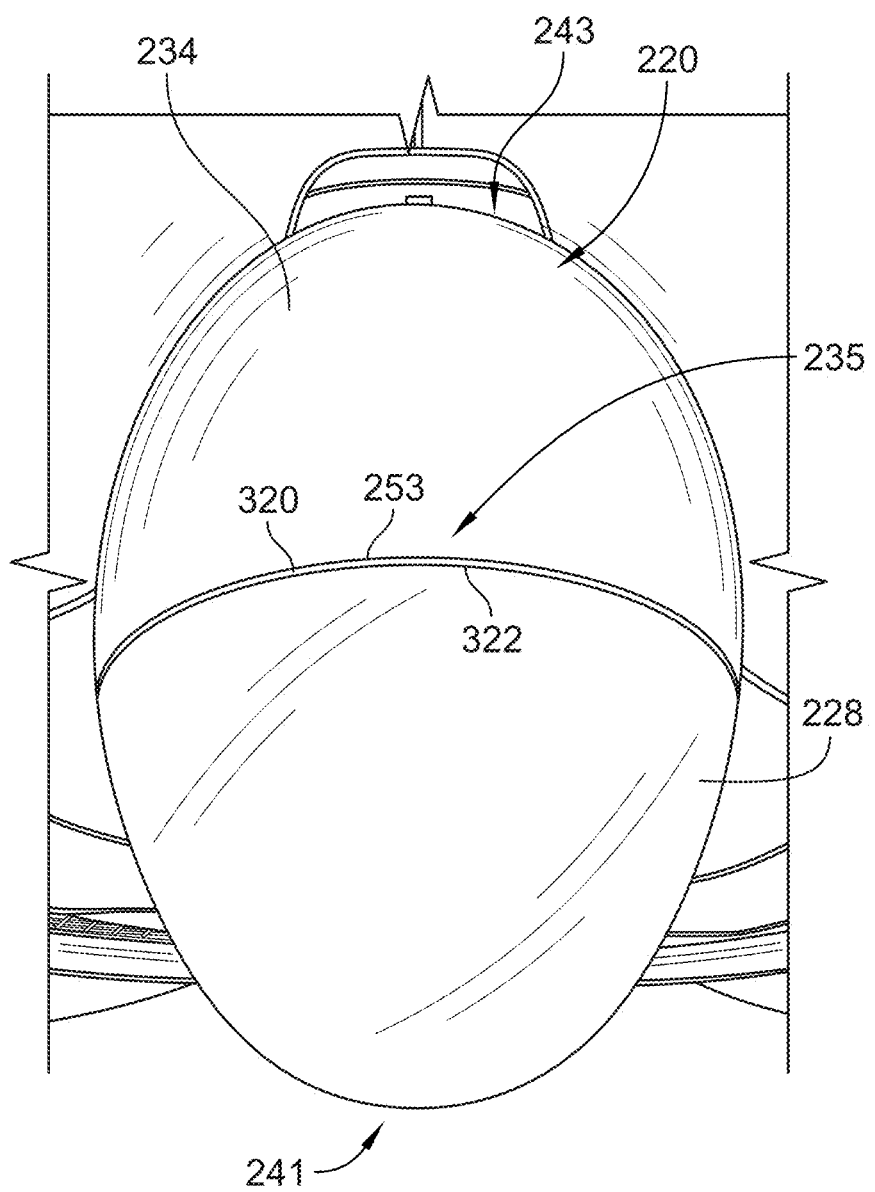
FIG. 7 is a top view of the head and neck assembly of FIG. 3.

As shown in FIGS. 1-9, the head portion 202a of the robot 100 has an exterior surface that provides said head portion 202a with an overall shape that is similar to a shape of a human head. The overall shape of the head portion 202a is defined by the housing assembly 220 that includes: (i) a rear shell, rear head covering, or rear cover 234, and (ii) a frontal shell, frontal shield, frontal head covering, or frontal cover 228. In some embodiments, the head portion 202a is formed with no flat surfaces and is generally egg-shaped when viewed from the front, as shown in FIG. 4, and the top, as shown in FIG. 7. The head portion 202a of the robot 100 changes constantly in width from top to bottom, wherein the width of the head portion 202a increases from a top or scalp end 235 to a temple region 350 where the head is widest. The temple region 350 generally corresponds to an eye level of a human, or at a location that is about 30-50% of a height 240 of the head portion 202a from the top end 235. The width of the head portion 202a then decreases from the temple region 350 to a lower or chin end 239. In this way, the head portion 202a of the robot 100 is asymmetrical about a first plane 102 passing through a center or centroid C of the head portion 202a equidistant from the top end 235 and the lower end 239. The head portion 202a of the robot is symmetrical about a second plane 104 perpendicular to the first plane 102 and passing through the center or centroid C of the head portion 202a. In other embodiments, the head may be symmetrical about a first plane 102 and asymmetrical about a second plane 104.

As shown in FIG. 4, a rear shell 234 of the housing assembly 220 has a first maximum height 240 and a frontal shell 228 of the housing assembly 220 has a second maximum height 242 less than the first height 240. The rear shell 234 also has a first maximum width 244 and the frontal shell 228 has a second maximum width 246 less than the first width 244. The head portion 202a of the robot 100 has the maximum height 240 that is greater than the maximum width 244. The maximum height 240 and width 244 are both provided by the rear shell 234, in particular the rear shell 234 of the rear shell 234. The maximum width 246 of the frontal shell 228 is located above the maximum width 244 of the of the head portion 202a.

As shown in FIG. 5, a depth of the head of the robot 100 is defined by a combination of both the rear shell 234 and the frontal shell 228. The depth includes a maximum depth 250 at a location that is about equal to the temple region 350 and that extends between a front or facial region 241 of the head to an occipital region 359 of the head. The front end 241 is provided by the frontal shell 228 and the rear end 243 is provided by the rear shell 234. The depth of the head changes constantly from the top end 235 to the lower end 239. The depth increases from the top end 235 to the maximum depth 250 and then decreases from the maximum depth 250 to the lower end 239. The head of the robot 100 is asymmetrical about a third plane 106 extending through the center or centroid C of the head and perpendicular to the first plane 102. The head of the robot 100 is also asymmetrical about a fourth plane 108 extending through the center or centroid C of the head and perpendicular to the second plane 104. In other words, the head of the robot 100 is only symmetrical about the second plane 104. The center C is spaced equal distances from: (i) the top end 235 and the bottom end 239, (ii) the front end 241 and the rear end 243, and (iii) lateral sides 247, 249 of the head portion 202a. In other embodiments, the head may be symmetrical about a third plane 106 and/or symmetrical about a fourth plane 108. Stated another way, other embodiments of the head may be symmetrical about: (i) all planes 102, 104, 106, and 108, (ii) three of the four planes 102, 104, 106, and 108, (iii) two of the four planes 102, 104, 106, and 108, (iv) one of the four planes 102, 104, 106, and 108, or (v) none of the four planes 102, 104, 106, and 108.

Exterior surfaces of the rear shell 234 and the frontal shell 228 are concave to the center of the head portion 202a. The head portion 202a of robot 100 may include a nape region 245 formed in the rear extent of the head, below the occipital region 359, and the neck portion 202b. The nape region 245 may include an exterior surface that is convex to the center C of the head portion 202a. In some embodiments, the nape region 245 is the only region of the head portion 202a that has a convex surface relative to the center or centroid C of the head portion 202a.

Figure 14:
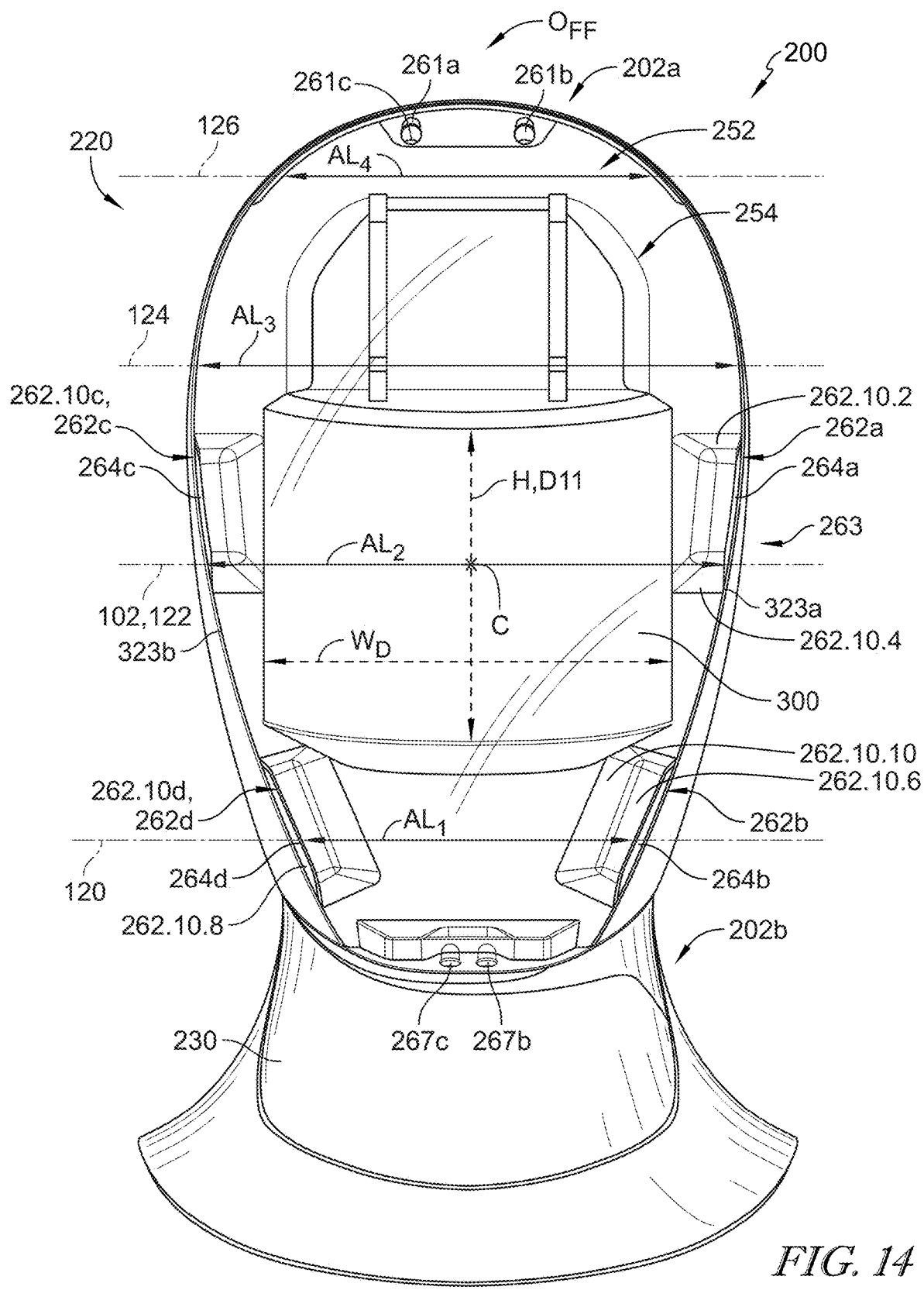
FIG. 14 is a front view of the head and neck assembly of FIG. 12 showing the head and neck assembly including: (i) the display, and (ii) a plurality of light emitters of the illumination assembly that are positioned to emit light on the lateral sides of the head and adjacent to a rear edge of the frontal shell.

When viewed from the front as shown in FIGS. 4 and 14, (i) the lateral sides of the head portion 202a have a first curvature generally extending about the center or centroid C, (ii) the top extent 235 of the head portion 202a has a second curvature generally extending about the center or centroid C, and (iii) the bottom end 239 has a third curvature generally extending about the center or centroid C. The second curvature is less than, or has a lesser degree than, the first curvature. The second curvature is greater than, or has a greater degree than, the third curvature. The first curvature is defined between a buccal region 352 and a crown region 270 of the head 202a. The second curvature is defined by the crown region 270. The third curvature is defined between each buccal region 352 of the head 202a. The head 202a has a substantially oval shape when viewed from above as shown in FIG. 7, but may taper inwardly slightly in the frontal shell 228 toward a facial region provided by the frontal shell 228.

2. Head Housing Assembly

The head housing assembly 220 of the head and neck assembly 202 is configured to contain and protect other assemblies contained within the head assembly 202a. As discussed above, the housing assembly 220 is configured to have a form resembling the general shape of a human head and includes: (i) a frontal shell, frontal shield, frontal head covering, or frontal cover 228, (ii) a rear shell, rear head covering, or rear cover 234, (iii) an intermediate cover, intermediate support, or intermediate member 252, and (iv) an electronics support or frame 254. As discussed below, the intermediate cover 252 and electronics support 254 may be combined into a single structure. Additionally, in other embodiments, the intermediate cover 252 may be omitted and the electronics support 254 may be directly coupled to an extent of the rear shell 234. In further embodiments, electronics support 254 may be omitted and the intermediate cover 252 may be retained. Also, the rear shell 234 may be omitted or substantially omitted and replaced by a substantially larger frontal shell 228. Finally, the frontal shell 228 may be omitted or substantially omitted and replaced by a substantially larger rear shell 234 frontal shell 228.

The intermediate cover 252 and the rear shell 234 mount to one another and define a first head sub-volume 236 within the housing assembly 220. The first head sub-volume 236 is configured to contain and protect one or more components used in the operation of the robot 100 such as electronics, batteries, computing components, etc. The frontal shell 228 provides a front end of the housing assembly 220 and defines a second sub-volume 238 between the intermediate cover 252 and the frontal shell 228 within the housing assembly 220. The second sub-volume 238 is separated from the first sub-volume 236 via the intermediate cover 252 and is configured to contain and protect one or more components included in the electronics assembly 222 such as a display, light emitters, cameras etc. The frontal shell 228 and/or the intermediate cover 252 can be removed from the rest of the housing assembly 220 to service components within the sub-volumes 236, 238 or to upgrade components in the sub-volumes 236, 238. The modular design allows for individual components to be replaced without requiring replacement of the entire housing.

i. Intermediate Cover

The intermediate cover 252 includes structures that are used to mount components of the electronics assembly 222 to the head portion 202a. The intermediate cover 252 is configured to couple with the rear shell 234 and is located between the first and second sub-volumes 236, 238 to separate the first and second sub-volumes 236, 238. In other words, the intermediate cover 252 is designed to split or divide the first sub-volume 236 from the second sub-volume 238. In other embodiments, the intermediate cover 252 may be omitted, and the first and second sub-volumes 236, 238 may be converted into a single sub-volume. Alternatively, the intermediate cover 252 may be combined or integrally formed with other structures disclosed herein (e.g., electronics support 254, the rear shell 234, and/or the frontal shell 228), whereby the first and second sub-volumes 236, 238 may remain or may be combined into a single sub-volume. Further, it should be understood that other mounting structures, dividers, covers, and/or plates may be included within the head to further sub-divide the housing into additional sub-volumes (e.g., 3-10 sub-volumes).

The intermediate cover 252 has an outer perimeter 256 that is sized to fit within an inset rim 258 of the rear shell 234. In this manner, the outer perimeter 256 is slightly less than the inner perimeter of an extent of the rear shell 234 that is positioned between a ledge 257 and a forward edge 253 of an outer perimeter 259 of the rear shell 234. As such, the outer perimeter 256 of the intermediate cover 252 has a length that is less than the length of the outer perimeter 259 of the rear shell 234. In other embodiments, the outer perimeter 256 of the intermediate cover 252 may not be sized to fit within an inset rim 258 of the rear shell 234. Instead, said outer perimeter 256 of the intermediate cover 252 may be substantially equal to the outer perimeter 259 of the rear shell 234, wherein said intermediate cover 252 may be coupled to, positioned adjacent to, and/or abutting said forward edge 253 of the rear shell 234. In other words, a rear extent of the intermediate cover 252 may be configured to abut the forwardmost surface of said forward edge 253 of the rear shell 234. In other embodiments, the outer perimeter 256 of the intermediate cover 252 may only extend along an extent that is less than substantially all, or even less than a majority (e.g., along only a minority), of the inner perimeter of an extent of the rear shell 234 that is positioned between a ledge 257 and a forward edge 253 of the outer perimeter 259.

The outer perimeter 256 of the intermediate cover 252 is slightly less than the outer perimeter 260 of the frontal shell 228. As such, the outer perimeter 256 of the intermediate cover 252 has a length that is less than the length of the outer perimeter 260 of the frontal shell 228. In other embodiments, the outer perimeter 256 of the intermediate cover 252 may be substantially equal to the outer perimeter 260 of the frontal shell 228. In other embodiments, the outer perimeter 256 of the intermediate cover 252 may only extend along an extent that is less than substantially all, or even less than a majority (e.g., along only a minority), of the rear edge 322 of the frontal shell 228.

The intermediate cover 252 further includes a plurality of peripheral protrusions 262a, 262b, 262c, 262d spaced around the outer perimeter 256 of the intermediate cover 252. Said peripheral protrusions 262a, 262b, 262c, 262d form a plurality of light emitter housings. Specifically, each of the peripheral protrusions 262a, 262b, 262c, 262d is configured to house a respective light emitting assemblies 264a, 264b, 264c, 264d of the illumination assembly. Said light emitter housings have five primary walls that are comprised of: (i) two end walls, wherein said end walls are angled (e.g., at an obtuse angle) relative to the frontal surface of the intermediate cover 252, (ii) a top wall, (iii) a bottom wall, wherein said bottom wall is angled relative to the frontal surface of the intermediate cover 252, and (iv) an interior wall, wherein said interior wall is angled (e.g., at an obtuse angle) relative to the frontal surface of the intermediate cover 252. The angled configuration of the two end walls, bottom wall, and interior wall is designed to: (i) force light out of the housing, and (ii) ensure that the light emitted radiates through a diffuser or lens in a manner that does not let the light scatter broadly, nor does it overly restrict the scattering of the light. In other embodiments, the walls may not be angled relative to the frontal surface of the intermediate cover 252, the top wall may be angled relative to the frontal surface of the intermediate cover 252, and/or the angles between the walls and the frontal surface of the intermediate cover 252 may be an acute angle.

ii. Electronics Support

Figure 15A:
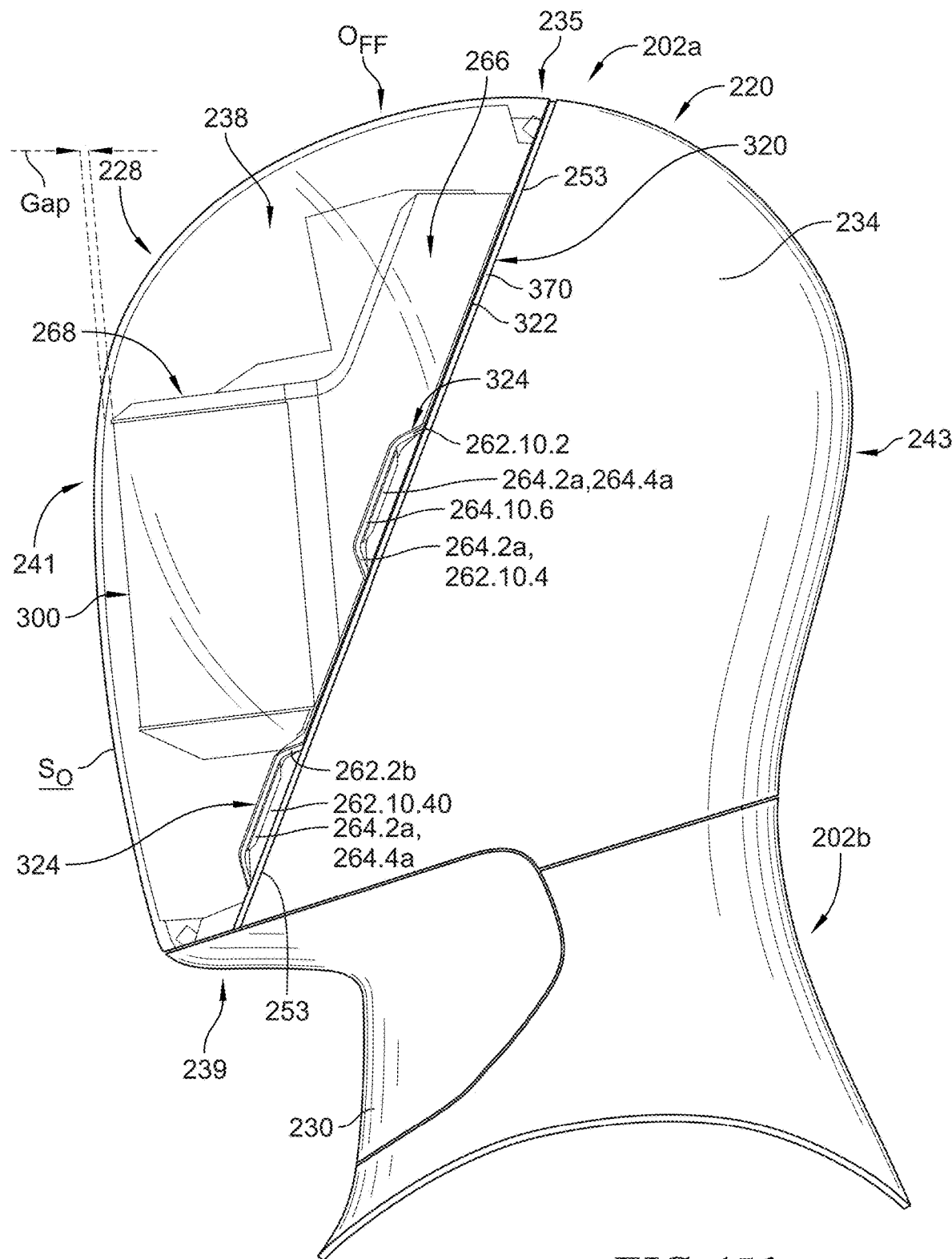
FIG. 15A is a side view of the head and neck assembly of FIG. 12.
Figure 27:
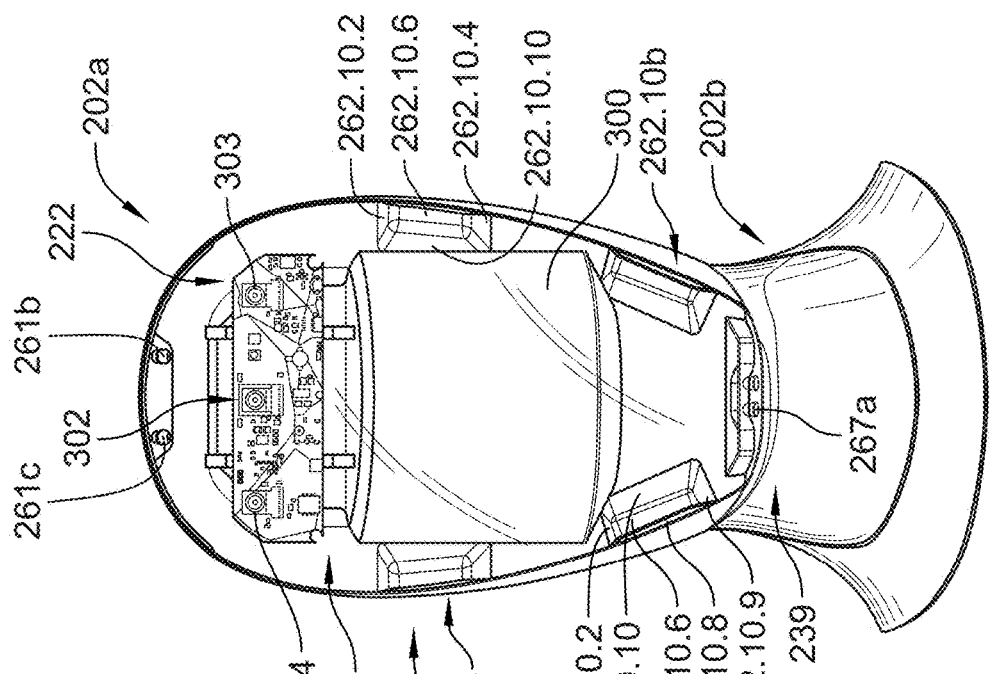
FIG. 27 is a front view of the head and neck assembly of FIG. 26.
Figure 26:
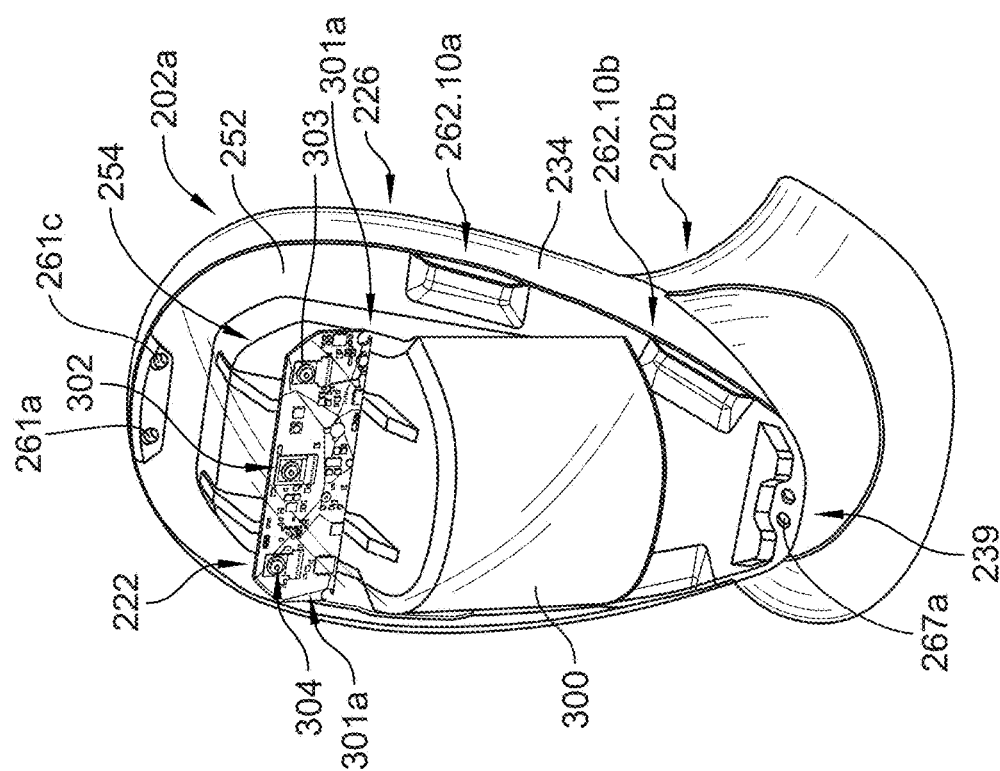
FIG. 26 is a perspective view of the head and neck assembly of FIG. 12, wherein the head electronics assembly includes a sensor assembly: (i) coupled to the electronics support, (ii) positioned above the display, and (iii) within the interior space formed between the intermediate cover and the frontal shield.
Figures 28, 29:
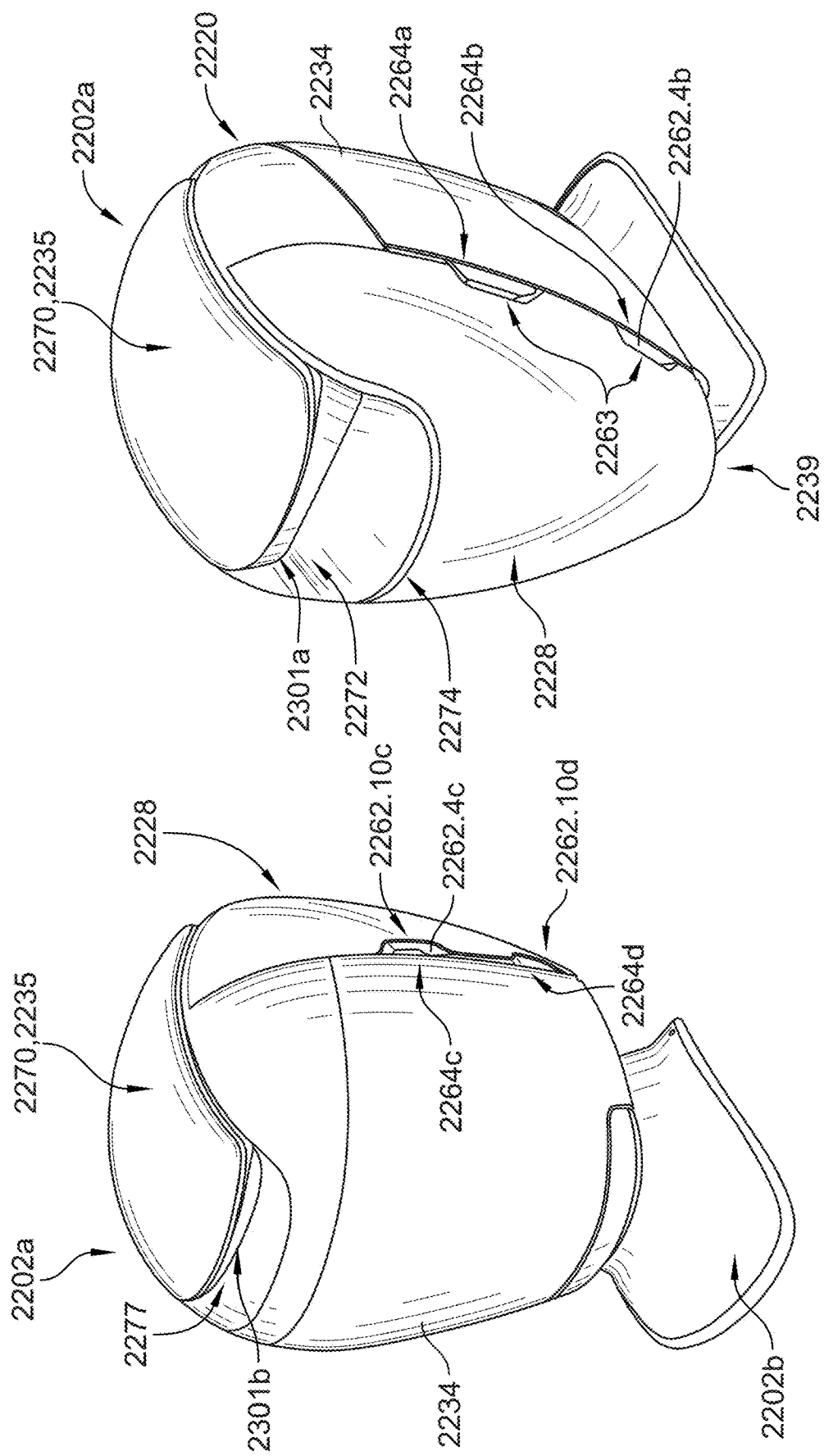
FIG. 28 is a rear perspective view of a second embodiment of a head and neck assembly of the humanoid robot of FIG. 1.
FIG. 29 is a front perspective view of the head and neck assembly of FIG. 28, wherein the head assembly further includes an upper shell with an upper recessed sensor zone.
Figures 30, 31A:
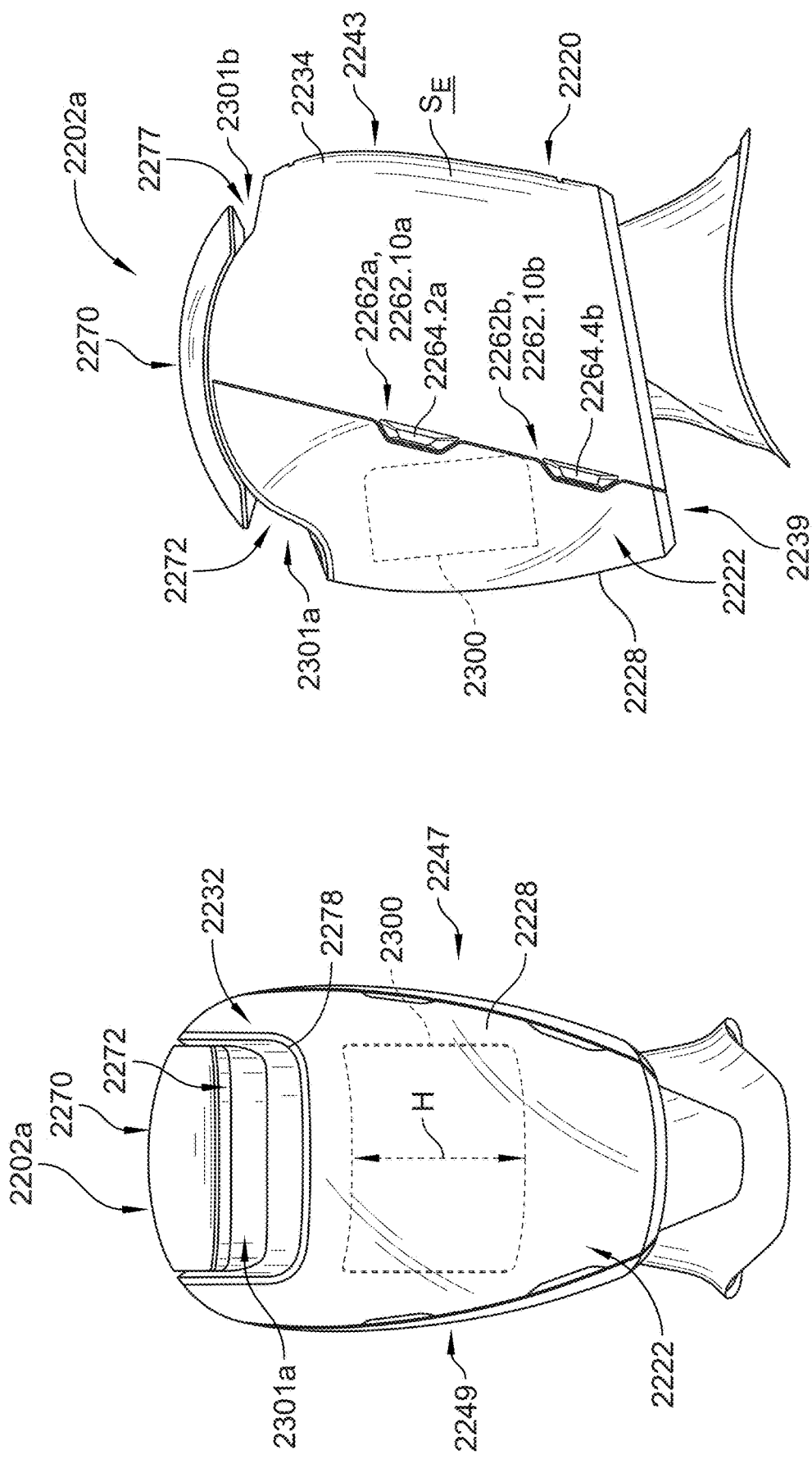
FIG. 30 is a front view of the head and neck assembly of FIG. 28.
FIG. 31A is a side view of the head and neck assembly of FIG. 28.
Figure 31B:
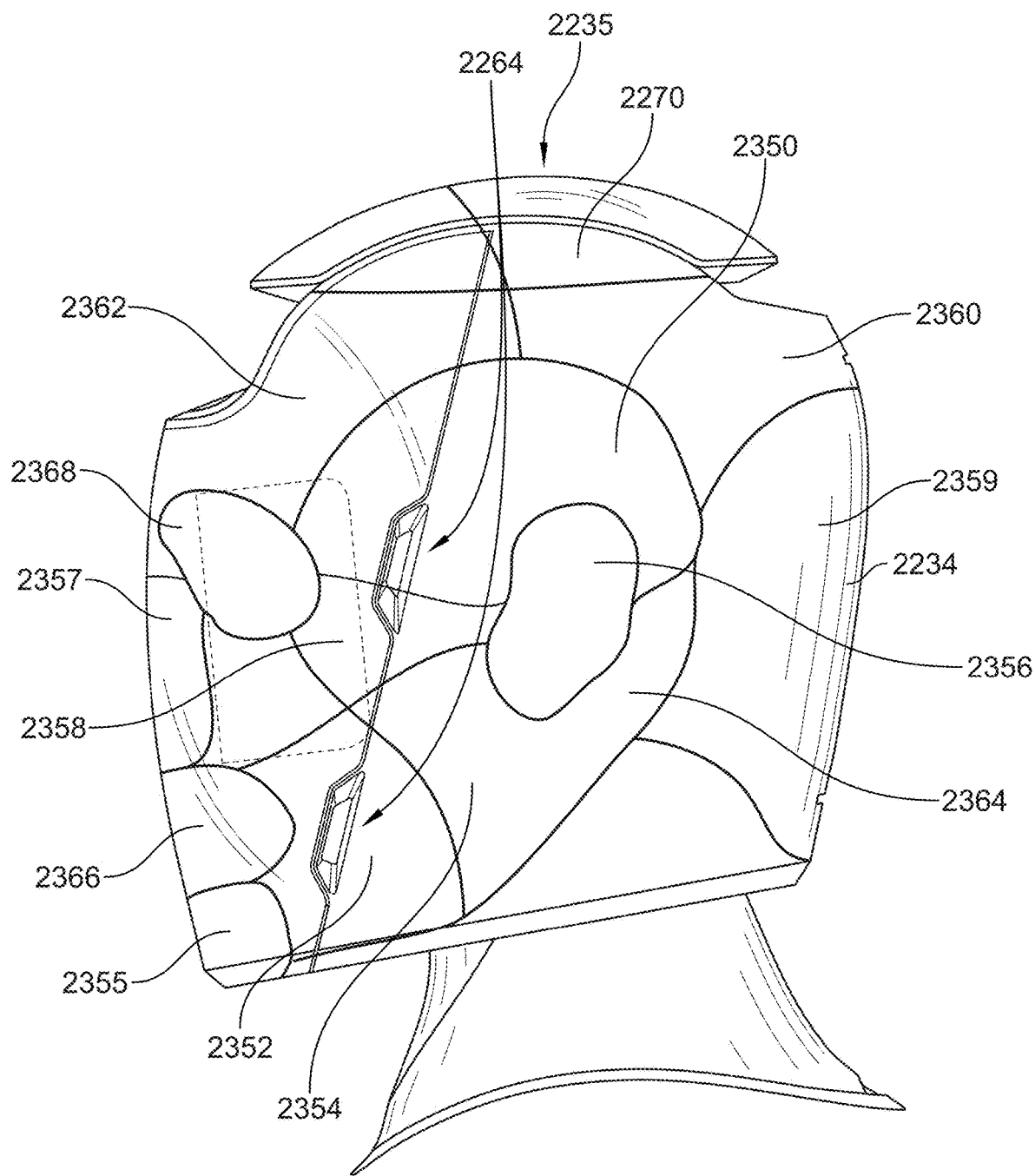
FIG. 31B is a side view of the head and neck assembly of FIG. 28 showing various anatomical regions of the head.
Figure 32:
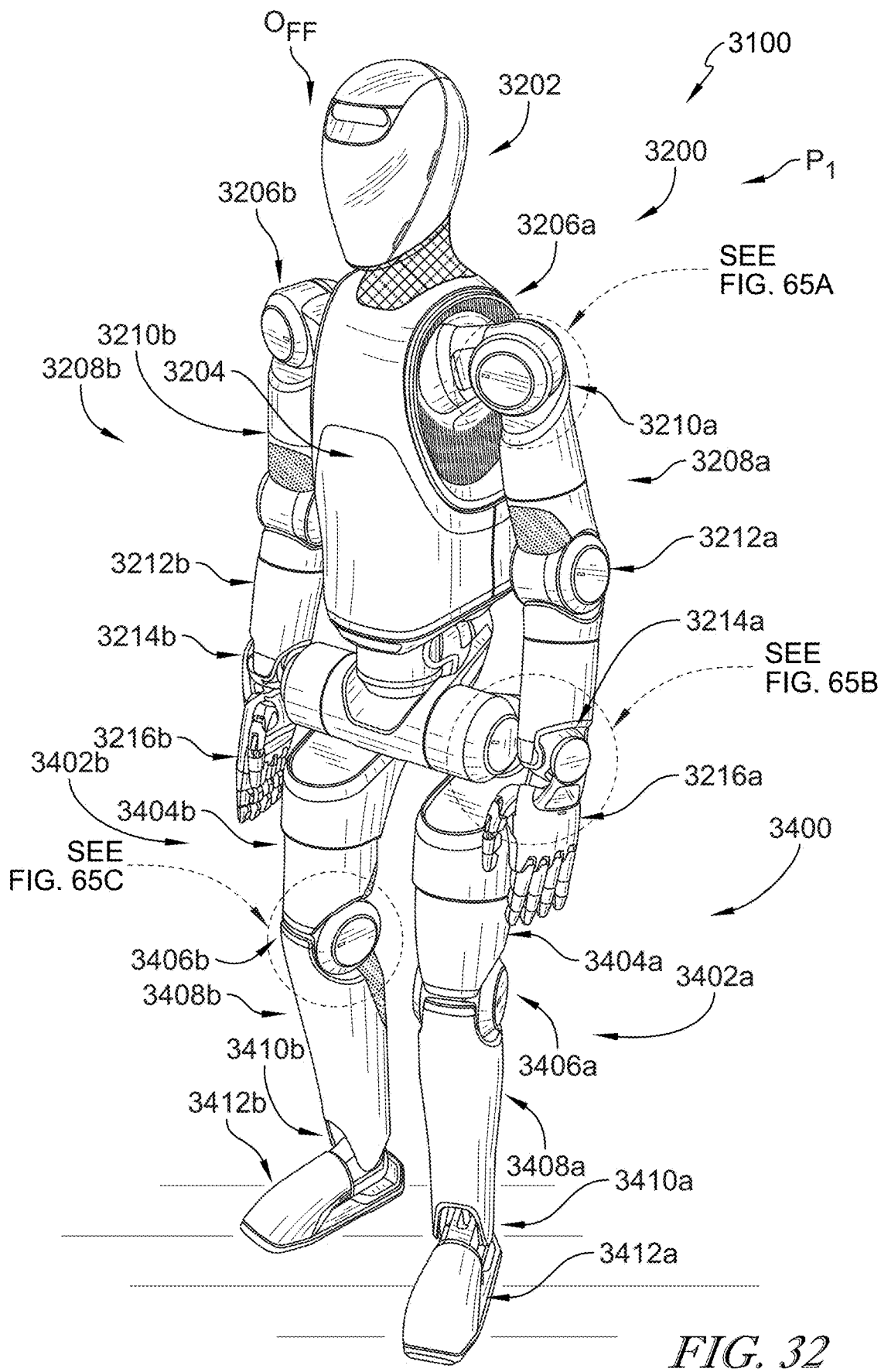
FIG. 32 is a perspective view of a third embodiment of head and neck assembly of the humanoid robot, wherein the head and neck assembly includes a deformable mesh covering internal structures and components of the neck assembly.

The electronics support 254 is mounted to a generally central area of the intermediate cover 252 and is configured to position a display 300 included in the electronics assembly 222 between the intermediate cover 252 and the frontal shell 228 within the second head sub-volume 238. The electronics support 254 includes a base coupling 266 configured to mount to the intermediate cover 252 and a display coupling 268 configured to mount the display 300 to the electronics support 254. The base coupling 266 is located above and rearward of the display coupling 268. The display coupling 268 positions the display 300 in spaced apart relation to the frontal shell 228 as shown in FIG. 15. As shown in FIGS. 26 and 27, the intermediate cover 252 is configured to lie behind the electronics assembly 222 to locate at least a portion of the electronics assembly 222 between the intermediate cover 252 and the frontal shell 228.

iii. Frontal Shell

The frontal shell 228 is configured to cover at least the intermediate cover 252 and the electronics assembly 222 as shown in FIGS. 1-27. The frontal shell 228 forms a forwardmost, exterior surface of the head portion 202a and cooperates with the intermediate cover 252 to define the second sub-volume 238 in the housing assembly 220. The frontal shell 228 may be made from a transparent material so that the display 300 mounted on the electronics support 254 may be viewed therethrough. In other embodiments, the frontal shell 228 may be tinted or opaque. The intermediate shell 252 can be similarly colored (tinted or opaque) similarly so that the frontal shell 228 has a similar appearance to the intermediate shell 252 and so that lights displayed on the display 300 are the only items visible or displayed/conspicuous through the frontal shell 228. The frontal shell 228 may be coated, etched, or formed in with a plurality of layers (e.g., examples of which are disclosed within U.S. Pat. Nos. 8,770,749; 9,134,547, 9,383,594; 9,575,335; 9,910,297, all of which are incorporated herein by reference) in a manner that improves durability, increases sensor accuracy, filters one or more specific wavelengths, reduce glare, enhance appearance, reduces fog, makes the frontal shell 228 easier to clean or protects it from cleaning products. Examples of such optical coatings include anti-reflection coatings, mirror coatings, hard coatings, anti-static coatings, anti-fog coatings, some of which are described within U.S. patent application Ser. Nos. 16/896,016, 16/698,775, 16/417,311, 16/126,983, 15/359,317, 15/515,966, each of which are incorporated herein by reference. Further, the material composition, shape, number of layers, composition of said layers of the frontal shell 228 may be different from the material composition, shape, number of layers, composition of said layers utilized within other parts of the frontal shell 228. In other words, the composition, shape, number of layers, composition of said layers may vary across the frontal shell 228. It should be understood that this disclosure is not limited to just the information that is disclosed within those applications; but instead should include any compositions, shapes, layer numbers, compositions of layers that are known in the art or are obvious in light of what is known in the art.

The frontal shell 228 or an extent of the frontal shell 228 may have a substantially uniform thickness, which may be equal to or greater than 1 mm and preferably greater than 2 mm. Additionally, the frontal shell 228 may be optically correct and may not be a corrective lens. As such, the frontal shell 228 has a dioptric power of less than 0.25 diopters, preferably less than 0.12 diopters, and most preferably less than 0.06 diopters. The frontal shell 228 may have a reverse/negative pantosope tilt, a forward/positive pantosope tilt, or no pantoscope tilt. Accordingly, the frontal shell 228 may be made from or may include polycarbonate (PC), acrylic (PMMA), trivex, nylon, gorilla glass (aluminosilicate glass), thermoplastic polyurethane (TPU), high-grade glass, cr-39, polyethylene terephthalate (PET), polystyrene, fused silica (quartz glass), borosilicate glass, polyurethane, cellulose acetate, polyvinyl chloride (PVC), cellulose acetate butyrate (CAB), polyvinyl butyral (PVB), optical-grade resin, sapphire glass, polyetherimide (PEI), lexan, thermoset plastics, other anti-scratch coated plastics, or any other similar material that is known in the art.

In the illustrative embodiment shown in FIGS. 1-16, the frontal shell 228 is mounted to the intermediate cover 252 and/or the rear shell 234 along a shield interface 320 at the outer perimeters 256, 260 of the rear shell 234 and the frontal shell 228. A rear facing edge 322 of the frontal shell 228 is configured to mount with: (i) a frontal edge 253 of the rear shell 234, (ii) a frontal extent of the intermediate cover 252, and/or (iii) both to form the shield interface 320. As shown in this embodiment, the shield interface 320 is not flat or planer. Instead, the shield interface 320 is irregular due to the fact that the rear edge 322 of the frontal shell 228 is formed to include a plurality of recesses 324. Each recess 324 is sized to receive a respective peripheral protrusion 262a, 262b, 262c, 262d formed in the intermediate cover 252 and that house a respective light emitting assemblies 264. In some embodiments, the frontal shell 228 itself can include the peripheral protrusions 262a, 262b, 262c, 262d, although this may not be desirable as the frontal shell 228 is the component that is most likely to be removed from the housing assembly 220 to service the head portion 202a and the electronics assembly 222.

Figure 5A:
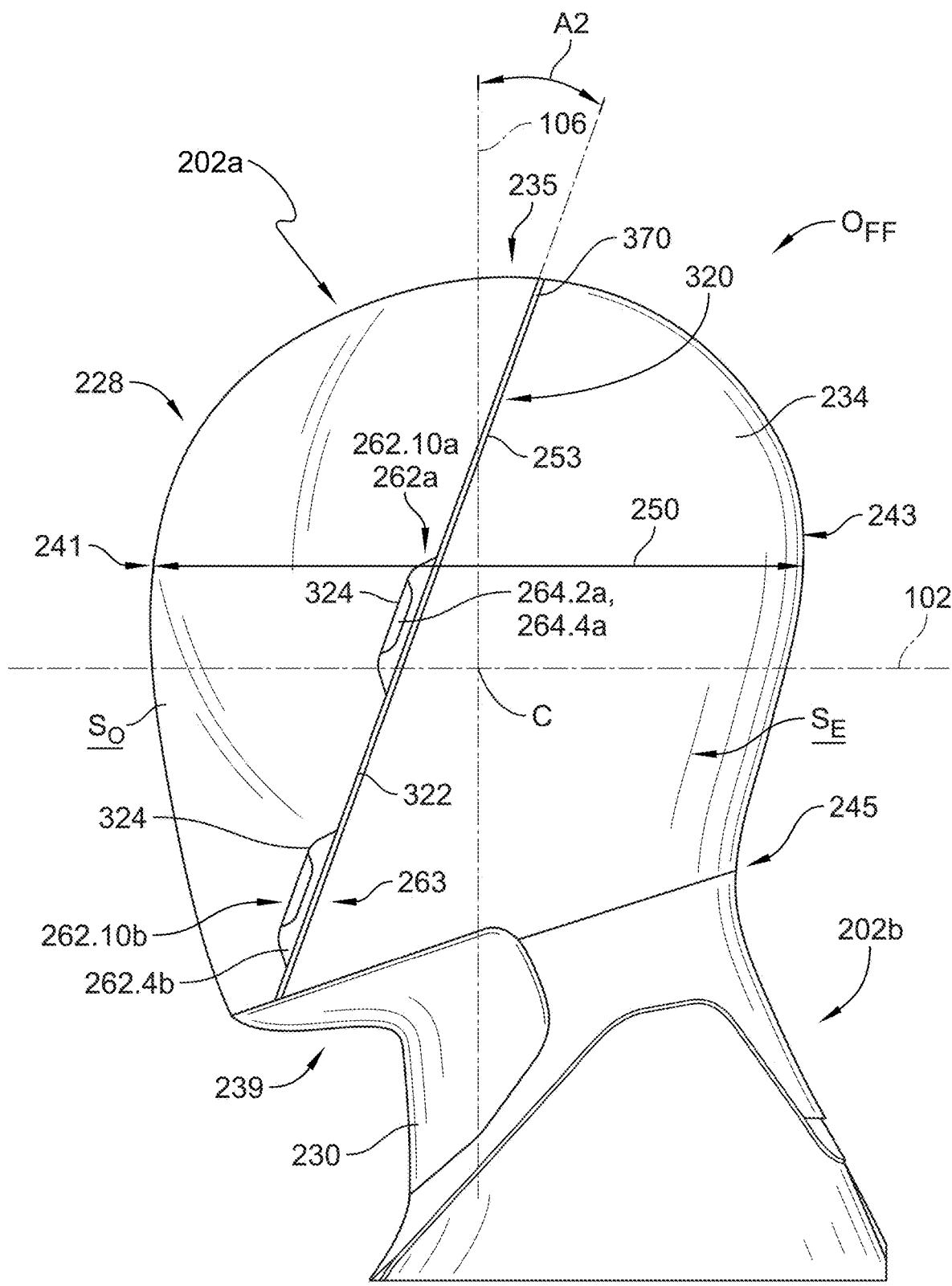
FIG. 5A is a side view of the head and neck assembly of FIG. 3.

Except for the recesses 324, the rear facing edge 322 of the frontal shell 228 is substantially planar along the interface 320. The shield interface 320 between the intermediate cover 252 and the frontal shell 228, and the rear-facing edge 322, extends at an angle A2 to the third plane 106 as shown in FIGS. 5, 15, 31, and 57. In the illustrative embodiment, the angle is within a range of about 15 degrees to about 50 degrees, preferably between 20 and 40 degrees, most preferably between 25 and 35 degrees, and may be approximately 30 degrees. This angle relationship provides the frontal shell 228 with a larger depth at a top end thereof to increase a volume of the second sub-volume 238 and provide more room for components of the electronics assembly 222. An upper end of the frontal shell 228 near an upper extent of the head portion 202a is located rearward of the third plane 106 while a lower end of the frontal shell 228 near a chin region 355 is located forward of the third plane 106 as shown in FIG. 5A. There are no recesses formed in the frontal shell 228 in the orbital region 368, the nasal region 357, the oral region 366, or the frontal region 362. The frontal shell 228 extends upward from an extent of the rear shell 234 that is positioned in the chin region 355, over a majority of the facial region, and into/beyond a frontal edge of the parietal region 360. The frontal shield 228 has an outer surface occupying at least an orbital region 368 and a nasal region 357. The orbital region 368 of the frontal shield 228 is not recessed in comparison to the nasal region 357 of the frontal shield 228.

The depth change of the frontal shell 228 positions a first light emitting assembly 264a and a third light emitting assembly 264c above and rearward of a second light emitting assembly 264b and a fourth light emitting assembly 264d. Such an arrangement provides a greater viewing area for users to observe at least one light emitting assembly 264 when positioned at different orientations to the robot 100. In other embodiments, the first and third light emitting assemblies 264a, 264c may not be positioned rearward of the second and/or fourth light emitting assemblies 264b, 264d. Instead, second and/or fourth light emitting assemblies 264b, 264d may be positioned in the same vertical plane, and/or may be positioned rearward of the first and third light emitting assemblies 264a, 264c.

The frontal shell 228 may: (i) wrap from the front of the head into the side regions of the head, (ii) extend into the chin area or cover the entire chin area, (iii) may have a non-uniform rear edge, which is formed by a plurality of recesses. The plurality of recesses may be configured to receive an extent of the peripheral protrusions 262a, 262b, 262c, 262d.

The frontal shell 228 may not extend to the crown of the head and/or may not extend rearward past a location where a human's ears would be located. The disclosed frontal shell may occupy between 50% and 25% of the head portion 202a and may be curved in at least two directions (e.g., vertically and horizontally). In some embodiments, the frontal shell 228 and the display 300 may be integrated into a single component or may be formed from a plurality of components. The frontal shell 228 may have a different curvature than the display 300.

As shown in FIG. 14, the frontal shell 228 has, at least: (i) a first arc length at a first location or horizontal plane 120, a second arc length at a second location or horizontal plane 122, (iii) a third arc length at a third location or horizontal plane 124, and (iv) a fourth arc length at a fourth location or horizontal plane 126. Frontal shell is concave relative to the display 300 at each location 120, 122, 124, 126 such that the frontal shell extends at least partially about the display 300. The first arc length occurs below the display 300. The second arc length occurs at the center C of the head portion 202a, is aligned with the display 300, and is greater than the first arc length. The third arc length occurs above the display 300, and is greater than the second arc length. The fourth arc length occurs above the third arc length and the display 300 and is less than the second and third arc lengths. As shown in FIG. 4, the frontal shell 228 has, at least: (i) a first width W1 at a first location below the first or horizontal plane 120, a second width W2 at a second location or at the horizontal plane 102, and (iii) a third width W3 at a third location above the first plane 102. The first width is less than both the second and third widths, the second width is greater than both the first and third widths, and the third width is greater than the first width, and less than the second width.

iv. Rear Shell

Figure 5B:
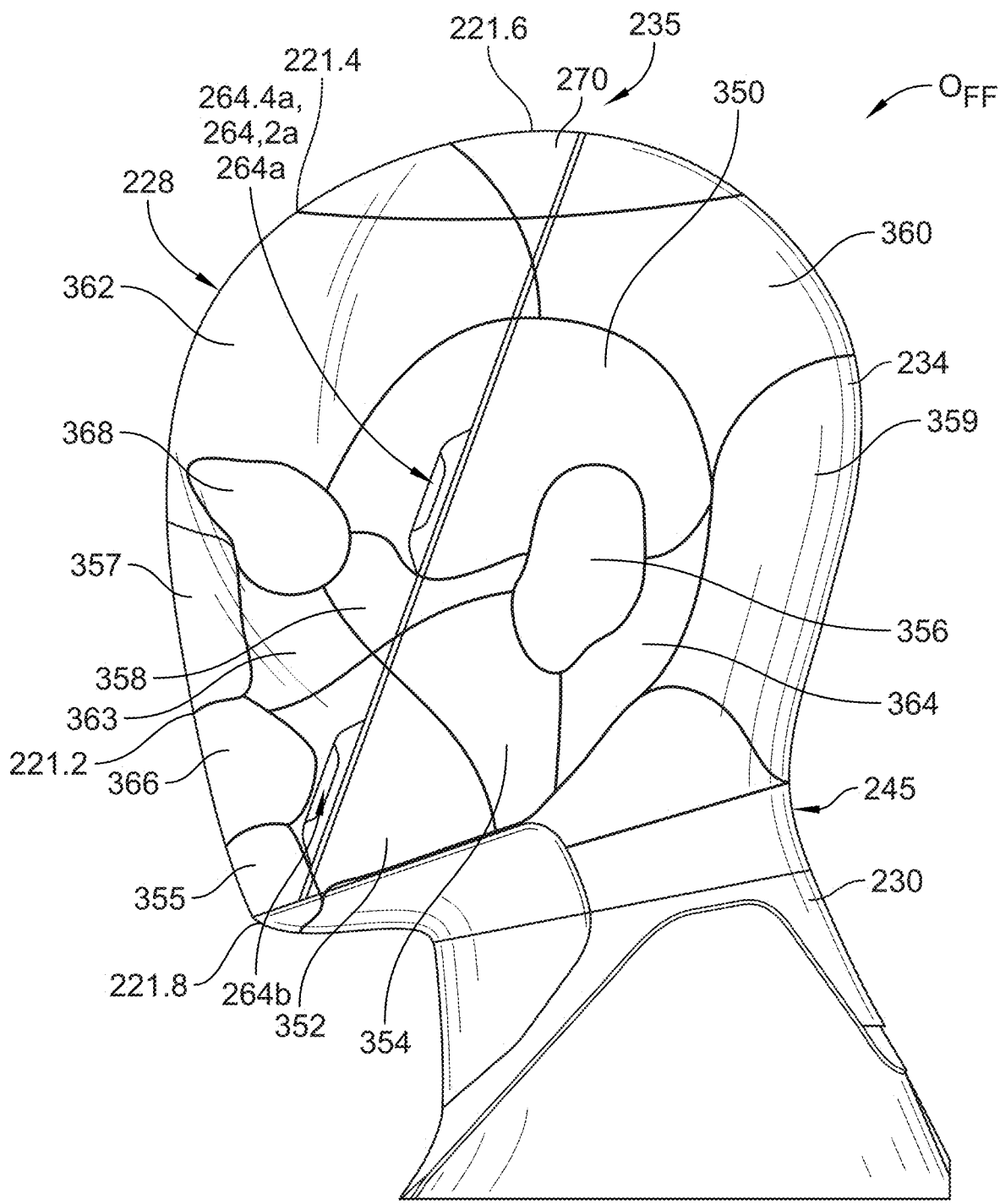
FIG. 5B is a side view of the head and neck assembly of FIG. 3 showing various anatomical regions of the head.
Figure 6:
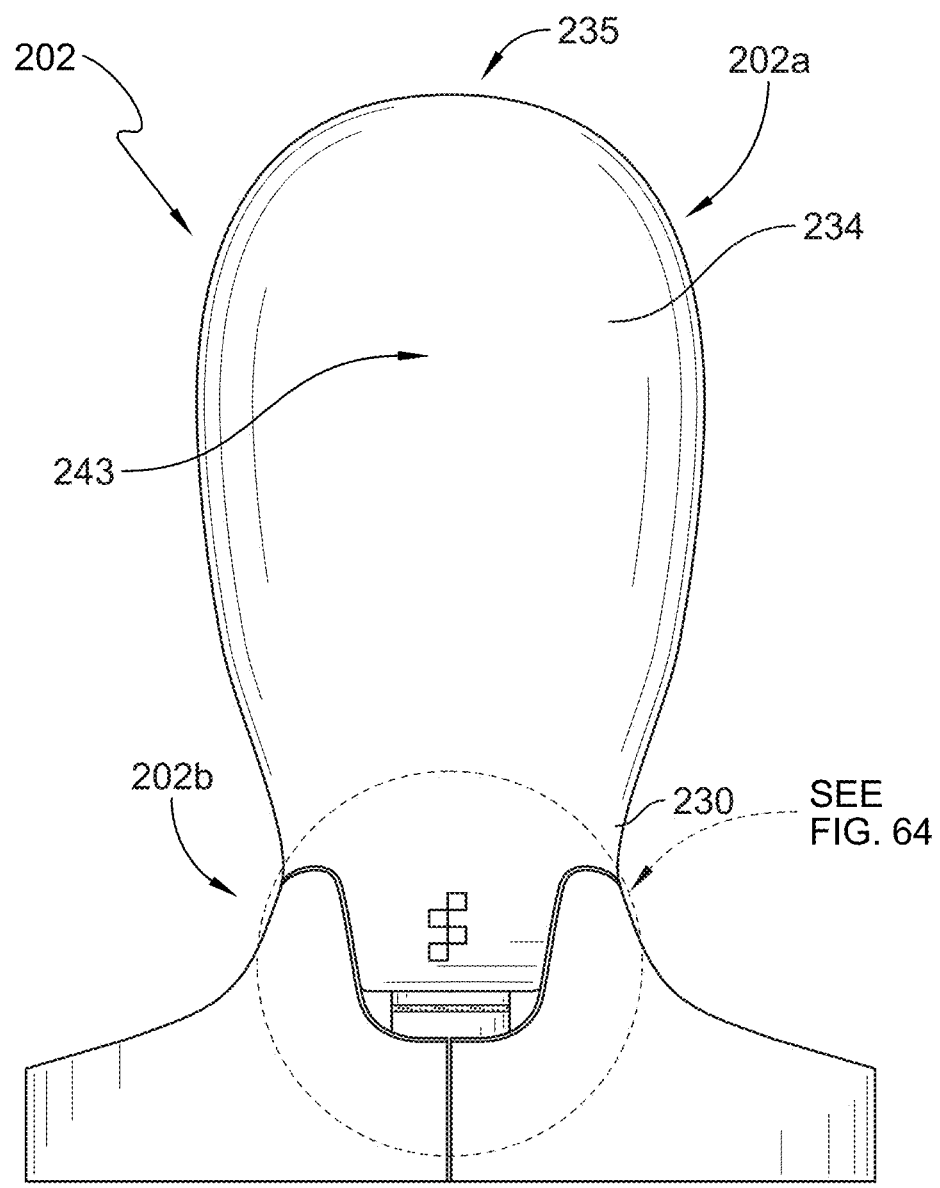
FIG. 6 is a rear view of the head and neck assembly of FIG. 3.
Figure 15B:
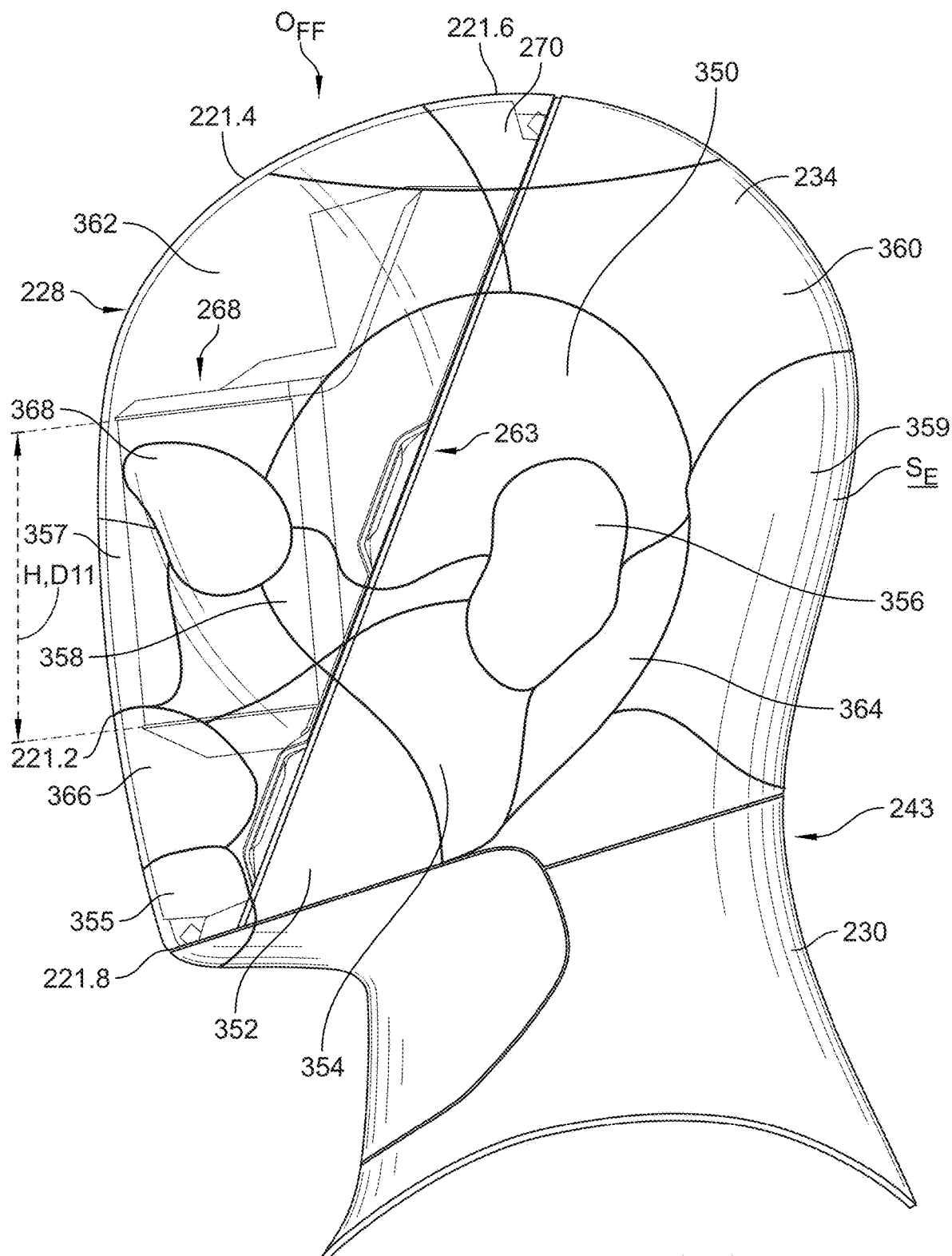
FIG. 15B is a side view of the head and neck assembly of FIG. 12 showing various anatomical regions of the head.

The rear shell 234 is shaped to resemble the curvature of a rear and sides of the head, or at least portions of a parietal region 360, an occipital region 359, a temporal region 350, an auricular region 356, a zygomatic region 358, a mastoid region 364, a buccal region 352, and a parotid region 354. As shown in FIGS. 5B and 15B, the interface region 320 between the rear shell 234 and the frontal shell 228 passes through the buccal region 352, the parotid region 354, the zygomatic region 358, the temporal region 350, the parietal region 360, and the crown region 270. In other words, the rear shell 234 begins at the parotid region 354, the zygomatic region 358, the temporal region 350, the parietal region 360, and the crown region 270 and forms all portions of the head portion 202a rearward thereof. Likewise, the frontal shell 228 begins at the parotid region 354, the zygomatic region 358, the temporal region 350, the parietal region 360, and the crown region 270 and forms all portions of the head portion 202a forward thereof except for a chin region 355 which is included in the rear shell 234. Also, it should be understood that the frontal shell may only be positioned forward of the auricular region 356.

The rear shell 234 is configured to cover a rear portion of the electronics assembly 222 and to form a rear end of the head portion 202a. The rear shell 234 extends downward from a top central position and forward at an angle substantially similar to the rear facing edge 322 of the frontal shell 228. The rear shell 234 includes a forward facing edge 298 configured to mate with the rear facing edge 322 of the frontal shell 228 and/or with the intermediate cover 252.

Figure 16:
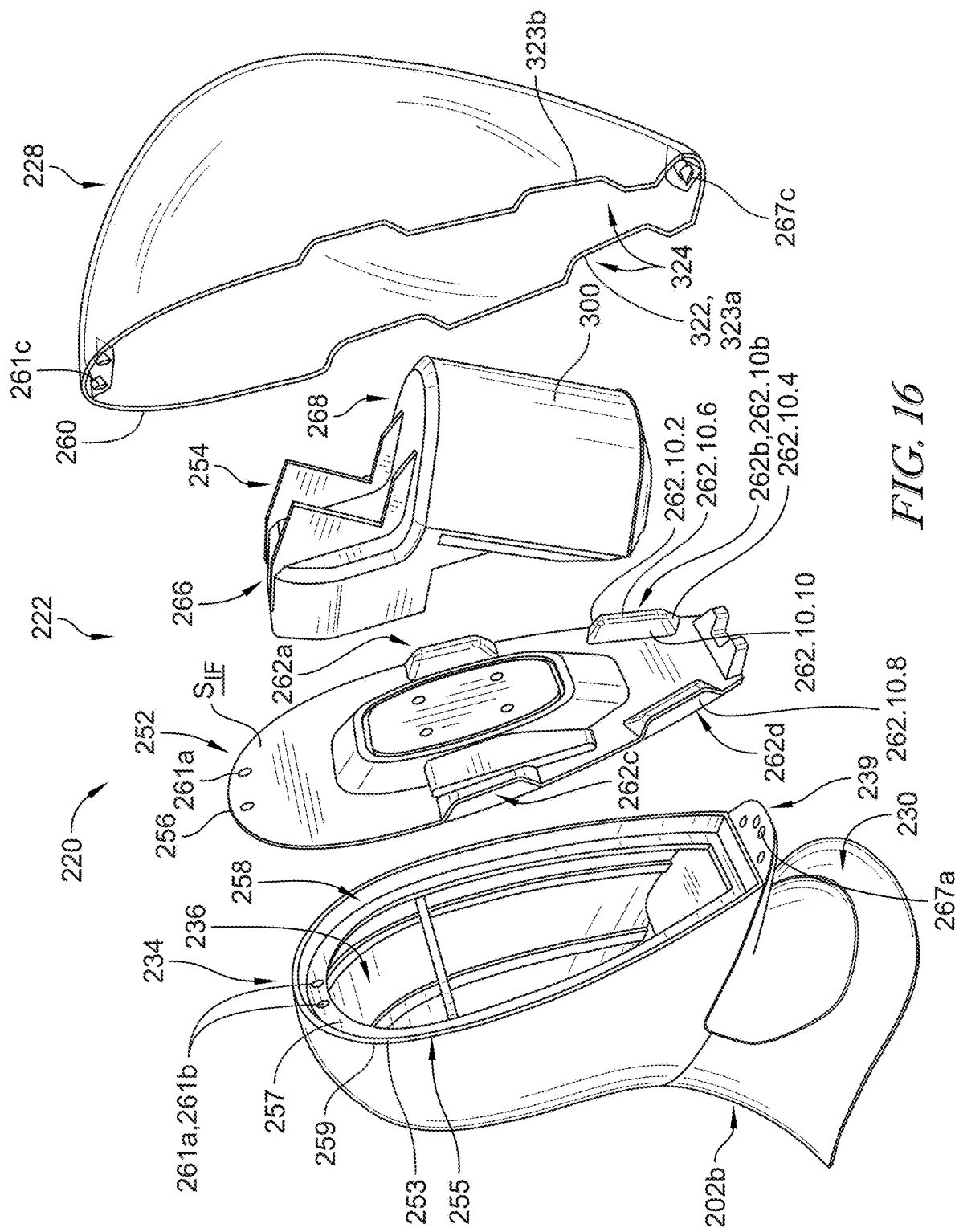
FIG. 16 is an exploded assembly view of the head and neck assembly of FIG. 12 wherein: (i) the head housing assembly includes an electronics support and an intermediate cover, (ii) the display is coupled to the electronic support, and (iii) the light emitters of the illumination assembly are coupled to the intermediate cover.
Figure 18:
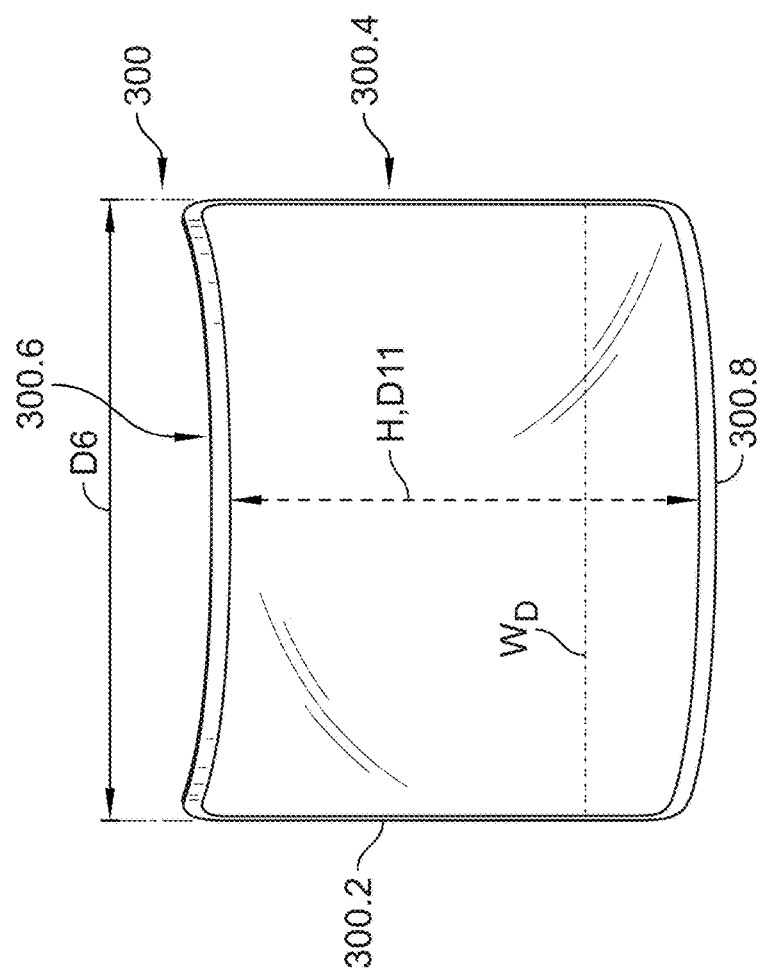
FIG. 18 is a front view of the display of the head and neck assembly of FIG. 12.
Figure 17:
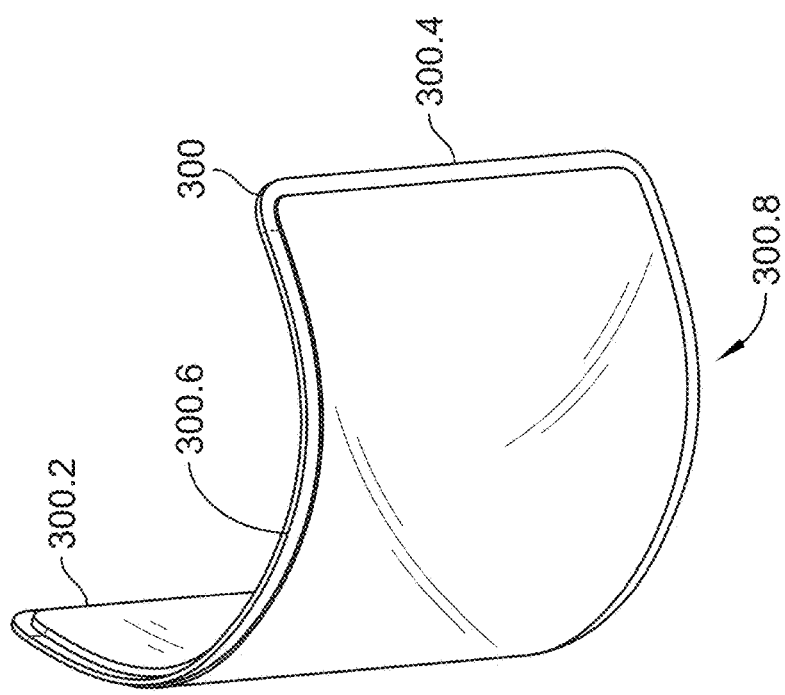
FIG. 17 is a perspective view of the display of the head and neck assembly of FIG. 12.

As shown in FIG. 16, the rear shell 234 has an outer rim 255 and a ledge 257 projecting inwardly from the outer rim 255 and located in the first sub-volume 236. The rim 255 may have a slightly larger outer perimeter 259 than the outer perimeter 256 of the intermediate cover 252 to allow the intermediate cover 252 to fit within the rim 255 and engage the ledge 257. The ledge 257 and the intermediate cover 252 have corresponding attachment holes 261a, 261b that receive a fastener to mount the intermediate cover 252 to the rear shell 234. Apertures 261c formed in the frontal shell 228 also receive a fastener to mount the frontal shell 228 to both the intermediate cover 252 and the rear shell 234.

The rear shell 234 further includes a chin projection region 263 that extends forward from the rim 255 and defines a lower end of the rear shell 234. The intermediate cover 252 further includes a lower mount 265 that engages and rests on the chin projection region 263. The chin projection 263 and the lower mount 265 each include corresponding attachment holes 267a, 267b that receive a fastener to secure the intermediate cover 252 to the rear shell 234 at a lower end thereof. Apertures 267c formed in the frontal shell 228 also receive a fastener to mount the frontal shell 228 to both the intermediate cover 252 and the rear shell 234.

The rear shell 234 silicone elastomers, thermoplastic polyurethane (TPU), shape-memory polymers (SMPS), polydimethylsiloxane (PDMS), polyurethane, liquid silicone rubber (LSR), urethane rubber, vinyl (PVC) skin, soft thermoplastic elastomers (TPE), elastomeric alloys, acrylonitrile butadiene styrene (ABS) blends, high-density polyethylene (HDPE) blends, conductive polymers, carbon nanotube-infused elastomers, magnetic shape-memory alloys, electroactive polymers (EAPS), styrene-butadiene rubber (SBR), thermoplastic vulcanizates (TPV), polyurea elastomers, medical-grade synthetic skin materials, thermoplastic olefins (TPO), fluoroelastomers, chloroprene rubber, ethylene propylene diene monomer (EPDM) rubber, polyacrylamide hydrogels, polycaprolactone (PCL), photocurable resins, elastomeric composites, phosphorescent elastomers, thermochromic materials, electrostrictive polymers, piezoelectric polymers, superelastic alloys, microcellular foams, hyperelastic materials, viscoelastic gels, nanocomposite elastomers, fabrics, metal, other similar plastics or polymers, any combination of the above, and/or any other similar material known in the art. The rear shell 234 may be manufactured using any known method, including: molding (e.g., injection or dip), casting, 3D printing (additive manufacturing), dip molding and coating, spray coating, lamination and layering, electrospinning, sculpting and machining, thermoforming, any combination of the above, and/or any other known method.

Electronics Assembly

The electronics assembly 222 contained in the head portion 202a may include one or more of: (i) a sensor assembly, (ii) a display 300, (iii) a directional microphone, (iv) one or more speakers, (v) antennas, (vi) illumination assembly that includes at least one, and preferably a plurality of, light emitting assembly 264, (vii) a data storage device, and (viii) other electronics (e.g., IMU, RFID reader, location sensors (e.g., Global Positioning System ("GPS"), GLONASS, Galileo, QZSS, and/or iBeacon), etc.), and/or PCBs for connecting the electronics. The data storage device may be a removable memory device or integrated in a computing device comprising a processor and a memory. In some examples, the data storage device may be housed in another portion of the robot 100, such as the torso. In some examples, the data storage device may be configured to store data collected from other components of the robot 100.

As shown in at least FIGS. 19-20, the components of the electronics assembly 222 may be mounted to the electronics support 254 and located above the display 300, to an internal mounting frame supporting the head and neck assembly 202 on the torso 204, or to any other structure of the head and neck assembly 202. Mounting the electronics assembly 222 to the electronics support 254 above the display 300 and within the second sub-volume 238 may arrange the individual items in a space-saving manner and leave other areas of the head and neck assembly 220 open for storage of other components that do not need direct access to areas outside of the robot 100 such as sensors, cameras, displays etc. As noted above, the housing assembly 220 is configured to enclose the electronics assembly 222 without interfering with the transmission or reception of signals. For example, the housing assembly 220 does not obscure the line of sight of the sensors.

v. Display

As best shown in FIGS. 17-25, the display 300 of the electronics assembly 222 may be mounted to the electronics support 254 and positioned behind the frontal shell 228. The display 300 is operatively connected to at least one processor to generate and display status messages and other information on the display 300. For example, the display 300 may display information: (i) related to the robot's state (e.g., working, error, moving, etc.), (ii) obtained from sensors contained within the head assembly 202a, or (iii) received from other processors in communication with the display 300 (e.g., other internal processors housed within the robot or external information transmitted and received by the robot). The information may be displayed in the format of blocks, well-known shapes, logos, or other moving items (e.g., thought bubbles). However, the information may not be displayed in connection with human facial features (e.g., eyes, mouth, nose).

As shown in FIGS. 17-25, the display 300 may have a substantially rectangular display surface that has a convex curvature that conforms with the curvature of frontal shell 228 of the housing assembly 220. The display 300 may be slightly tilted downward. For example, the display 108.4 may be tilted from a horizontal plane at an angle of about 5.7 to about 8.6 degrees, or about 6.4 to about 7.9 degrees. The tilted display increases viewability and helps eliminate reflections. The display may use any known technology or feature including, but not limited to: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or display feature. The displays disclosed herein meet the standards described in FDA CFR Title 21 part 1040.10, titled Performance standards for Light-Emitting Products, and ANSI LIA Z136.1, titled Safe Use of Lasers, at the time of filing this application, both of which are incorporated herein by reference.

It should be understood that this application contemplates the use of displays that have different sizes. To this end, the display may extend between any two lines shown in FIGS. 22 and 23. For example, the display may extend between the third from the bottom line to the third line from the top. In other examples, the display may be between any two lines shown in FIGS. 24 and 25. Additionally, each of the lines on the display 300 in FIGS. 22-24 can represent different zones included in the display 300 and used to convey different images or other visual representations across the display 300. As an example, sides of the display 300 can be used to display a different image or visual representation compared to a front of the display 300. Alternative display sizes may be used to: (i) reduce the surface area of fragile elements within the robot, (ii) because the robot is not designed to work near humans, (iii) additional area within the head is needed for sensors or other electronics, or (iv) any other reason known by one of skill in the art.

Figure 50:
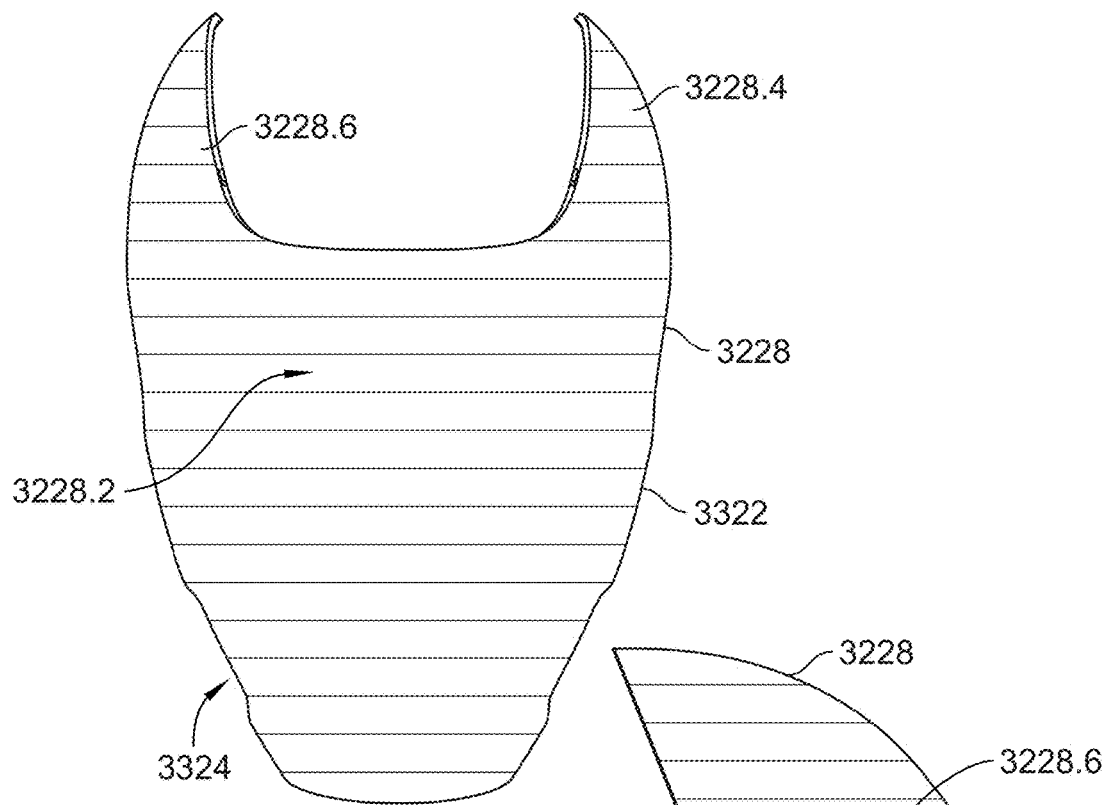
FIG. 50 is a front view of the frontal shell with a plurality of zones in a horizontal arrangement relative to one another.
Figure 51:
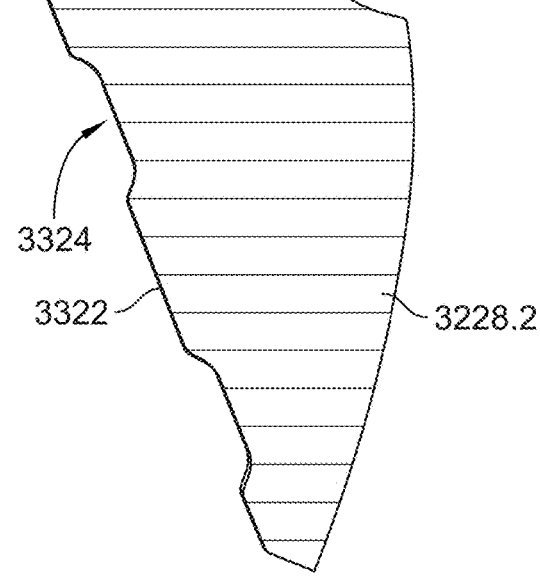
FIG. 51 is a side view of the frontal shell of FIG. 50.
Figure 52:
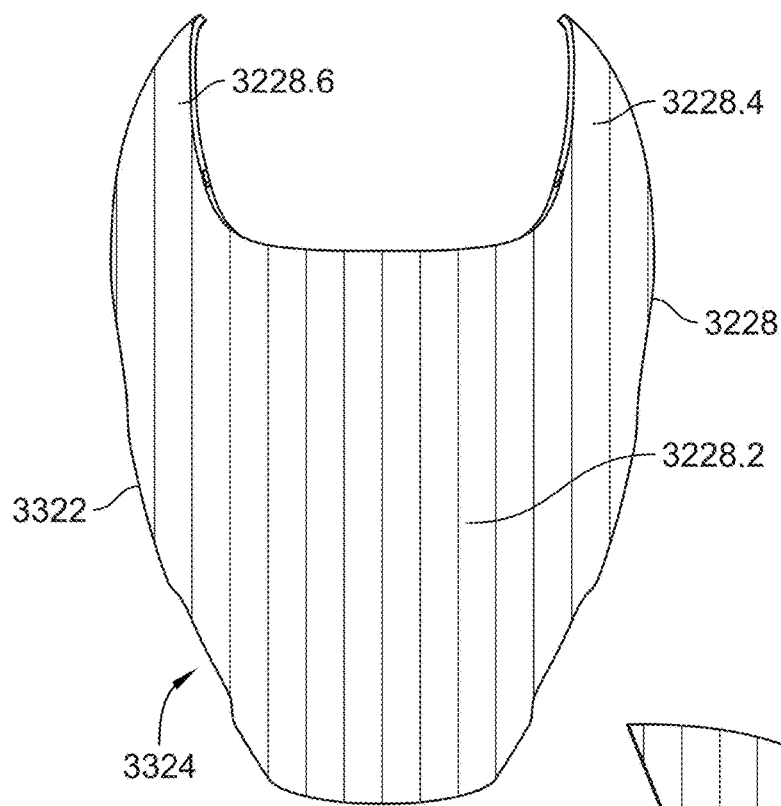
FIG. 52 is a front view of the frontal shell with a plurality of zones in a vertical arrangement relative to one another.
Figure 53:
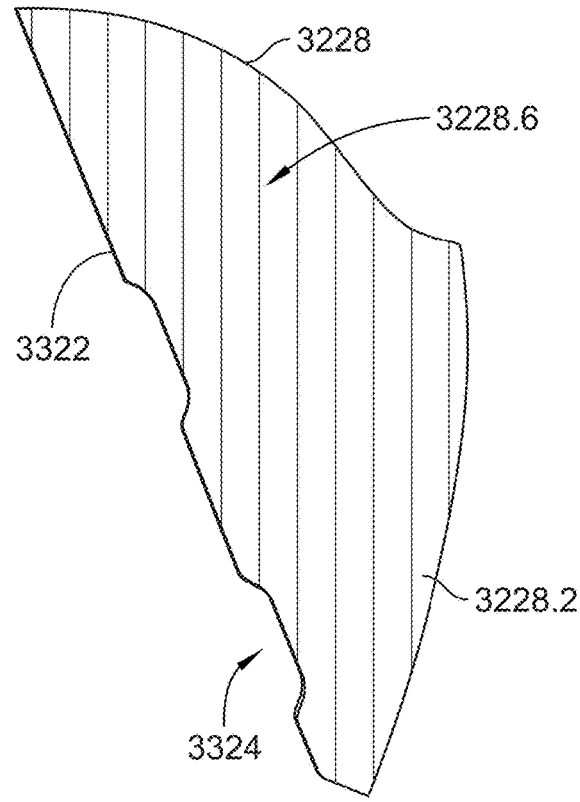
FIG. 53 is a side view of the frontal shell of FIG. 52.
Figure 54:
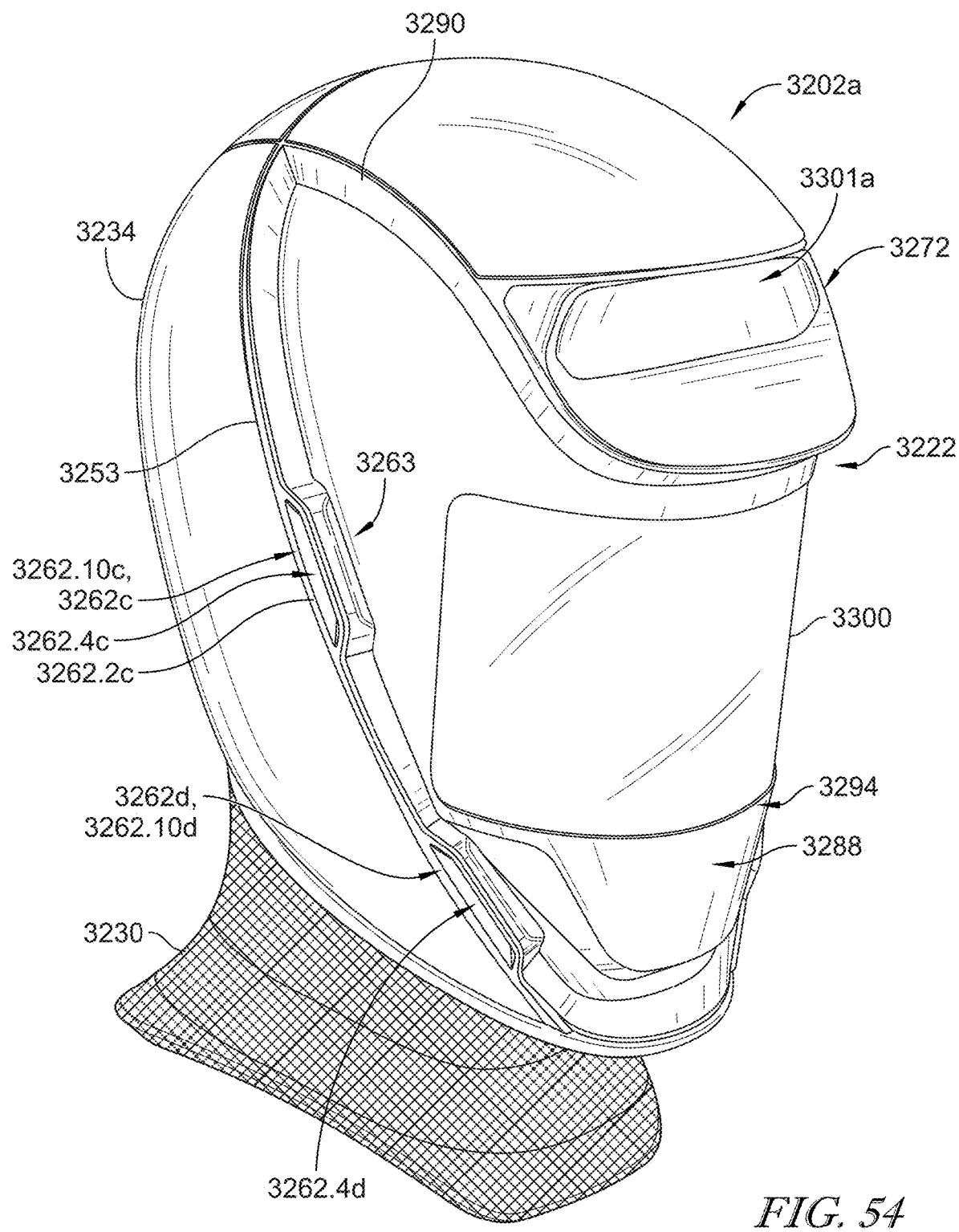
FIG. 54 is a perspective view of the third embodiment of the head and neck assembly wherein the frontal shell is omitted from the housing assembly to further show the display positioned within said head assembly.
Figure 55:
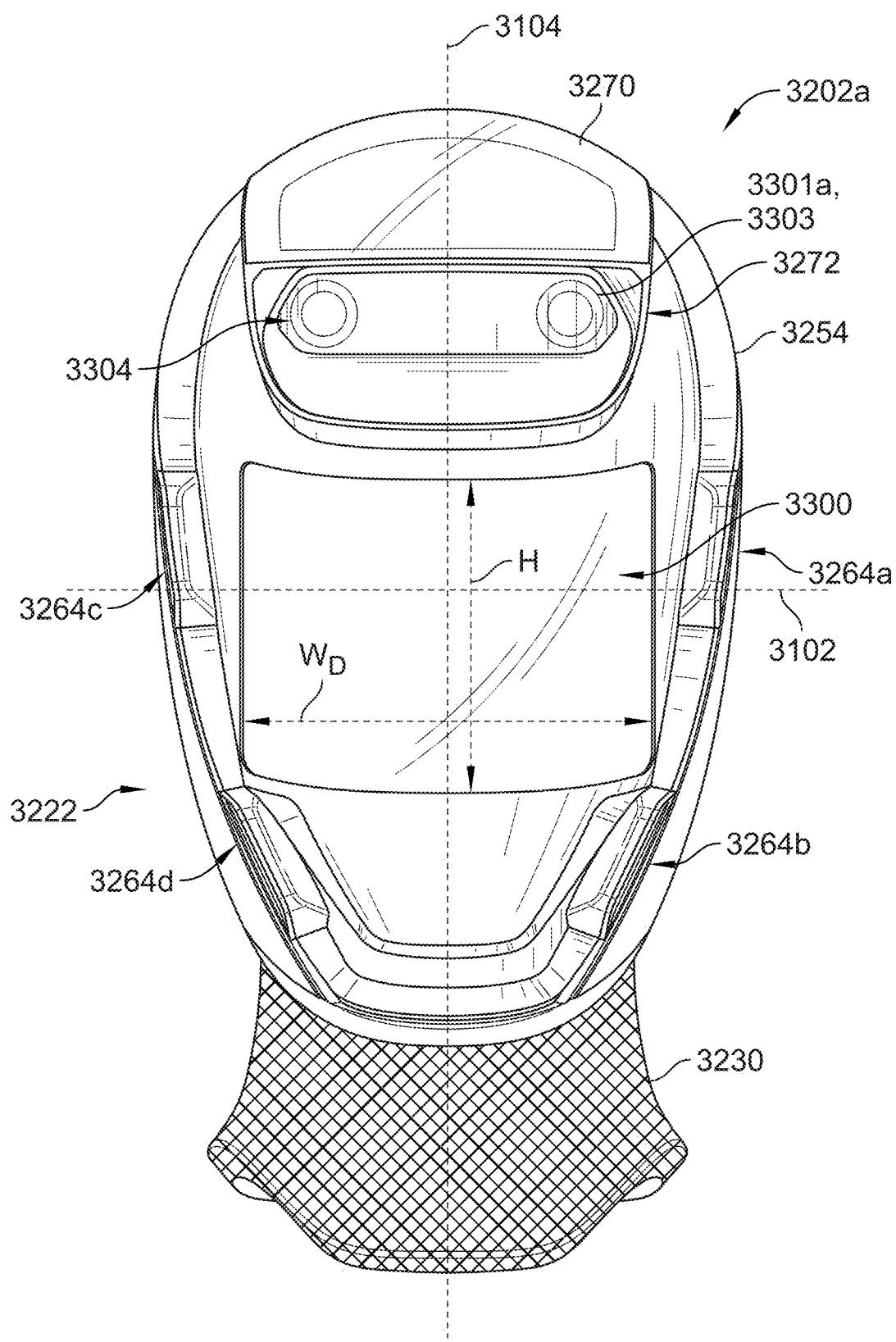
FIG. 55 is a front view of the head and neck assembly of FIG. 54.

The disclosed display may be embedded in or occupy the entire frontal shell 228, between 100% and 75% of the frontal shell, between 75% and 50% of the frontal shell, between 50% and 25% of the frontal shell, or less than 25% of the frontal shell. In some examples, the display may utilize the full frontal shell 228. In some examples, the display may be between any two lines shown in FIGS. 50-51. In some examples, the display may be between any two lines shown in FIGS. 52-53. In other words, the display size to the frontal shell size may be any ratio. The display may be curved in a single direction, in two directions (e.g., vertically and horizontally), or a freeform design that may include multiple curves. In certain embodiments, the frontal shell and the display may be integrated into a single unit.

As shown in FIG. 15B, the display 300 is curved so as to coincide with and display information through all or portions of the orbital region 368, the frontal region 362, the temporal region 350, the zygomatic region 358, the nasal region 357, the infraorbital region 363, the buccal region 352, and the oral region 366. The display 300 may not coincide with any region rearward of the interface 320 including a mental region 355, an auricular region 356, a crown region 270, a parietal region 360, an occipital region 359, or a mastoid region 364. In other embodiments, the display 300 may present information, indications, or visual representations across: (i) the entire frontal shell 228, (ii) a majority of the frontal shell 228, (iii) the entire facial region 241, and/or (iv) a majority of the facial region 241. In contrast, in other embodiments, the display 300 may be omitted or moved to a different region (e.g., torso) of the robot.

FIGS. 9A-9G show various statuses and corresponding indications or visual representations that are contemplated by this disclosure. It should be noted that the present disclosure is not limited to these statuses and corresponding indications or visual representations and that these are merely examples that can be displayed by the display 300.

Figure 9A:
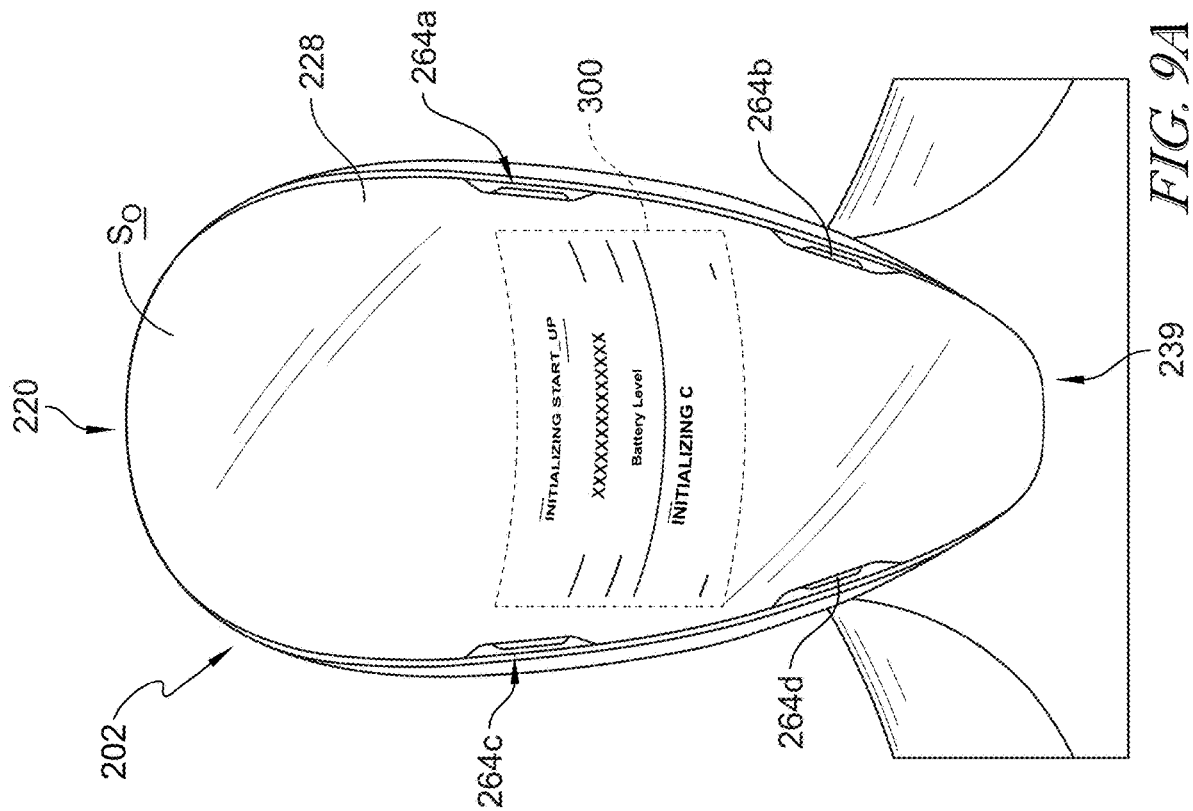
FIG. 9A is a front view of the head and neck assembly of FIG. 3 showing a second set of information displayed on an/or through the frontal shell.
Figure 8:
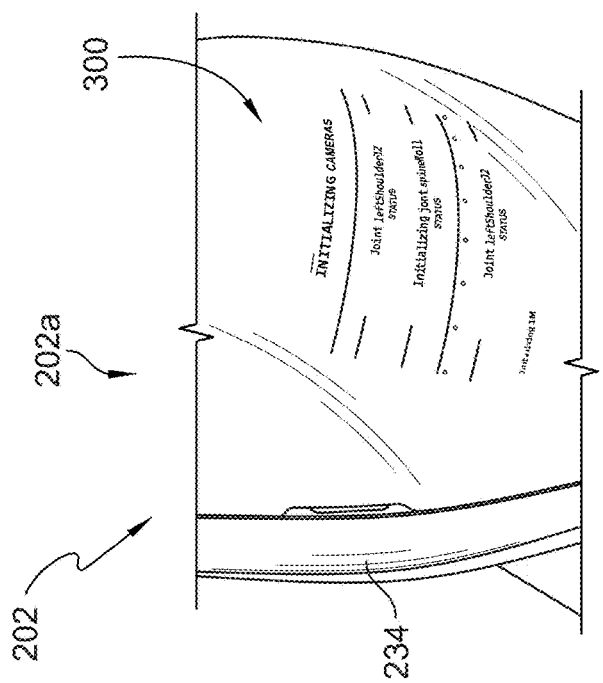
FIG. 8 is a partial perspective view of the head and neck assembly of FIG. 3 showing a first set of information displayed on and/or through the frontal shell.

FIGS. 8 and 9A show a sets of information displayed by display 300 including device status (e.g. camera status and robot start-up status), robot part status (e.g. a specified joint status), and a battery level status. The various statuses disclosed herein can update as the status changes. For example, during start-up of the camera, the display 300 may display text, an icon, or another visual representation indicating that the camera is initializing and is not ready for use. The status can change to display an icon, or another visual representation indicating that the camera is active when start-up is complete.

Figure 9C:
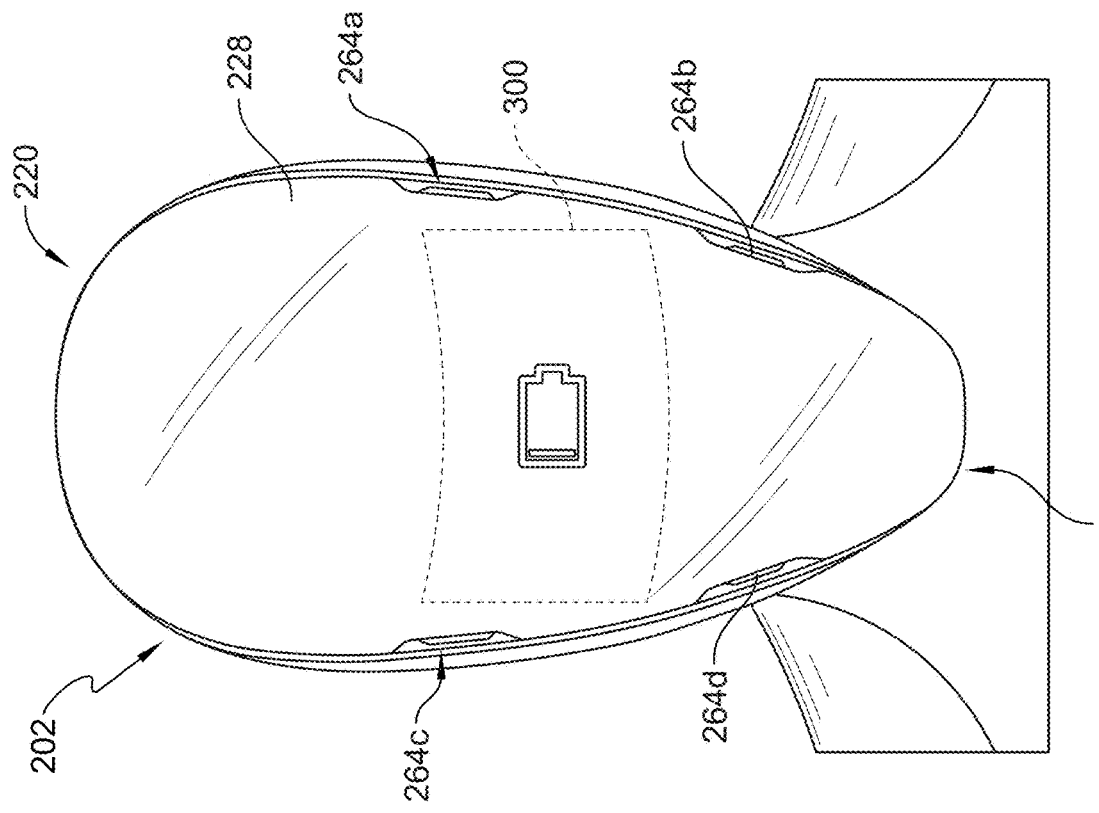
FIG. 9C is a front view of the head of the robot showing another icon indicating a low battery status on an/or through the frontal shell.
Figure 9B:
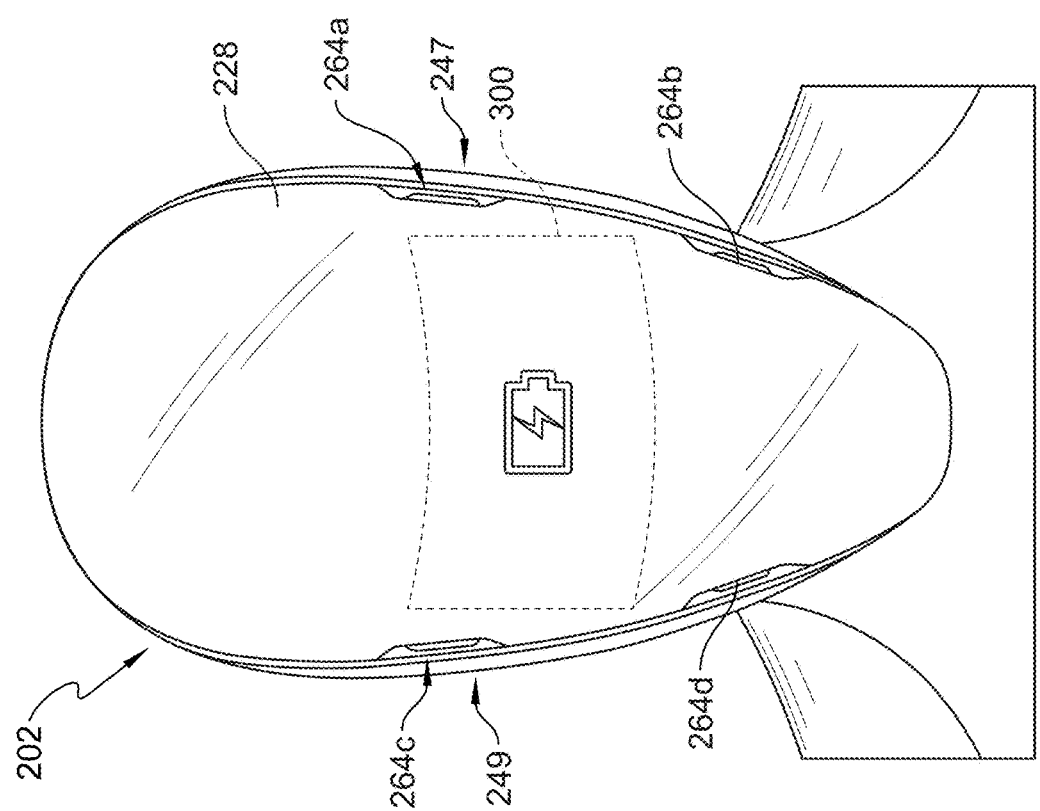
FIG. 9B is a front view of the head of the robot showing an icon indicating a battery status on an/or through the frontal shell.

FIG. 9B shows an icon indicating a battery status. The icon is generally in the shape of a battery. The icon further includes a lightning bolt to indicate that the battery is charging. The icon(s) can be displayed in a first color (e.g. green) while the battery is charging and/or after the battery is fully charged. FIG. 9C shows another icon indicating an additional battery status, icon is generally in the shape of a battery and includes a level marker to indicate battery charge level. In the illustrative embodiment of FIG. 9C the level marker is a thin line to one side of the battery icon to indicate that the battery charge is low and should be recharged. The level marker can move or increase in size to indicate the current battery charge level at any time.

Figure 9D:
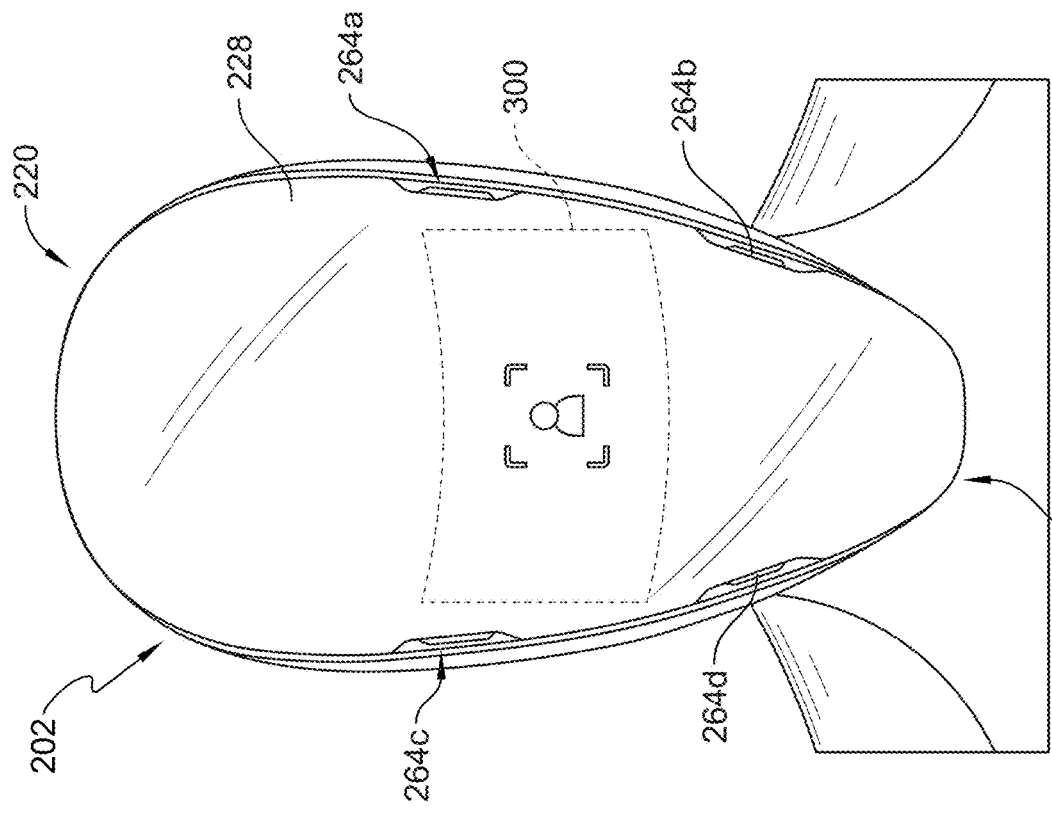
FIG. 9D is a front view of the head of the robot showing another icon indicating an alert or system failure event on an/or through the frontal shell.
Figure 9E:
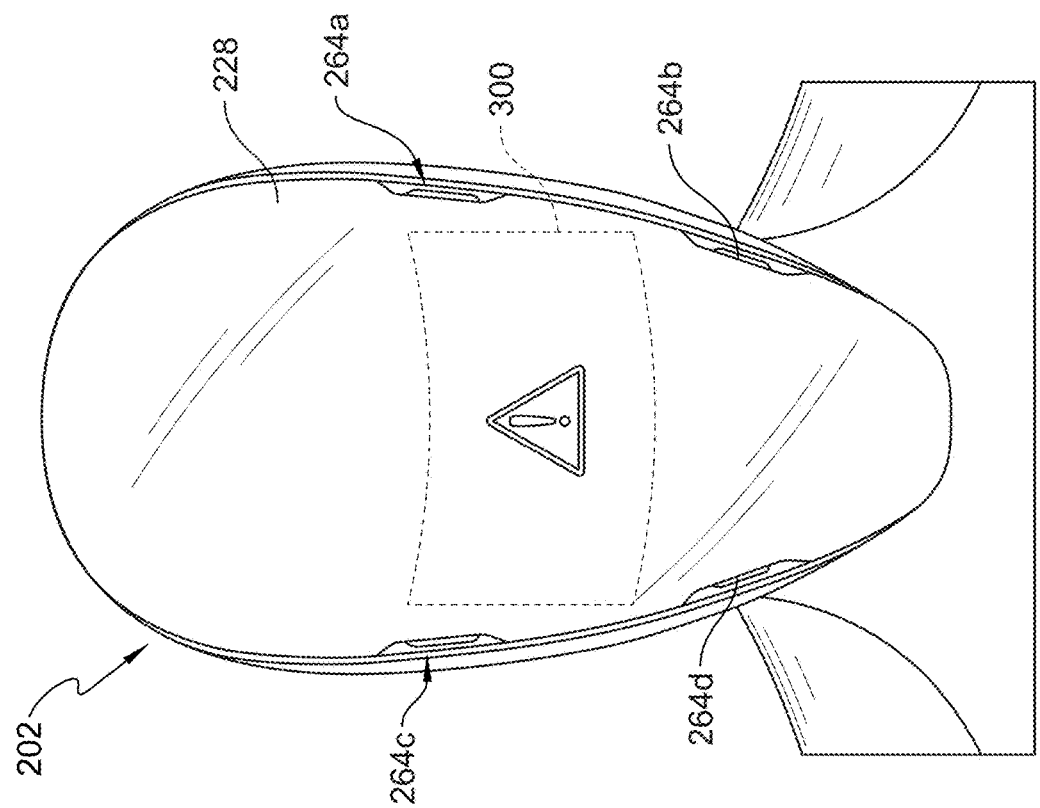
FIG. 9E is a front view of the head of the robot showing an icon indicating a particular mode of the robot on an/or through the frontal shell.

FIG. 9D shows another icon indicating an alert or system failure event. The icon includes a triangle with an exclamation mark within to indicate the alert or system failure event. Such an icon may be displayed when a part of the robot 100 has failed, such as an actuator, a camera, or another device included in the robot 100. Identifying information in the form or text or another icon can also be displayed with the alert or failure icon to specify which part of the robot 100 has failed or needs attention. FIG. 9E shows an icon indicating a particular mode of the robot. Illustratively, mode depicted indicates a follow mode in which the robot 100 is engaged in following a user, another device, or another robot. The icon includes a generally human shaped icon with a border around the generally human shaped icon. Other icons corresponding to additional modes of operation of the robot can also be displayed.

Figure 9F:
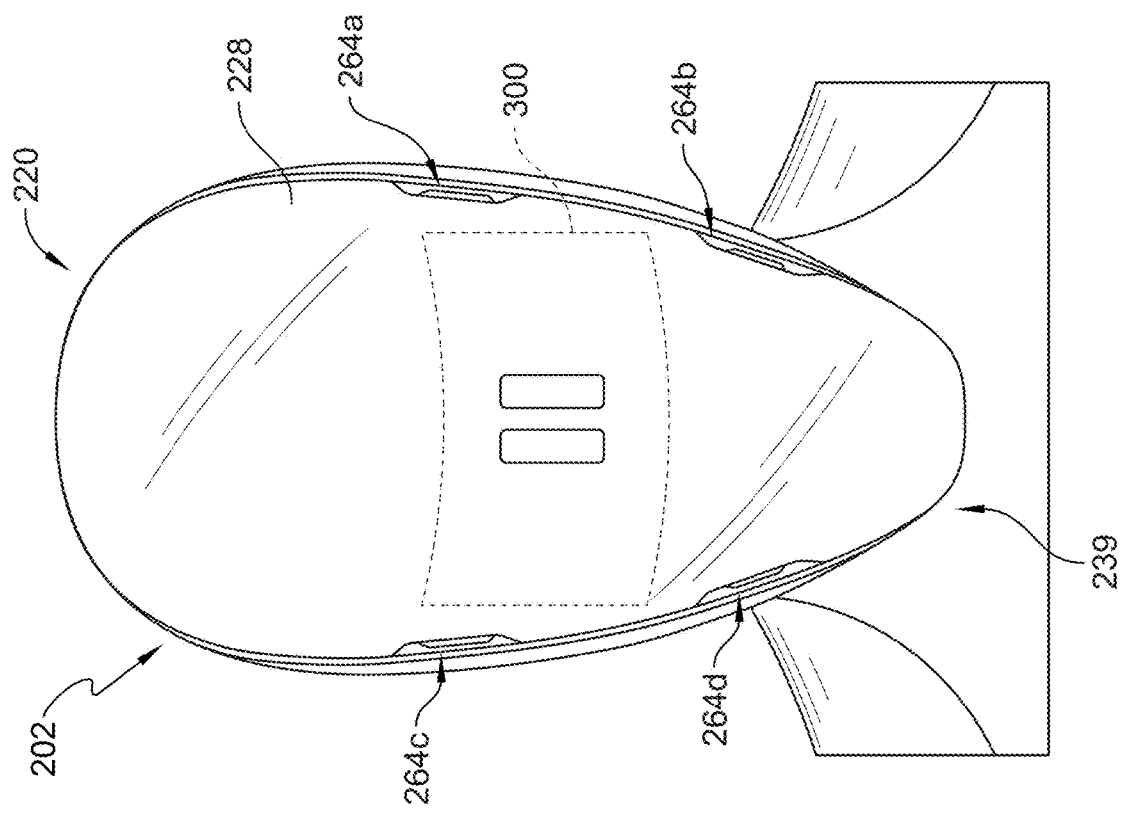
FIG. 9F is a front view of the head of the robot showing an icon indicating a particular task being performed by the robot on an/or through the frontal shell.
Figure 9G:
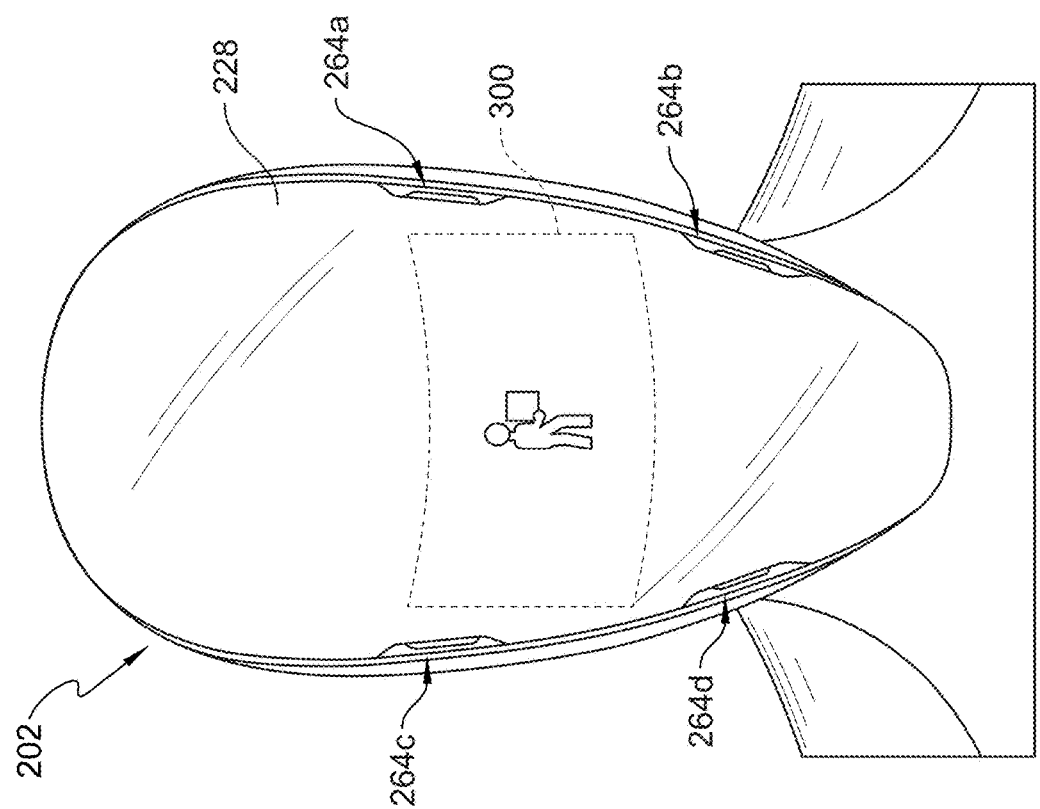
FIG. 9G is a front view of the head of the robot showing an additional robot status icon on an/or through the frontal shell.
Figure 10:
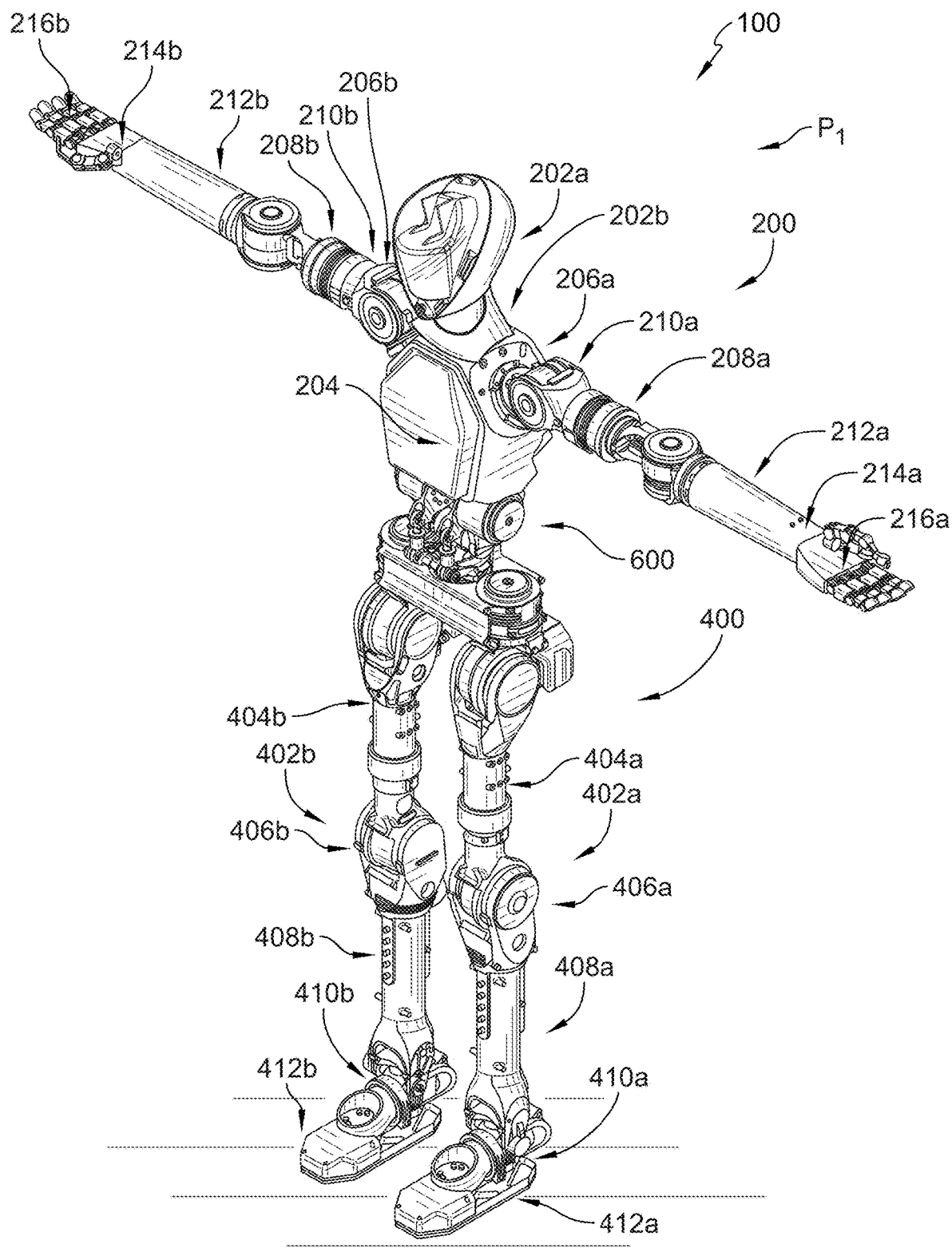
FIG. 10 is a perspective view of a second embodiment of a humanoid robot in an upright standing position P1 with outer covers of the robot removed to expose various actuators and components included in the robot.
Figure 11:
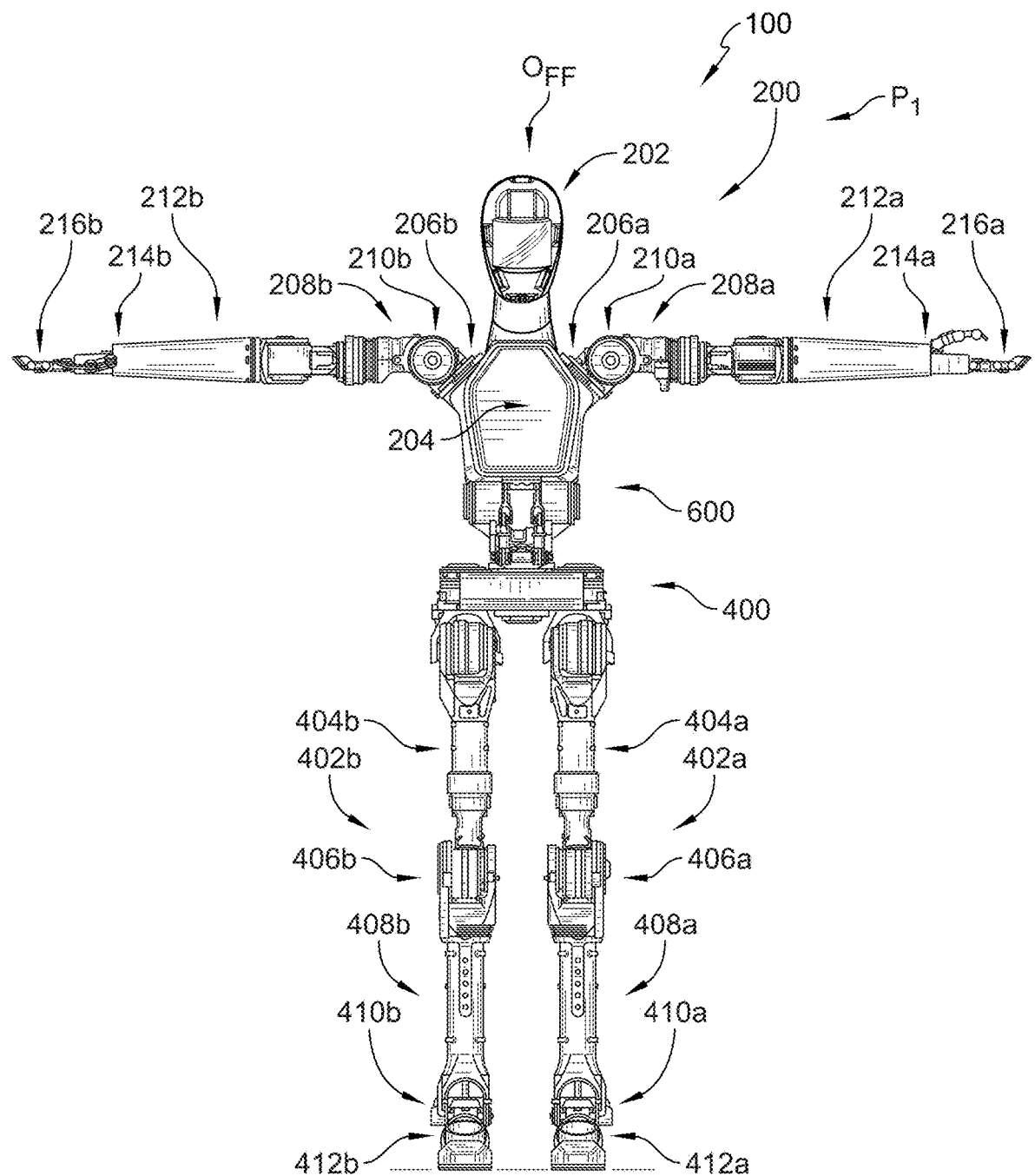
FIG. 11 is a front view of the humanoid robot of FIG. 10.
Figure 13:
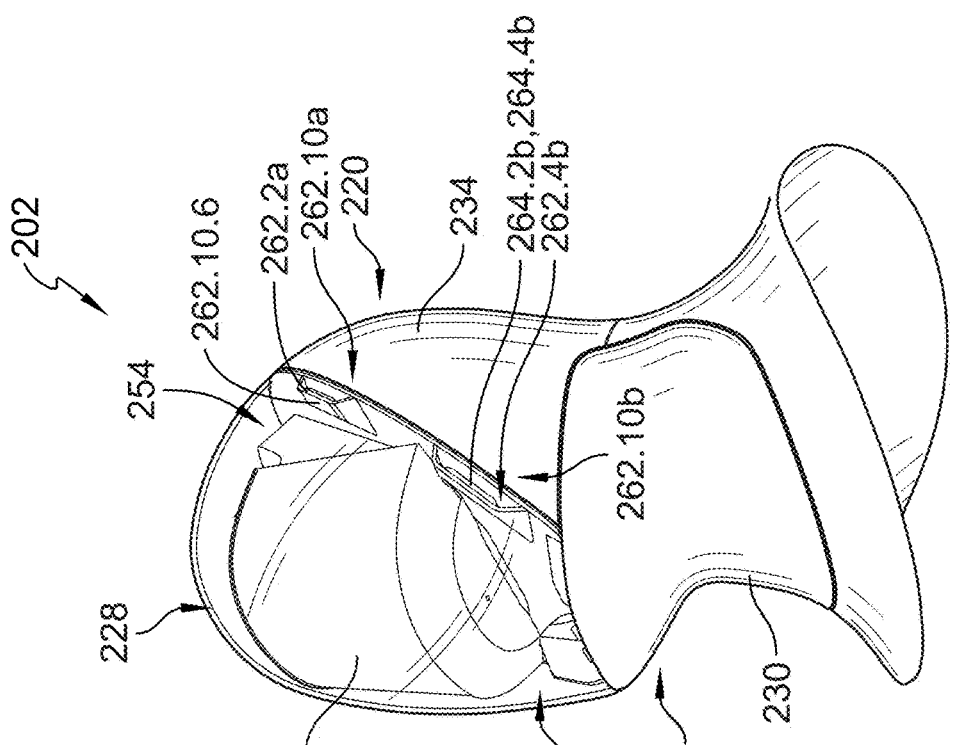
FIG. 13 is a bottom perspective view of the head and neck assembly of FIG. 12.
Figure 12:
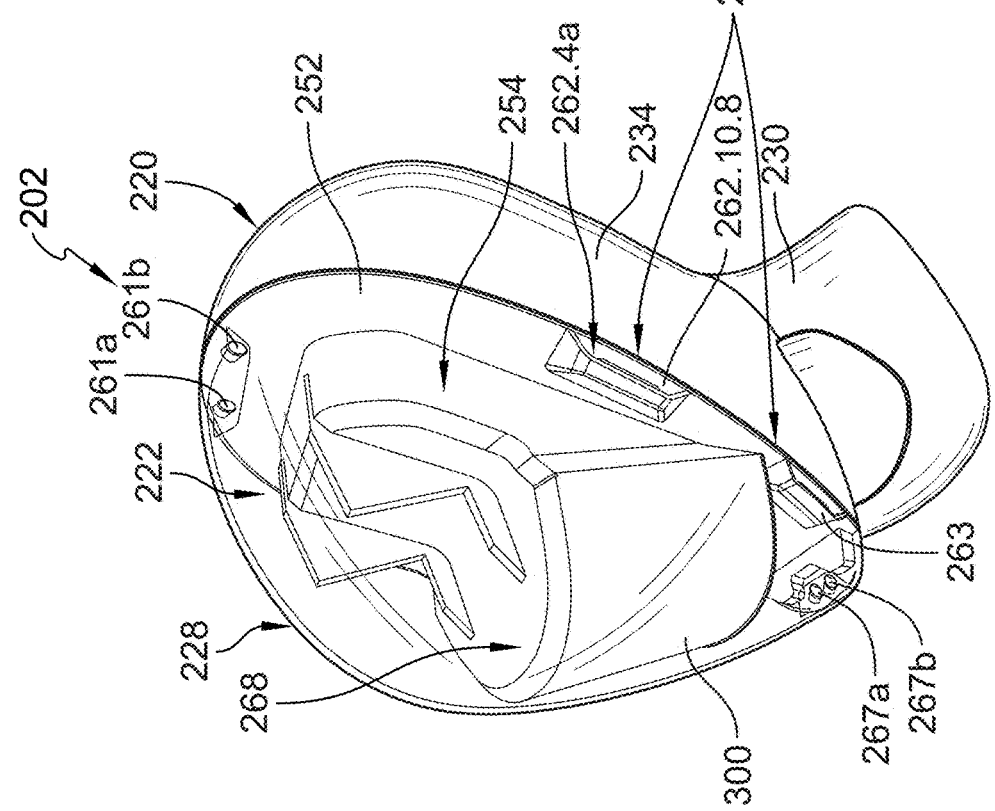
FIG. 12 is a perspective view of the head and neck assembly of FIG. 10, wherein the head electronics assembly further includes a display that is visible through the frontal shell.

FIG. 9F shows an icon indicating a particular task being performed by the robot 100. Illustratively, the task icon depicted is a generally human shaped icon lifting and carrying a box or another item. Other icons corresponding to additional tasks that can be completed by the robot can also be displayed. FIG. 9G shows an additional robot status icon. Illustratively, the status icon depicted is a pause icon. The pause icon can be displayed when the robot 100 is currently not completing any tasks or modes and is ready for instructions. Other icons corresponding to additional robot statuses that can be completed by the robot can also be displayed.

vi. Head Illumination Assembly

The head illumination assembly includes at least one, and preferably a plurality of, light emitting assembly 264 are located on lateral sides of the head portion 202a. In certain configurations, the illumination assembly may be designed to visually indicate robot statuses to users viewing the robot 100 from the side. As shown in FIGS. 5B, 15B, 31B, and 57B, a first light emitting assembly 264a is located in a temporal region 350 of the robot's head portion 202a and a second light emitting assembly 264b is located in a buccal region 352 of the robot's head portion 202a. Third and fourth light emitting assemblies 264c, 264d are located symmetrically on the opposite side of the robot's head, and so are also located in the temporal region 350 and the buccal region 352 respectively. In some embodiments, the light emitting assemblies 264 can be located all or partially in a parotid region 354 of the robot's head portion 202a, an auricular region 356 of the robot's head portion 202a, a zygomatic region 358 of the robot's head portion 202a, a parietal region 360 of the robot's head portion 202a, a frontal region 362 of the robot's head portion 202a, or a mastoid region 364 of the robot's head portion 202a so long as the light emitters 264 are positioned on a lateral side of the robot's head portion 202a so as to be visible to a person standing next to the robot 100. These positions of the light emitting assemblies 264 allow users to view the light emitted from said light emitting assemblies 264 from the side while the robot 100 is working on a task in an assembly line, for example, and while the display 300 is facing the assembly line and may not be entirely visible by the user. Further, the light emitting assemblies 264 may face away from the display 300 so as not to obstruct the information displayed by the display 300 and face away from other sensors so as not to interfere with the sensors. Other regions of the head where the light emitting assemblies 264 are not typically found include a chin or mental region 355, orbital region 368, nasal region 357, coronal region 270, and occipital region 359.

The light emitting assemblies 264 in the head portion 202a may be configured to display a status of the robot 100, or a part thereof, to users. For example, the light emitting assemblies 264 can display a first color (i.e. green) when the robot is engaged in a task, such as assembling a part on an assembly line. The light emitting assemblies 264 can display a second color (i.e. yellow) when the robot 100 is not assigned to a task to indicate to users that the robot 100 is available for a task. The light emitting assemblies 264 can display a third color (i.e. red) when the robot 100 is low on battery life and should be recharged. The light emitting assemblies 264 and/or display 300 can also be used to indicate when a component in the head portion 202a and/or neck portion 202b, such as an actuator, is malfunctioning and should be serviced.

The light emitting assemblies 264 can also include one or more display sequences in which the light emitting assemblies 264 are turned off and on the light emitted from said light emitting assemblies 264 in a pattern or sequence to indicate various statuses. For example, the light emitting assemblies 264 can blink repeatedly to indicate that the robot 100 has lost communication with a host server or external device or is attempting to pair or searching for a device or server to connect to. The light emitting assemblies 264 may coordinate their display with the information displayed on the display 300. For example, the light emitting assemblies 264 can display a particular color that corresponds with the information displayed on the display 300. In the robot 100 is running low on battery life, the light emitting assemblies 264 can display a red color while the display displays a message and/or icon that indicates that the batter is low.

The light emitting assemblies 264 can also be synced with other devices included in the robot 100 as well. For example, the light emitting assemblies 264 can be operated with a speaker and may change colors or blink as the robot 100 outputs an audible message. Light emitting assemblies 264b, 264d are positioned adjacent to an oral region 366 of the head and can be operated independently of the light emitting assemblies 264a, 264c which are located above light emitting assemblies 264b, 264d and adjacent to an orbital region 368 of the head portion 202a.

Each of the light emitting assemblies 264 in the head portion 202a include: (i) a light source or light emitter, and (ii) a diffuser lens covering the light source. The light source and the diffuser lens form a unit that is inserted together into each respective peripheral protrusion 262 to couple the light emitting assemblies 264 to the head portion 202a. The light source or emitter can include any known light emitter, including any one or more of the following: laser, LCD, LED (e.g., COB LED), OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature. It should be understood that in other embodiments, the above disclosed light sources or emitters and/or additional light emitters may be formed in any desirable configuration or used with any other material, structure, or component to form the desirable light emitting assemblies 264. Examples of said light emitting assemblies 264 that may be formed include fiber optic cables, electroluminescent (EL) wire, laser diodes, neon tubes, cold cathode fluorescent lamps (CCFL), plasma tubes, phosphorescent strips, UV LED strips, infrared LED arrays, light guide panels (LGP), edge-lit light panels. The light source or light emitter may be made from a single emitter or a plurality of emitters (e.g., between 2 and 1000). Said light source or light emitter may be driven by an internal or external driver within another aspect of the electronics assembly.

Each of the light emitters is positioned in an inner portion of each respective peripheral protrusion 262 (i.e. toward the display 300) and the diffuser lens is positioned in front of the light emitter to reside between a frontal extent of the light emitter and an outermost edge of each respective peripheral protrusion 262 and/or an outermost edge or surface of the head 202a/shield 228. In some embodiments, the diffuser lens can be omitted from the assemblies 264. Each light emitter is located forward of and adjacent to the front facing edge of the rear shell 234 and rearward of and adjacent to a portion of the rear facing edge of the frontal shell 228 defining each recess 324. A rear most edge of each light emitter is located rearward of the entire rear facing edge of the frontal shell 228. The light emitters are located in voids defined by each respective peripheral protrusion 262, where the voids are located between the frontal shell 228 and the rear shell 234. In other embodiments, the light emitters may not be formed in the voids and instead said voids may act as a reflector for light that is emitted from said light emitter or source. In other words, the light emitter may be positioned in the first head sub-volume 236.

The recesses 324 formed in a rear edge of the frontal shell 228 each define a gap or channel between the frontal shell and the rear shell, and light emitted from the illumination assembly is visible in each gap. An extent of the head portion 202a is provided by the peripheral projections 262. The extent is recessed relative to both: (i) a first location on the outer surface of the frontal shell 228 that is positioned adjacent to the gap, and (ii) a second location on the outer surface of the rear shell 234 that is positioned adjacent to said gap. The rear edge of the frontal shell 228 does not abut the frontal edge of the rear shell at a location corresponding to the gaps. As such, recess material may be positioned in the gaps, and wherein said recess material may be a portion of the peripheral protrusions 262a, 262b, 262c, 262d that form the light emitter housings. In other words, an extent of the portion of the peripheral protrusions 262a, 262b, 262c, 262d that form the light emitter housings may be recessed relative to the outer surfaces of the frontal shell and rear shell. This positional relationship may cause an extent of the head portion 202a to be positioned: (i) within the frontal shell 228 and/or the rear shell 234, and (ii) at said location to connect the frontal shell 228 to the rear shell 234. Light emitted from the illumination assembly 264 may obscure an extent of the head portion 202a, and may specifically obscure an extent of the head portion 202a that has an outer surface that is recesses relative to the outer surfaces of the frontal and rear shells.

When viewing the head portion 202a from the front as shown in FIGS. 4 and 14, it can be seen that the light emitters are spaced apart from the display 300 and the electronics support 254. In other words, the light emitters do not reside behind or overlap with the display 300 or the electronics mount 254, although in some embodiments this may occur. The lower light emitting assemblies 264b, 264d are positioned below the display 300 and the electronics support 254. The upper light emitting assemblies 264a, 264c flank the display and the electronics support 254 such that a horizontal plane (i.e. plane 122) extending through the upper light emitting assemblies 264a, 264c also passes through the display 300. The plane 122 also passes through the center C of the head portion 202a, but the upper light emitting assemblies 264a, 264c are slightly offset upward to the plane 122. The upper light emitting assemblies 264a, 264c are also located below a top end of the display 300 so as to be positioned below any cameras or sensors mounted to the electronics support 254 above the display 300.

vii. Sensor Assembly

The sensor assembly may include one or more cameras 302, 303, temperature, pressure, force, inductive, capacitive, any combination of these sensors, or other known sensors. In the illustrative example, the sensor assembly includes a set of upper cameras 302. For example, two upper cameras 302 may be positioned above the display/shield 300 and directed forward. Although upper cameras 302 are shown as illustrative examples, other sensors may be relied on and coupled to the internal mounting frame in a similar manner to ensure proper directional positioning for respective detection, sensing, or signal reception. The sensors may include: (i) scan camera(s), (ii) monochrome camera(s), (iii) color camera(s), (iv) CMOS camera(s), (v) CCD sensor(s) or camera(s) that include CCD sensor(s), (vi) camera(s) or sensor(s) that have rolling shutter or global shutter, (vii) other types of 2D digital camera(s), (viii) other types of 3D digital camera(s), (ix) camera(s) or sensor(s) that are capable of stereo vision, structured light, and laser triangulation, (x) sonar camera(s) or ultrasonic camera(s), (xi) infrared sensor(s) and/or infrared camera(s), (xii) radar sensor(s), (xiii) LiDAR, (xiv) other structured light sensors, camera(s), or technologies, (xv) dot projecting camera(s) or sensor(s), or (xvi) any combination of the above or any other known camera or sensor. For example, the camera may have a megapixel resolution of between 0.4 MP to 20 MP, may record video at 5.6 FPS to 286 FPS, may have a CMOS sensor, pixel size may range from 2.4 um to 6.9 um, may utilize a starves rolling shutter technology, can operate in 55 degree C. ambient air temperatures, and may have any other properties, technologies, or features that are discussed within U.S. Pat. Nos. 11,402,726, 11,599,009, 11,333,954, or 11,600,010, all of which are incorporated herein by reference. It should be understood that the cameras are typically configured as video cameras but may have an alternative configuration, such as an image camera.

3. Neck Portion

As shown in at least FIG. 3, the neck portion 202b includes a deformable cover and member 230 that is designed to extend from an upper portion of the torso 204 to a lower portion of the head portion 202a. In particular, the deformable cover and member 230 is configured to wrap around at least an edge portion of the rear shell 234. In doing so, the deformable cover and member 230 obscures the actuators and other electronics contained in the neck.

4. Distances, Angles, Radii, and Arcs

TABLE 1

| Distance (mm) | Lower Bound | Upper Bound | Preferred Lower Bound | Preferred Upper Bound |
| --- | --- | --- | --- | --- |
| D6 | 81.5 | 122.3 | 91.7 | 112.1 |
| D7 | 80.5 | 120.8 | 90.6 | 110.7 |
| D8 | 76.1 | 114.2 | 85.6 | 104.7 |
| D9 | 80.6 | 120.9 | 90.7 | 110.9 |
| D10 | 34.2 | 51.2 | 38.4 | 47.0 |
| D11 | 61.7 | 92.6 | 69.4 | 84.8 |
| D22 | 93.3 | 140.0 | 105.0 | 128.3 |
| D23 | 173.6 | 260.4 | 195.3 | 238.7 |
| D24 | 166.2 | 249.4 | 187.0 | 228.6 |

TABLE 2

| Angle (Degrees) | Lower Bound | Upper Bound | Preferred Lower Bound | Preferred Upper Bound |
| --- | --- | --- | --- | --- |
| A1 | 5.7 | 8.6 | 6.4 | 7.9 |

TABLE 3

| Radius (mm) | Lower Bound | Upper Bound | Preferred Lower Bound | Preferred Upper Bound |
| --- | --- | --- | --- | --- |
| R1 | 99.7 | 149.6 | 112.2 | 137.1 |
| R2 | 46.0 | 69.0 | 51.7 | 63.2 |
| R10 | 127.7 | 191.6 | 143.7 | 175.6 |
| R11 | 79.3 | 118.9 | 89.2 | 109.0 |
| R12 | 69.0 | 103.5 | 77.6 | 94.8 |

TABLE 4

| Arc (Degrees) | Lower Bound | Upper Bound | Preferred Lower Bound | Preferred Upper Bound |
| --- | --- | --- | --- | --- |
| Arc2 | 115.1 | 172.6 | 129.5 | 158.2 |
| Arc4 | 110.8 | 166.2 | 124.6 | 152.3 |
| Arc5 | 117.1 | 175.6 | 131.7 | 161.0 |
| Arc6 | 65.8 | 98.7 | 74.1 | 90.5 |
| Arc7 | 39.6 | 59.5 | 44.6 | 54.5 |

D. Alternative Embodiments of the Head and Neck Assembly

FIGS. 28-62 show seven alternative embodiments of the head and neck assembly that may be used interchangeably in connection with the two different embodiments of the humanoid robots shown in FIGS. 1-2, 10-11, and 32. Each of the alternative embodiments has slightly different structures and configurations, but each embodiment is similar and generally tapered shape. As discussed below, the features and/or components of each embodiment may be interchanged, added, or removed from features and/or components of other embodiments. For example, a lower recess 3310 that is formed in the chin or mental region 355 of the third embodiment (e.g., FIGS. 32-57B) may be removed similar to how the lower recess was removed from the fifth, sixth, and seventh embodiments (e.g., FIGS. 58-62). Additionally, utilizing a deformable material in the neck assembly and including actuators in the neck assembly to allow the head to move may be added to the head and neck assemblies 202 of the first embodiment. It should be understood that these are only examples and any feature and/or component may be interchanged, added or removed from any other embodiment disclosed herein.

1. Second Embodiment

Similar to the head and neck assembly 202 described above in connection with FIGS. 1-27, FIGS. 28-31B illustrate a second embodiment of a head and neck assembly 2202. For the sake of brevity, the above disclosure in connection with the head and neck assembly 202 will not be repeated below, but it should be understood that like numerals represent generally similar or like structures in the various embodiments. For example, the disclosure regarding display 300 applies equally to display 2300. Further, it should be understood that the functionality and operation of the head and neck assembly 2202 is similar or identical to the features and functionality disclosed with respect to the head and neck assembly 202. It should be understood that any one or more features of the head and neck assembly 202 may be used in combination with those disclosed with respect to the head and neck assembly 2202, and that any one or more features of the head and neck assembly 2202 may be used in combination with those disclosed with respect to the head and neck assembly 202. The primary difference between head and neck assembly 202 and head and neck assembly 2202 is the fact the housing assembly 2220 further includes front and rear recessed areas 2272, 2277 and an upper shell 2270. These differences contribute to a different shape for the frontal shell 2228.

As shown in FIGS. 28-32, the front shell 2228 is configured to cover a front portion of the electronics assembly 2222 to locate at least a portion of the electronics assembly 2222 between the front cover 2252 and the frontal shell 2228. In the illustrative embodiment, the housing assembly 2220 further includes an upper shell 2270 and a sensor recess 2272. The frontal shell 2228 may be formed to include a central notch 2274 that conforms to the sensor recess 2272. The housing assembly 2220 is configured to include hold the display 2300 and at least one sensor, such as upper cameras 2302, of the electronics assembly 222 mounted on the electronics support 2254. The sensor recess 2272 may be positioned above an extent of the frontal shell 2228 and within the upper shell 2270. The housing assembly 2220 is shaped with a curved surface in at least the upper shell 2270 to resemble a head portion and has a rear facing edge 2276 that extends downward from the upper shell 2270 at rear end thereof. For example, viewed from the side, the housing assembly 2220 may have a rearwardly sloping substantially linear edge with a forward angle (e.g., extending rearward from horizontal) between 90 degrees and 140 degrees, preferably 110 degrees from horizontal when the robot is in a normal vertical position (sagittal and coronal planes of the head are aligned with the sagittal and coronal planes of the robot).

The upper shell 2270 may include a curved portion of the housing assembly 2220 from the rear edge to the sensor recess 2272 and may be defined by a curvilinear border 2278 that surrounds the upper shell 2270 and sensor recess 2272. In some examples, the upper shell 2270 has a continuous surface from the rear edge to the sensor recess 2272.

The upper sensor recess 2272 includes one or more sensor openings 2304 set back or recessed from the front of the housing assembly 2220. The sensor openings 2304 are positioned to correspond with the upper camera(s) 2302 of the electronics assembly 2222. The sensor openings 304 are partially protected by an overhang of the upper shell 2270 that protrudes over the sensor openings 2304. A shelf 2284 extends forward and downward from the sensor opening 2304 at an angle such that the shelf 2284 will not obscure the line of sight of the upper cameras 2302 (or other sensors) of the electronics assembly 2222. The sensor recess 2272 may have a contoured surface to transition from the shelf 2284 to the overhang of the upper shell 2270. The curvilinear border 2278 extends from the edge of the shelf 2284 to the upper shell 2270. The frontal shell 2228 may have a main body and two wing-like projections that extent upward from the main body. Wherein said wing-like projections are designed to flank the upper sensor recess 2272 and are configured to have extents that are positioned adjacent to the curvilinear border 2278 of the upper sensor recess 2272.

The housing assembly 2220 may also include a sensor cover 2286 made of a material that does not obscure a signal detected by the sensor(s). For example, the sensor cover 2286 may be a planar cover made of a transparent material that allows the upper cameras 2302 to receive images, preferably undistorted images. Additionally and/or alternatively, the sensor cover 2286 may have openings formed therein for receiving an extent of a sensor (e.g., camera lens). In further embodiments, the upper sensor recess 2272 may be omitted and the frontal shield 2228 may include openings formed therein for receiving an extent of a sensor (e.g., camera lens).

In the illustrative embodiment shown in FIGS. 28-32, a rear sensor recess 2277 may be formed in the head 2202a between a rear end of the upper shell 2270 and the rear shell 2234. The rear sensor recess 2277 can form a viewport for a rear facing camera or a vent to allow airflow in and/or out of the head 2202 for cooling of the electronics assembly via an internal fan or plurality of fans.

As shown in FIGS. 28-58, the frontal shell 2228 may include a curved upper surface defining the slot 2274 and may be configured to fit between the curvilinear border 2290 and the rim 2292. The frontal shell 2228 is shaped to resemble the form of the head 2202a providing a substantially continuous surface between the upper shell 2270 and sensor recess 2272 to the rear shell 2234. The curvature of the frontal shell 2228 may vary and have different curvatures (i.e. radii and arcs) at different positions along the frontal shell 2228. The frontal shell 2228 may include light recesses 2296a, 2296b, 2296c, 296d to conform with the shape of the peripheral protrusions 2262a, 2262b, 2262c, 2262d.

2. Third Embodiment

Similar to the head and neck assemblies 202, 2202 described above in connection with FIGS. 1-27 and 28-31, FIGS. 32-57B illustrate a third embodiment of a head and neck assembly 3202. For the sake of brevity, the above disclosure in connection with the head and neck assemblies 202, 2202 will not be repeated below, but it should be understood that like numerals represent generally similar or like structures in the various embodiments. For example, the disclosure regarding display 300 applies equally to display 3300. Further, it should be understood that the functionality and operation of the head and neck assembly 3202 is similar or identical to the features and functionality disclosed with respect to the head and neck assemblies 202, 2202. It should be understood that any one or more features of the head and neck assemblies 202, 2202 may be used in combination with those disclosed with respect to the head and neck assembly 3202, and that any one or more features of the head and neck assembly 3202 may be used in combination with those disclosed with respect to the head and neck assemblies 202, 2202. The primary difference between head and neck assembly 2202 and head and neck assembly 3202 is the fact that head 3202a does not include the rear sensor recess 2277, includes a lower sensor cover 3310, and includes a deformable neck shell 3230.

i. Upper Shell

The head 3202a includes an upper shell 3270 having a recessed sensor region 3272 at a front end of the upper shell similarly to the housing assembly 2220 of the second embodiment. However, a rear end of the upper shell 3270 is substantially flush with the rear shell 3234 such that there is no recessed region in this area. In some examples, the upper shell 3270 may further include a recessed area 3280. The recessed area 3280 may be configured to hold a top shell 3282 included in the upper shell 3270 and having a shape conforming to the shape of the recessed area 3280.

ii. Neck Shell

The neck shell 3230 may be made from a material (e.g., fabric or deformable plastic) that allows the head to twist in both directions and pitch forward and back without bunching or pulling. The neck shell 3230 may be elastic or resilient and designed to return to its original state when the head 3202a returns to its normal state.

The disclosed head and neck assembly 3202 may include one or more actuators that allow the head to: (i) twist or rotate, and (ii) tilt or change the pitch. Unlike conventional robots, the actuators are hidden underneath the deformable neck shield 3230. Movement of the actuators causes the deformable neck shell 3230 to deform and accommodate such movements. The deformable neck shield 3230 is designed to extend to the jaw line of the head enclosure and into a rear extent of the head enclosure and does not extend into the side regions of the head. This configuration ensures that the neck shield 3230 is sufficiently attached to the head, but minimizes the head's surface area covered by the deformable neck shield 3230. Minimizing the coverage of the deformable neck shield 3230 in the side regions of the head allows for the inclusion of more durable materials in these regions without using overlapping materials. This is beneficial over conventional robot heads because it reduces materials and/or increases the lateral protection for the electronics contained within the head.

iii. Lower Sensor Cover

Figure 33:
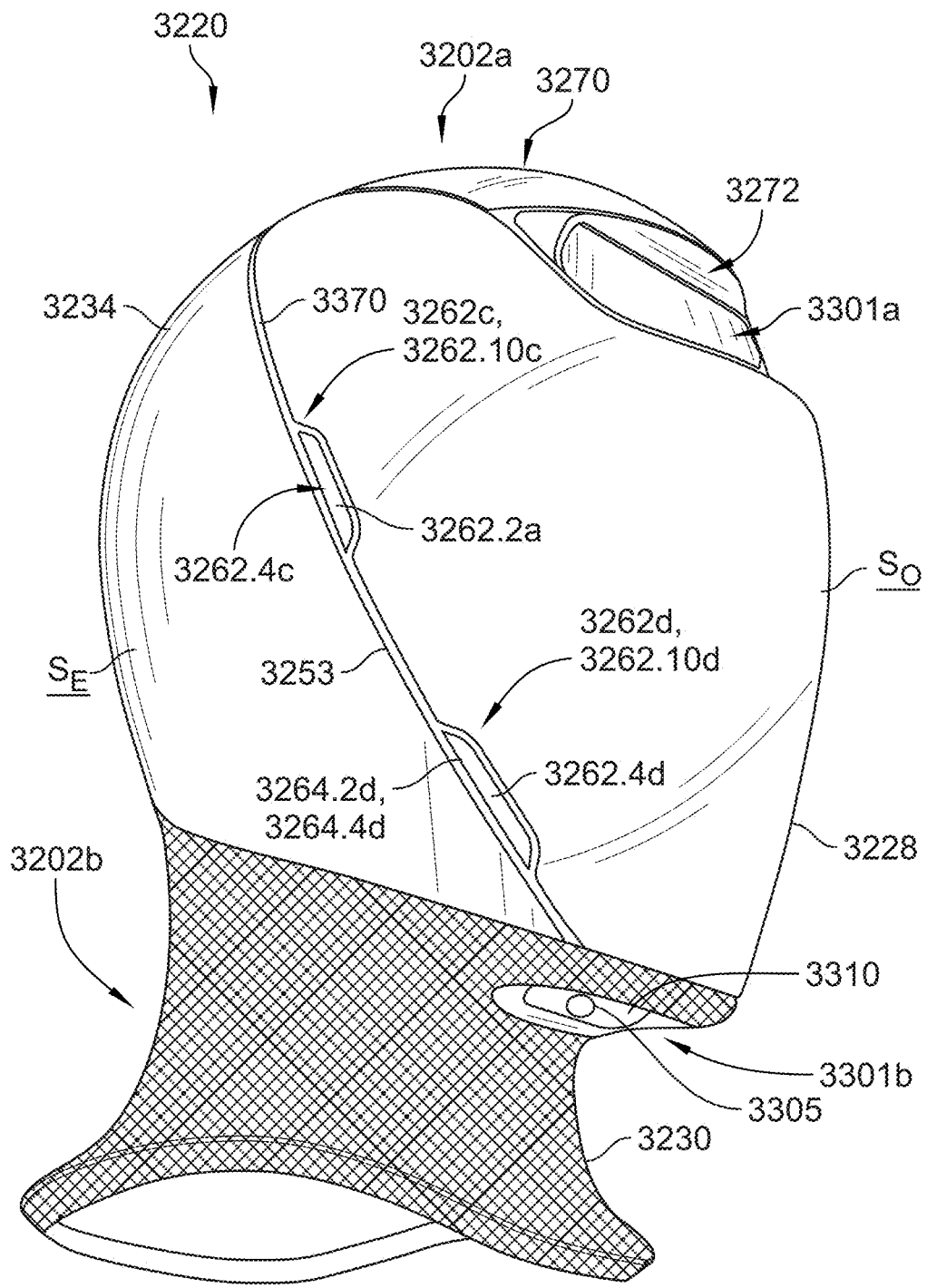
FIG. 33 is a lower perspective view of the third embodiment of the head and neck assembly of FIG. 32, wherein the head and neck assembly includes: (i) a head portion having: (a) a head housing assembly with a frontal shell, a rear shell, and an upper shell with an upper recessed sensor zone, (b) a head electronics assembly with an illumination assembly having at least one light emitter configured to emit light between an extent of the frontal shell and rear shell, and (ii) a neck portion having: (a) a neck housing assembly with a deformable cover and a lower recessed sensor zone, and (b) a neck electronics assembly.
Figure 35:
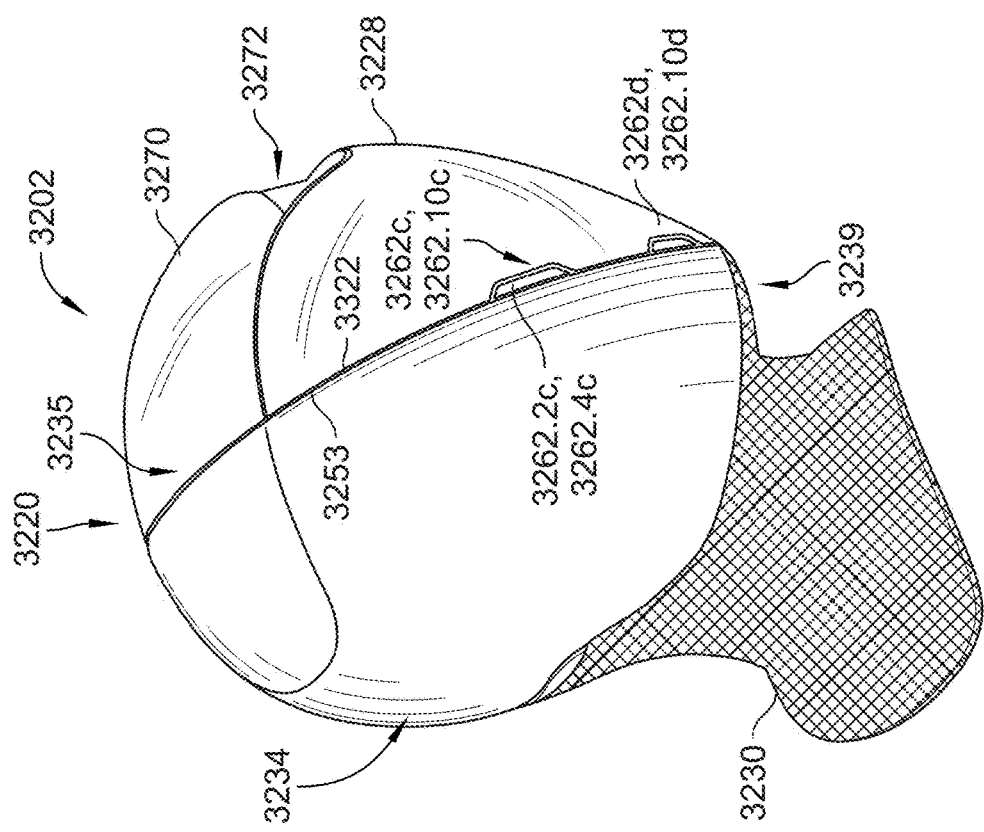
FIG. 35 is a side perspective view of the head and neck assembly of FIG. 32.
Figure 34:
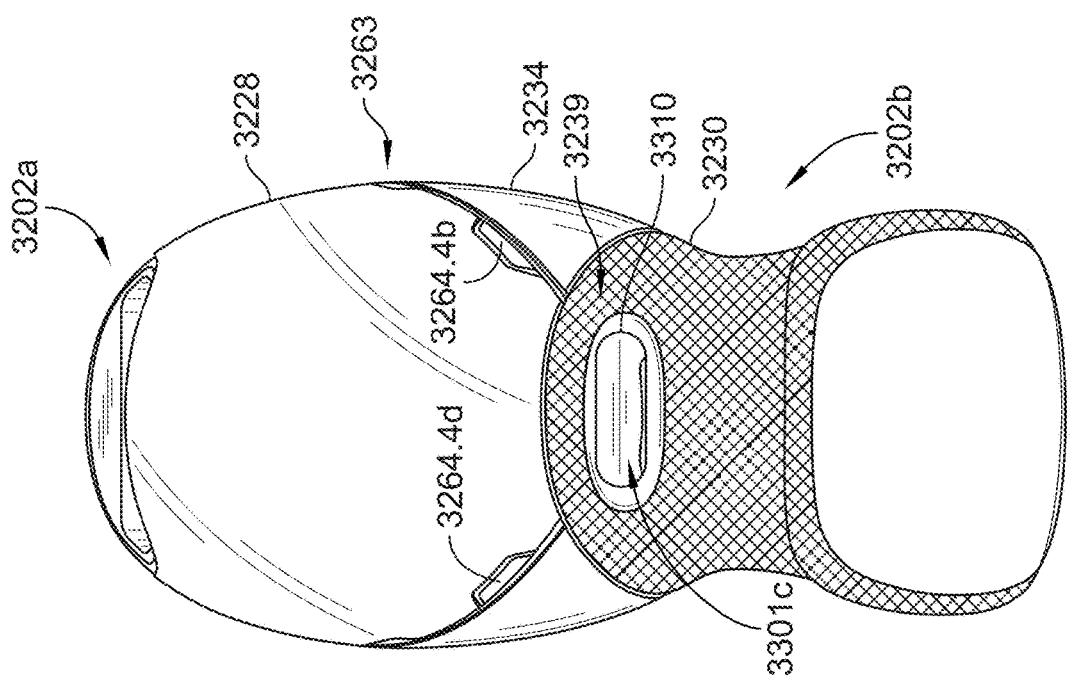
FIG. 34 is a bottom perspective view of the head and neck assembly of FIG. 32.
Figure 36:
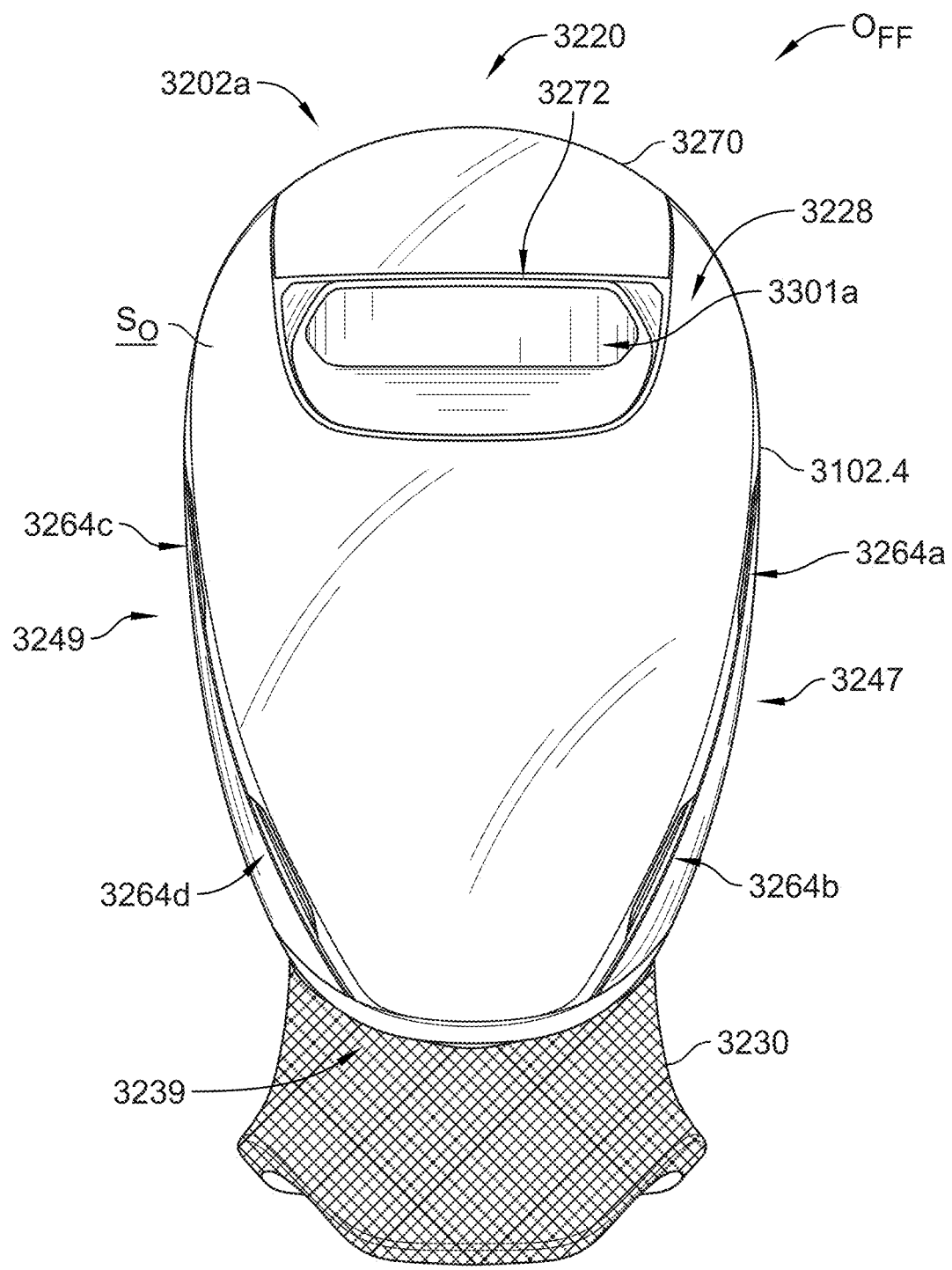
FIG. 36 is a front view of the head and neck assembly of FIG. 32.
Figure 37:
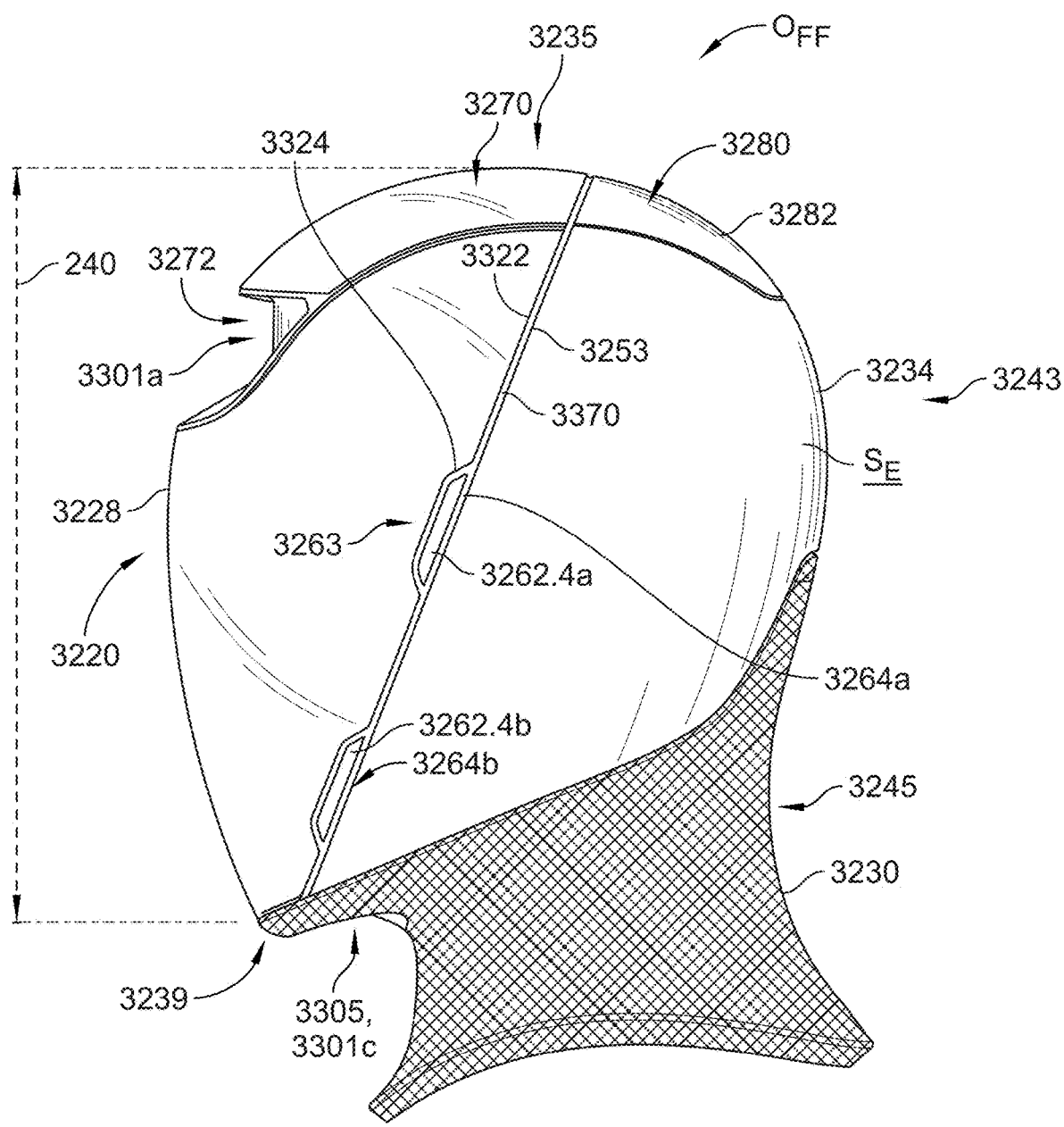
FIG. 37 is a side view of the head and neck assembly of FIG. 32.
Figure 38:
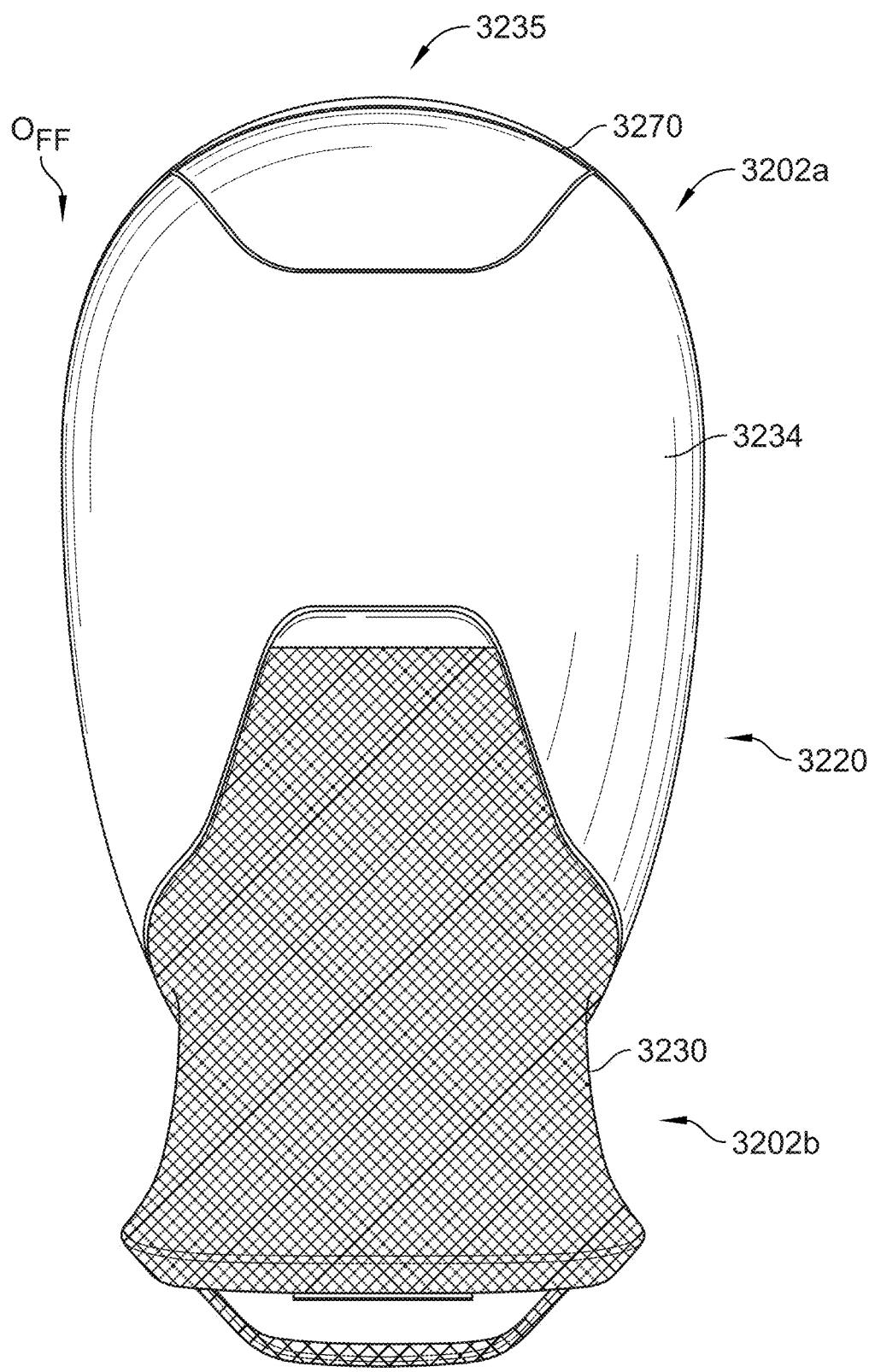
FIG. 38 is a rear view of the head and neck assembly of FIG. 32.
Figure 40:
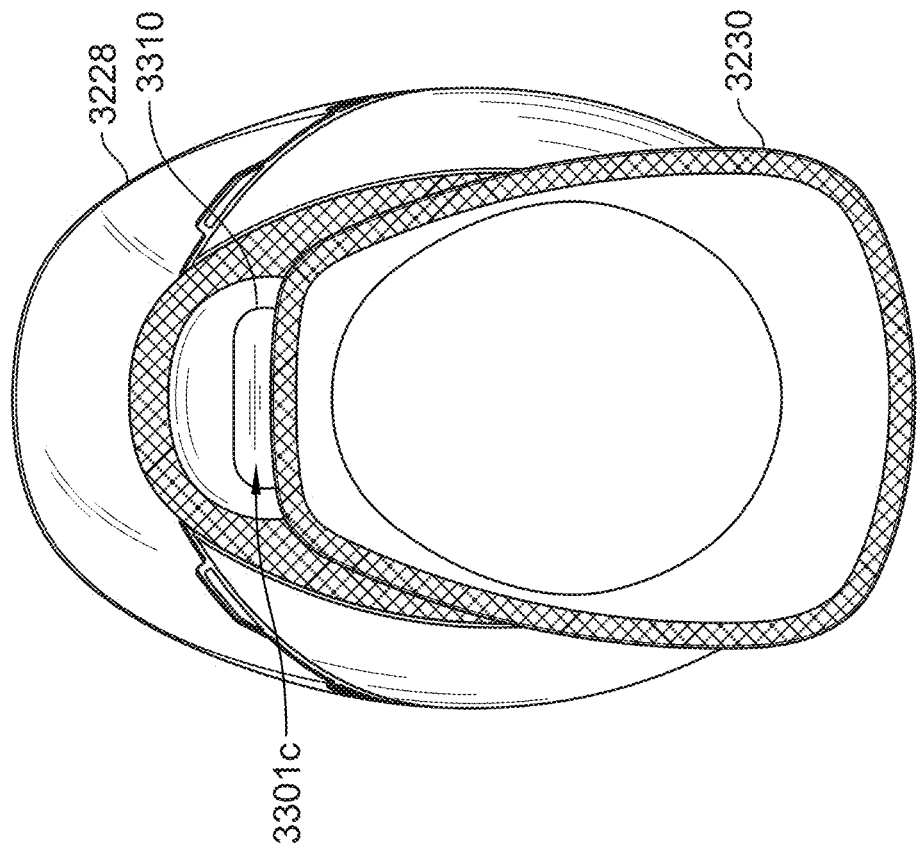
FIG. 40 is a bottom view of the head and neck assembly of FIG. 32.
Figure 39:
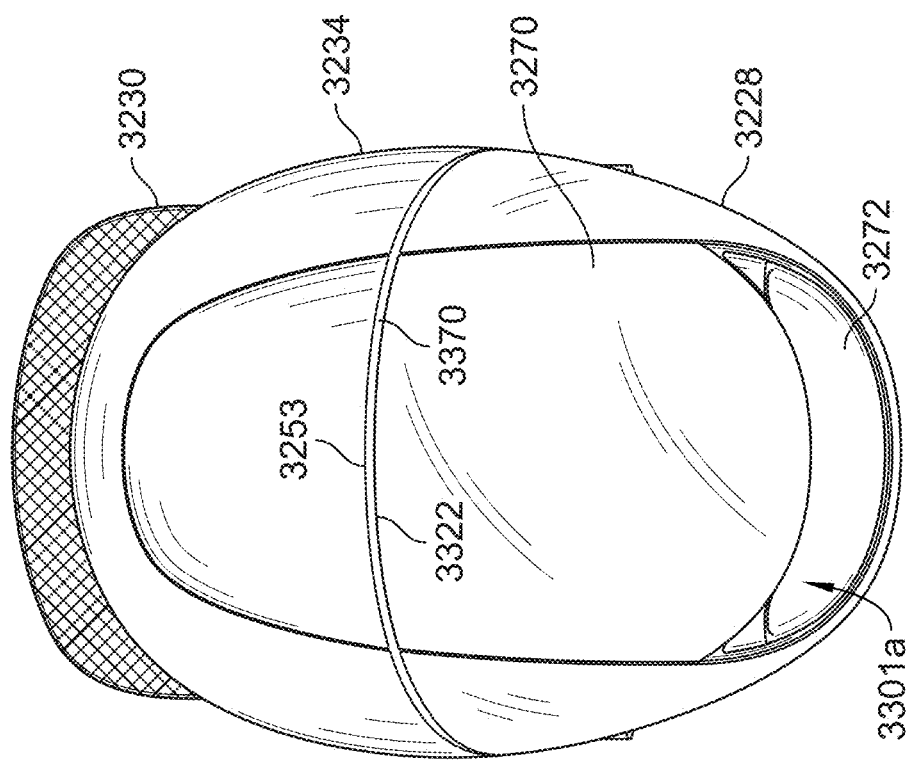
FIG. 39 is a top view of the head and neck assembly of FIG. 32.
Figure 41:
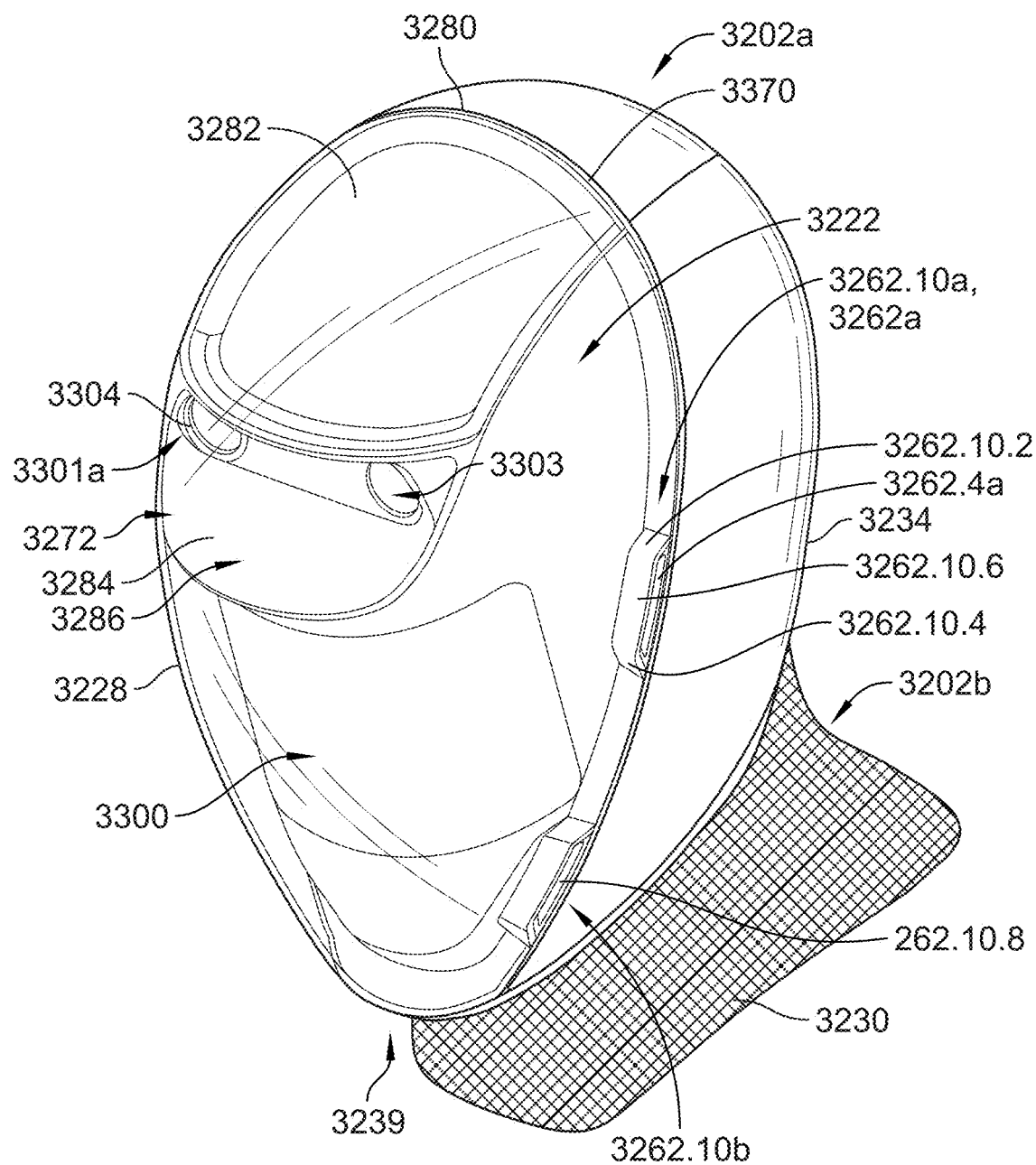
FIG. 41 is a top perspective view of the head and neck assembly of FIG. 32 wherein: (i) the frontal shell is shown as transparent to reveal the display located in an interior space defined between the frontal shell and rear shell, and (ii) an extent of the upper sensor zone is shown as transparent to reveal a pair of cameras located in the interior space and positioned above the display.
Figure 42:
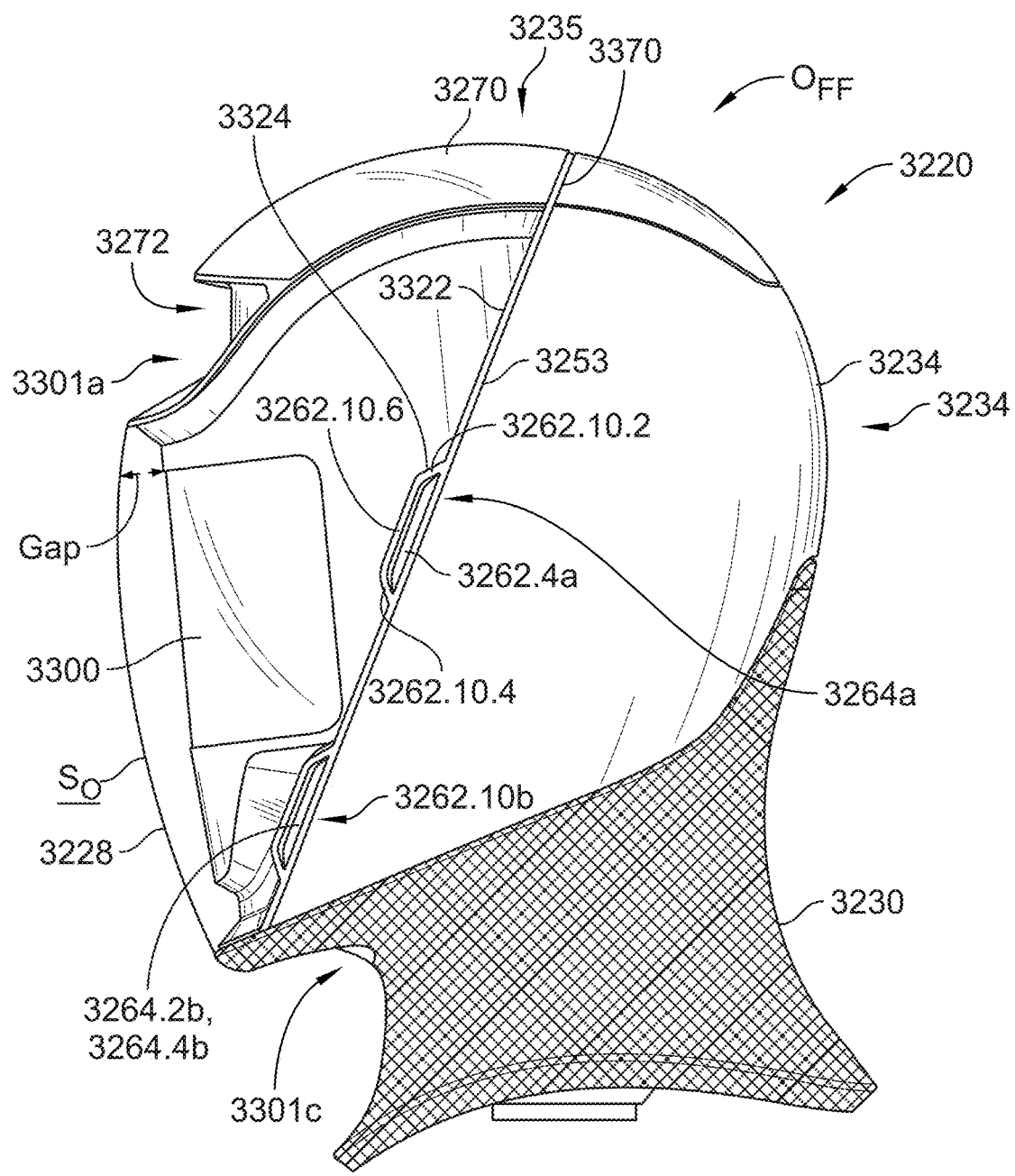
FIG. 42 is a side view of the head and neck assembly of FIG. 41.
Figure 44:
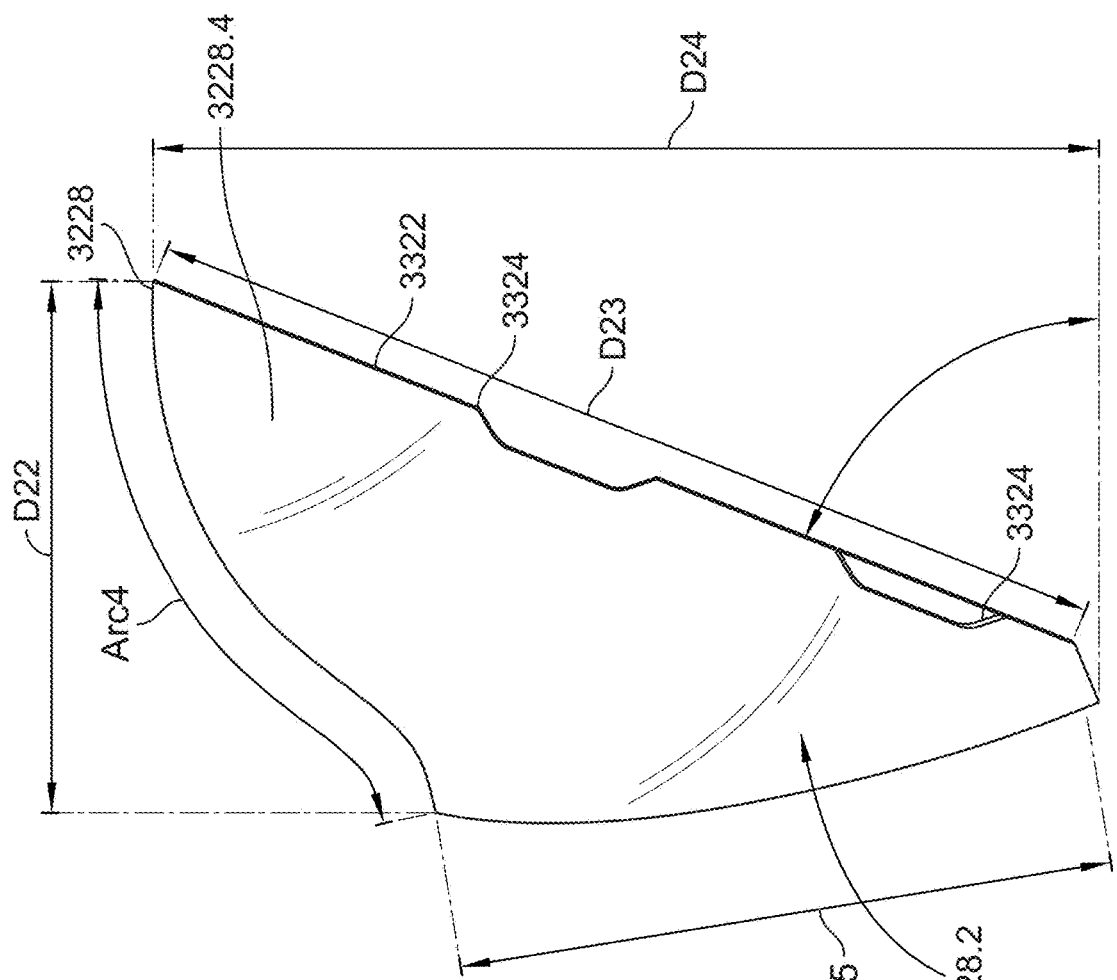
FIG. 44 is a side view of the frontal shell of the head and neck assembly of FIG. 41 showing various dimensions of the frontal shell.
Figure 43:
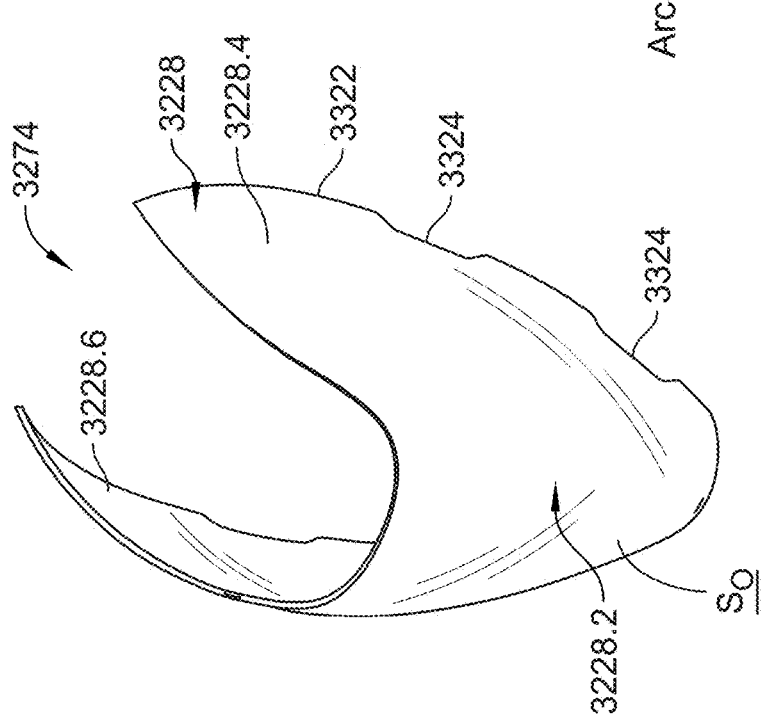
FIG. 43 is a perspective view of the frontal shell of the head and neck assembly of FIG. 41, wherein the frontal shell includes: (i) a main body, (ii) a plurality of wings that extend upward from the main body, (iii) an outer periphery with a rear edge having a plurality of recesses formed therein.
Figure 46:
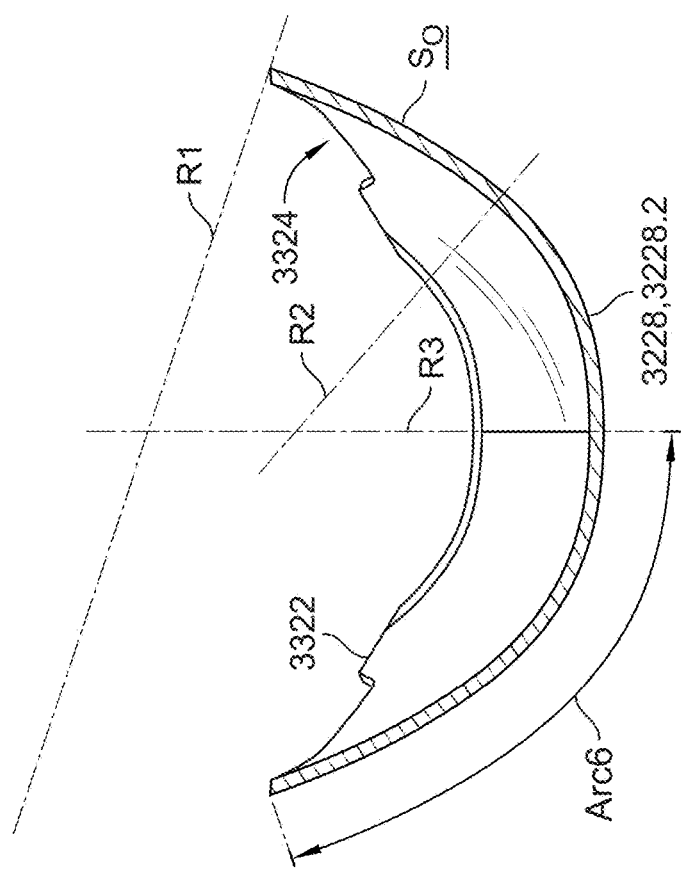
FIG. 46 is a cross-sectional view of the frontal shell of FIG. 41 taken along line 46-46 in FIG. 45 and showing three different radii of curvatures.
Figure 45:
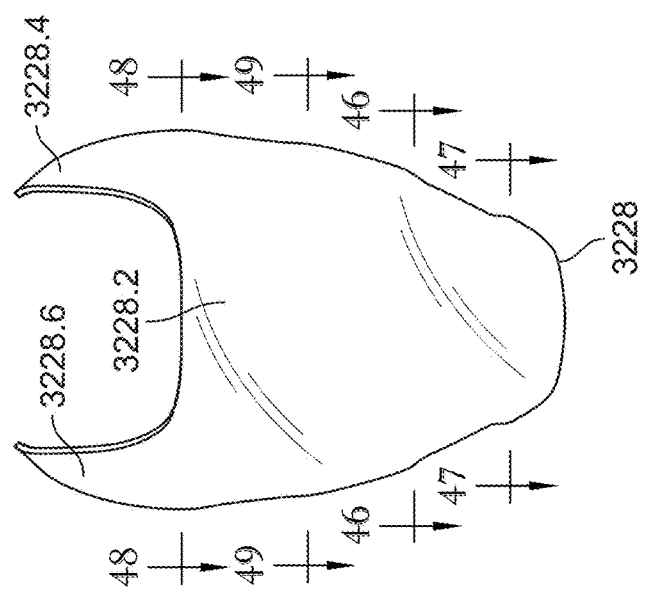
FIG. 45 is a front view of the frontal shell of the head and neck assembly of FIG. 41.
Figure 47:
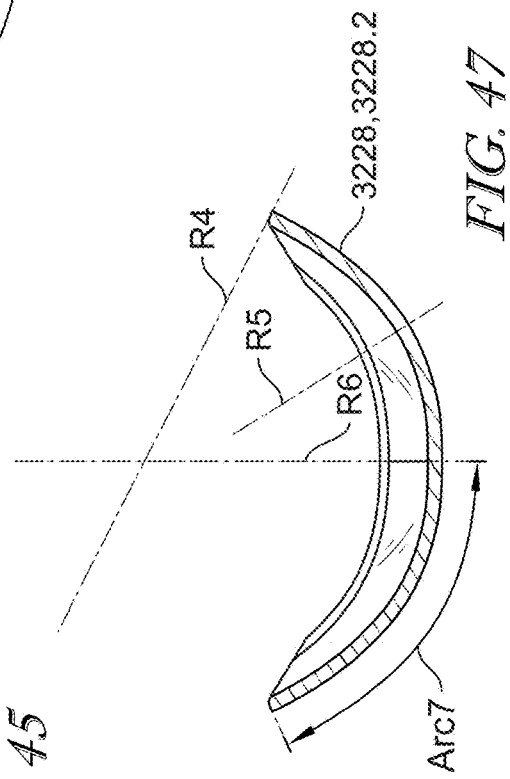
FIG. 47 is a cross-sectional view of the frontal shell of FIG. 41 taken along line 47-47 in FIG. 45 and showing three different radii of curvatures.
Figure 56:
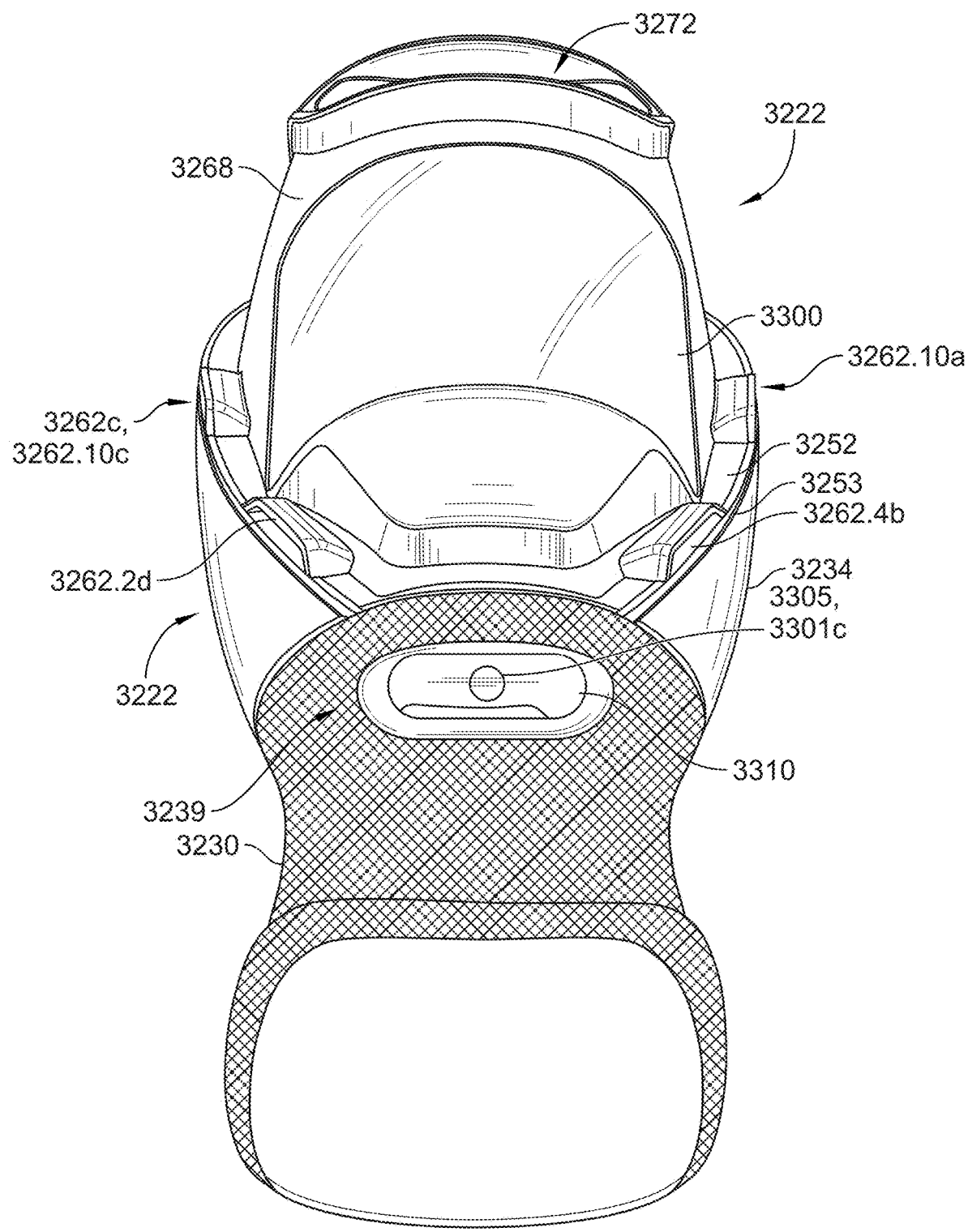
FIG. 56 is a bottom perspective view of the head and neck assembly of FIG. 54.
Figure 57A:
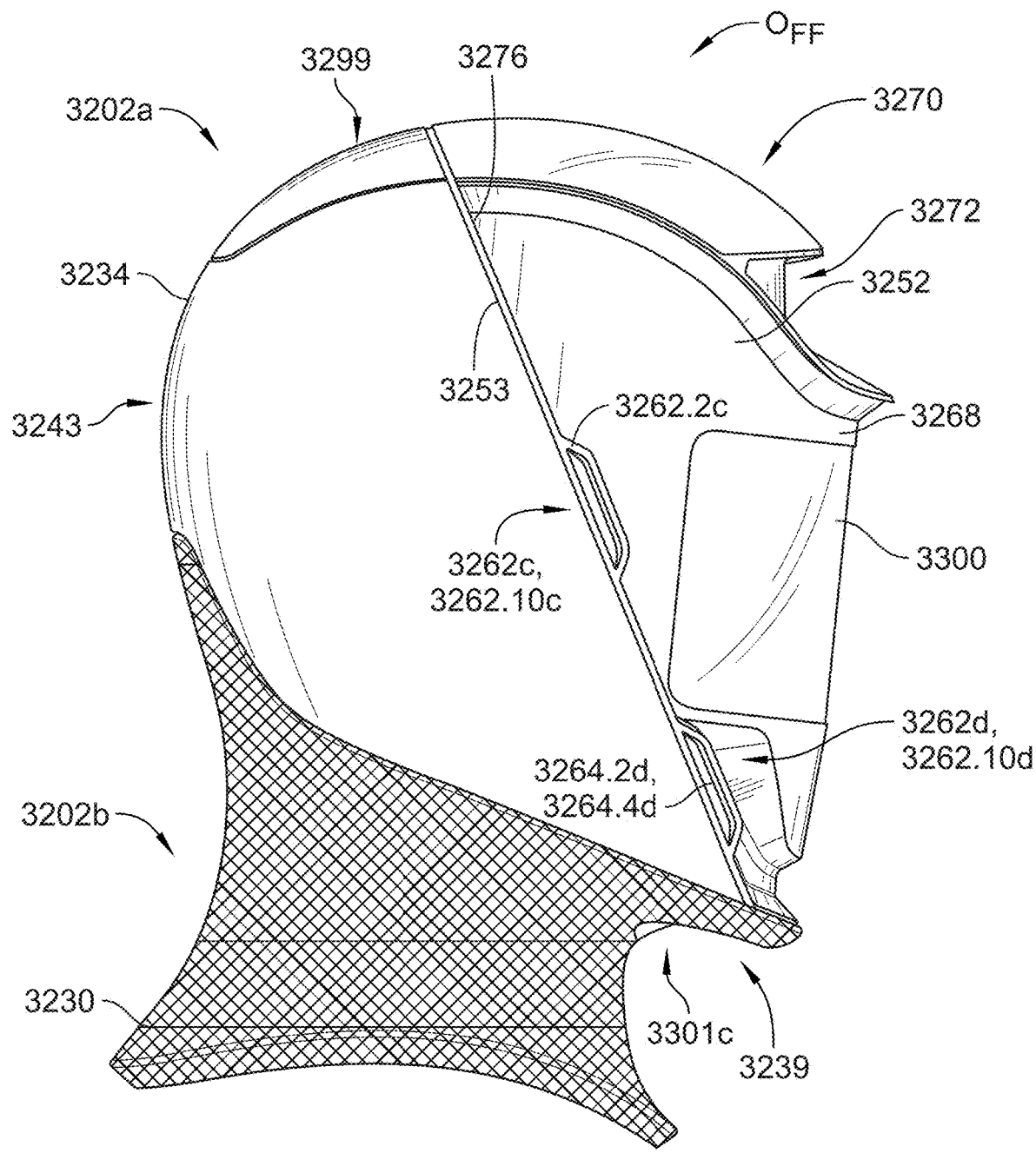
FIG. 57A is a side view of the head and neck assembly of FIG. 54.
Figure 57B:
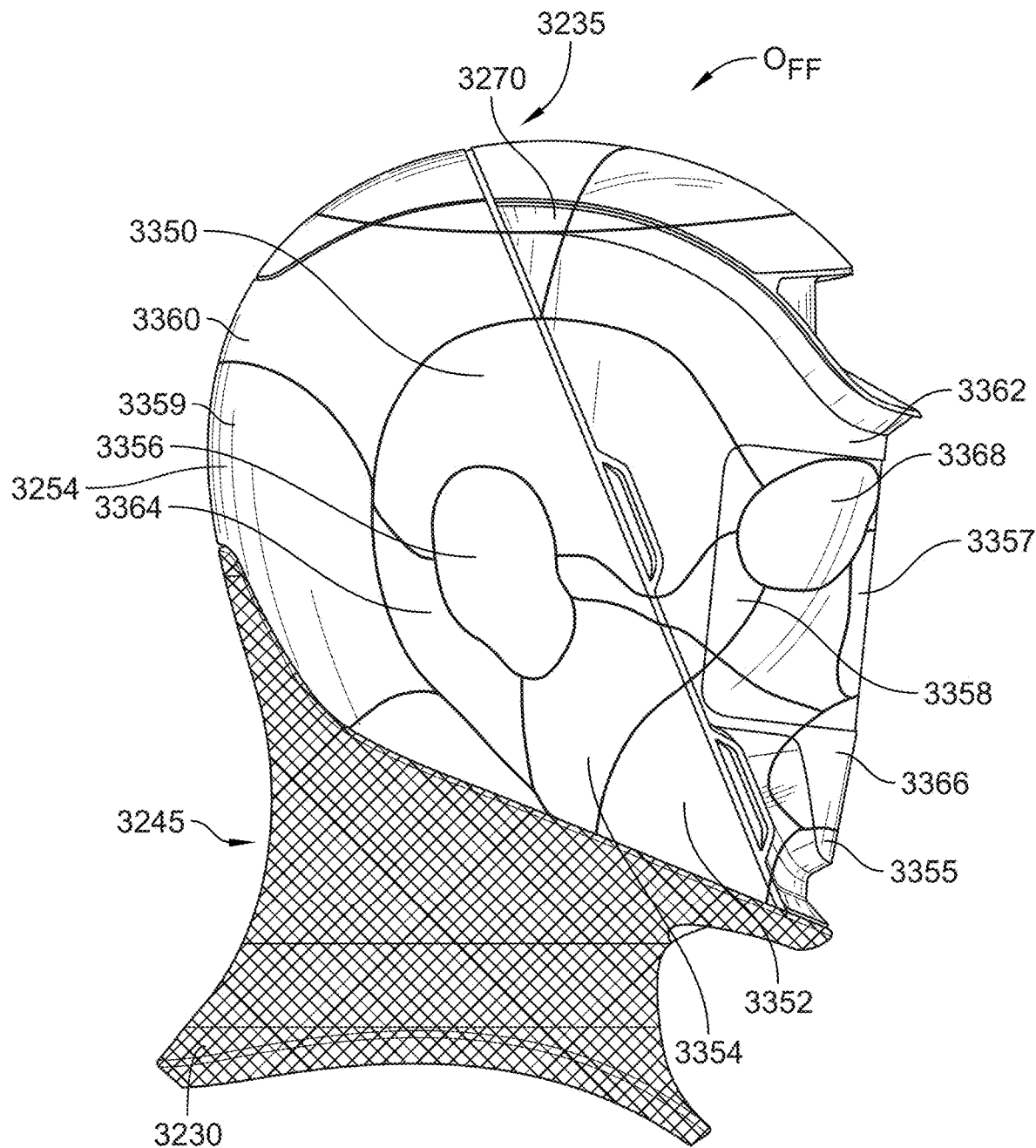
FIG. 57B is a side view of the head and neck assembly of FIG. 57A showing various anatomical regions of the head.

As shown in FIGS. 33, 34, and 56, the head 3202a further includes a lower recess formed in a chin region of the head 3202a, which may include a lower sensor cover 3310. The chin region projects outward away from the neck to provide a lower surface 3311 facing toward ground. The lower sensor cover 3310 is coupled to the lower surface and faces toward the ground. The lower sensor cover 3310 is shaped couple with the head 3202a in a position such that a sensor opening 3312 included in the lower sensor cover 3310 corresponds with a sensor, such as a lower camera(s) 3303 of the electronics assembly 3222. The lower camera 3303 is configured to monitor the ground for obstacles and/or monitor movement of various parts of the robot 100. The lower sensor cover 3310 may be made of a material that does not obscure a signal detected by the sensor. For example, the lower sensor cover 3310 may be a planar cover made of a transparent material that allows the lower cameras 3303 to receive images, preferably undistorted images. The lower sensor cover 3310 may be enclosed by the frontal head cover the neck shell.

iv. Electronics Support Frame

The frontal shell 3228 is removed from the head 3202a in FIGS. 54-58. The frontal shell 3228 and the display 3300 are mounted to an electronics support frame or shielded portion 3288, wherein said electronics support frame 3288 is essentially a combination of the intermediate cover and electronics support of the first embodiment. The shielded portion 3288 may include a substantial surface that extends from a curvilinear border 3290 that surrounds an extent of the upper shell 3270 and sensor recess 3272 to a rim 3292. The shielded portion 3288 may include a display opening 3294 positioned to receive the display 3300 mounted. The display 3300 may be rectangular with a curvature. The shielded portion 3288 may be shaped with contours around the display opening 3294 to receive the curved shape of the display 3300 without obstructing the view. The shielded portion 3288 may also have a taper and/or include additional contours between the display opening 3294 and the rim 3292. The rim 3292 may include lighting recesses or peripheral protrusions 3262a, 3262b, 3262c, 3262d formed within the rim 3292 to receive light emitting assemblies 3264a, 3264b, 3264c, 3264d of the electronics assembly 3222. Although the illustrative embodiment in FIGS. 53-58 shows the frontal shell 3228 sized to fit within the shielded portion 3288, the frontal shell 3228 may occupy any portion or ratio of the robot's head and may have any configuration, or may be omitted. In some embodiments, the frontal shell 3228 is optional.

3. Fourth Embodiment

Similar to the head and neck assemblies 202, 2202, 3202 described above in connection with FIGS. 1-27, 28-31, and 32-57B, FIGS. 58-59 illustrate a fourth embodiment of a head and neck assembly 4202. For the sake of brevity, the above disclosure in connection with the head and neck assemblies 202, 2202, 3202 will not be repeated below, but it should be understood that like numerals generally represent generally similar or like structures in the various embodiments. For example, the disclosure regarding display 300 applies equally to display 4300. Further, it should be understood that the functionality and operation of the head and neck assembly 4202 is similar or identical to the features and functionality disclosed with respect to the head and neck assemblies 202, 2202, 3202. It should be understood that any one or more features of the head and neck assemblies 202, 2202, 3202 may be used in combination with those disclosed with respect to the head and neck assembly 4202, and that any one or more features of the head and neck assembly 4202 may be used in combination with those disclosed with respect to the head and neck assemblies 202, 2202, 3202.

Figure 58:
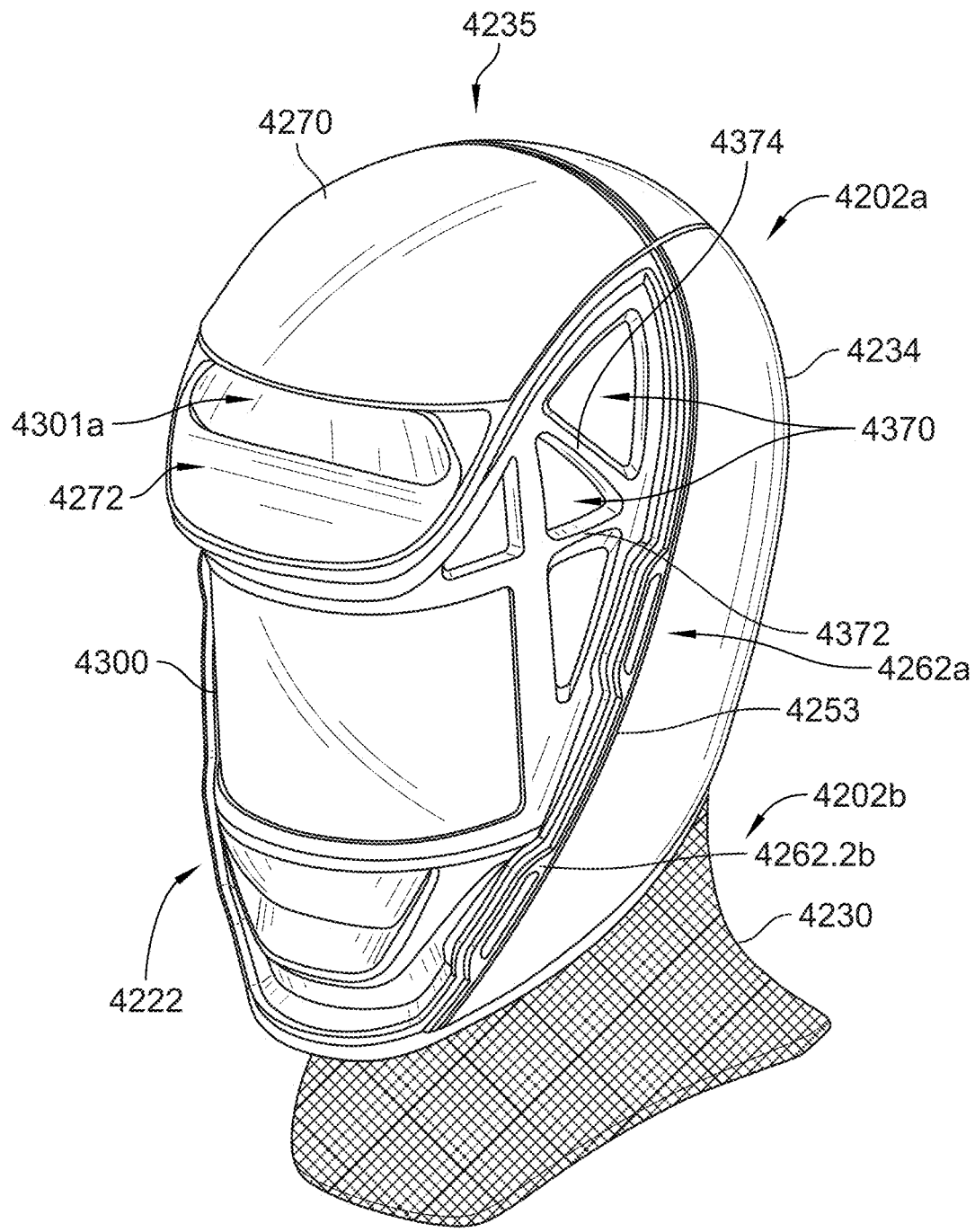
FIG. 58 is a perspective view of a fourth embodiment of a head and neck assembly, wherein the frontal shell is omitted from the housing assembly, the electronics frame further includes a plurality of support ribs, and the electronics assembly further includes a plurality of side displays coupled to the electronics frame.
Figure 59:
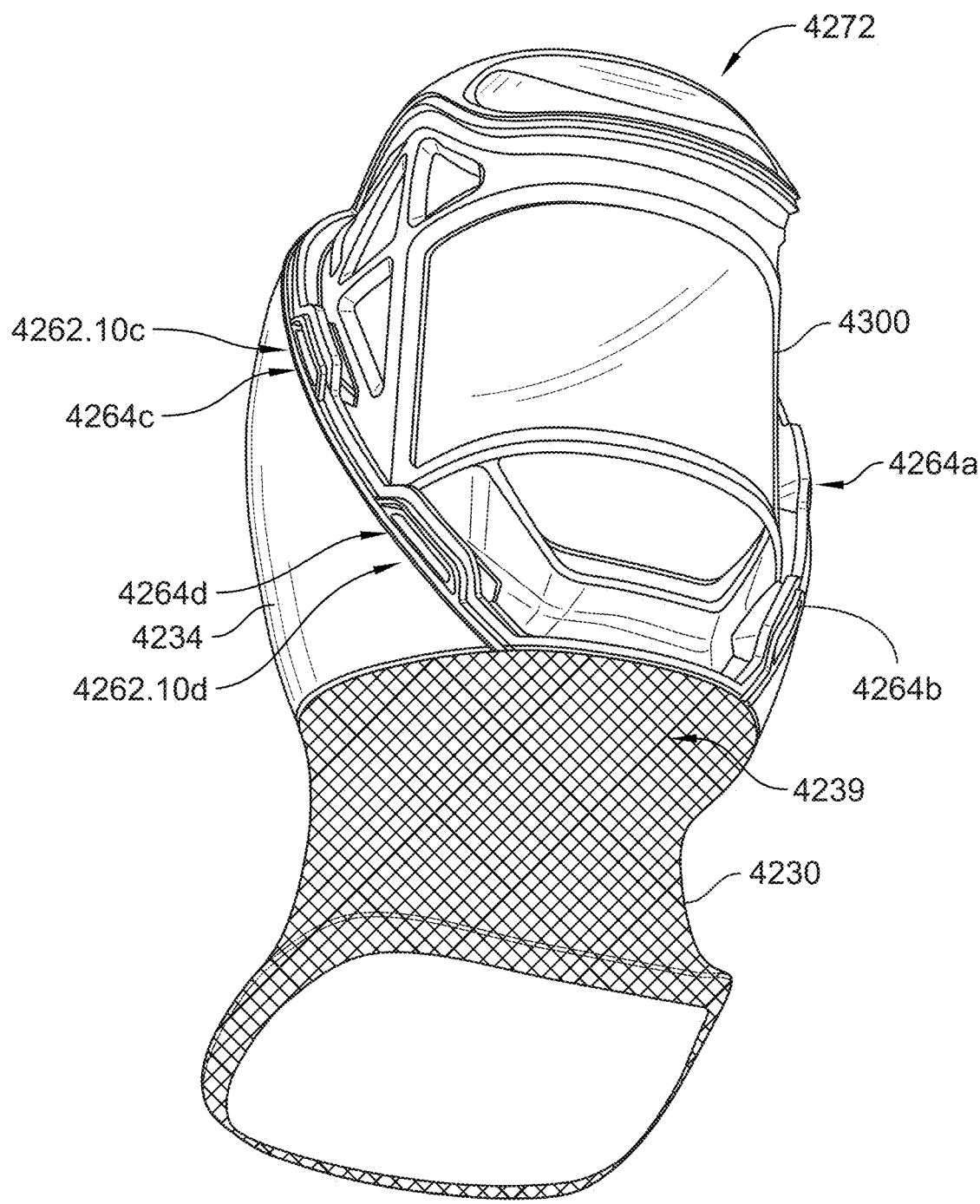
FIG. 59 is a bottom perspective view of the head and neck assembly of FIG. 58.

The primary difference between head and neck assembly 3202 and head and neck assembly 4202 is the fact that the shielded portion 4288 is ribbed and the head 4202a lacks a lower recessed sensor region in the chin area. As shown in FIGS. 58 and 59, the shielded portion 4288 can include a plurality of ribs 4372, 4374 that define one or more recessed areas 4370. The ribs 4372, 4374 can provide additional structural reinforcement to areas adjacent the electronics assembly 4222. The recessed areas 4370 can be a part of the shielded portion 4288 or can be additional displays and/or lights that are used to convey information and indications to users. Although not shown in FIGS. 58 and 59, the head 4202a can include or omit a frontal shell.

4. Fifth Embodiment

Similar to the head and neck assemblies 202, 2202, 3202, 4202 described above in connection with FIGS. 1-27, 28-31, 32-57B, and 58-59, FIG. 60 illustrate a fifth embodiment of a head and neck assembly 5202. For the sake of brevity, the above disclosure in connection with the head and neck assemblies 202, 2202, 3202, 4202 will not be repeated below, but it should be understood that like numerals generally represent generally similar or like structures in the various embodiments. For example, the disclosure regarding display 300 applies equally to display 5300. Further, it should be understood that the functionality and operation of the head and neck assembly 5202 is similar or identical to the features and functionality disclosed with respect to the head and neck assemblies 202, 2202, 3202, 4202. It should be understood that any one or more features of the head and neck assemblies 202, 2202, 3202, 4202 may be used in combination with those disclosed with respect to the head and neck assembly 5202, and that any one or more features of the head and neck assembly 5202 may be used in combination with those disclosed with respect to the head and neck assemblies 202, 2202, 3202, 4202.

Figure 60:
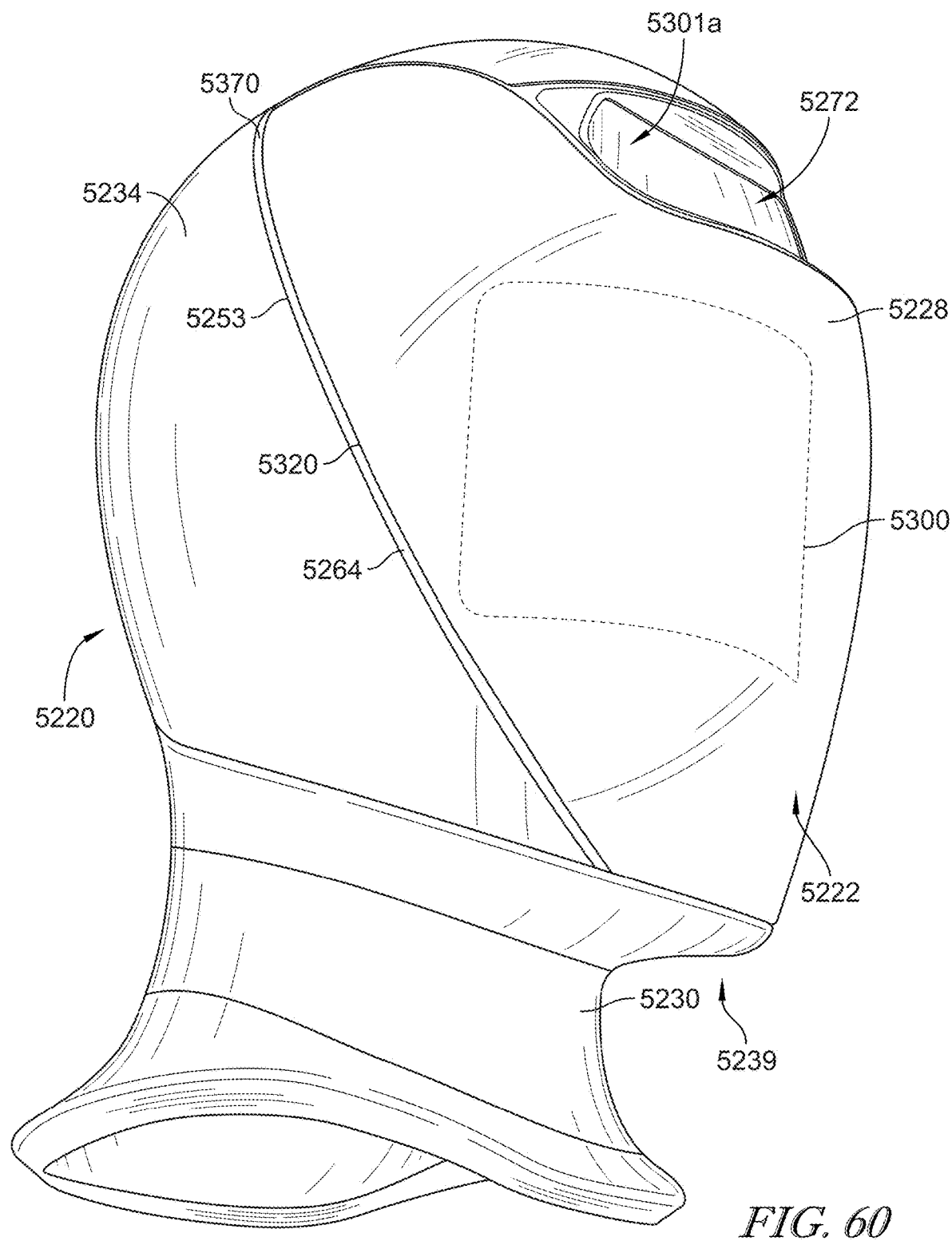
FIG. 60 is a perspective view of a fifth embodiment of a head and neck assembly, wherein the illumination assembly includes a plurality of light emitters that are positioned adjacent to a majority of the rear edge of said frontal shield.
Figure 61:
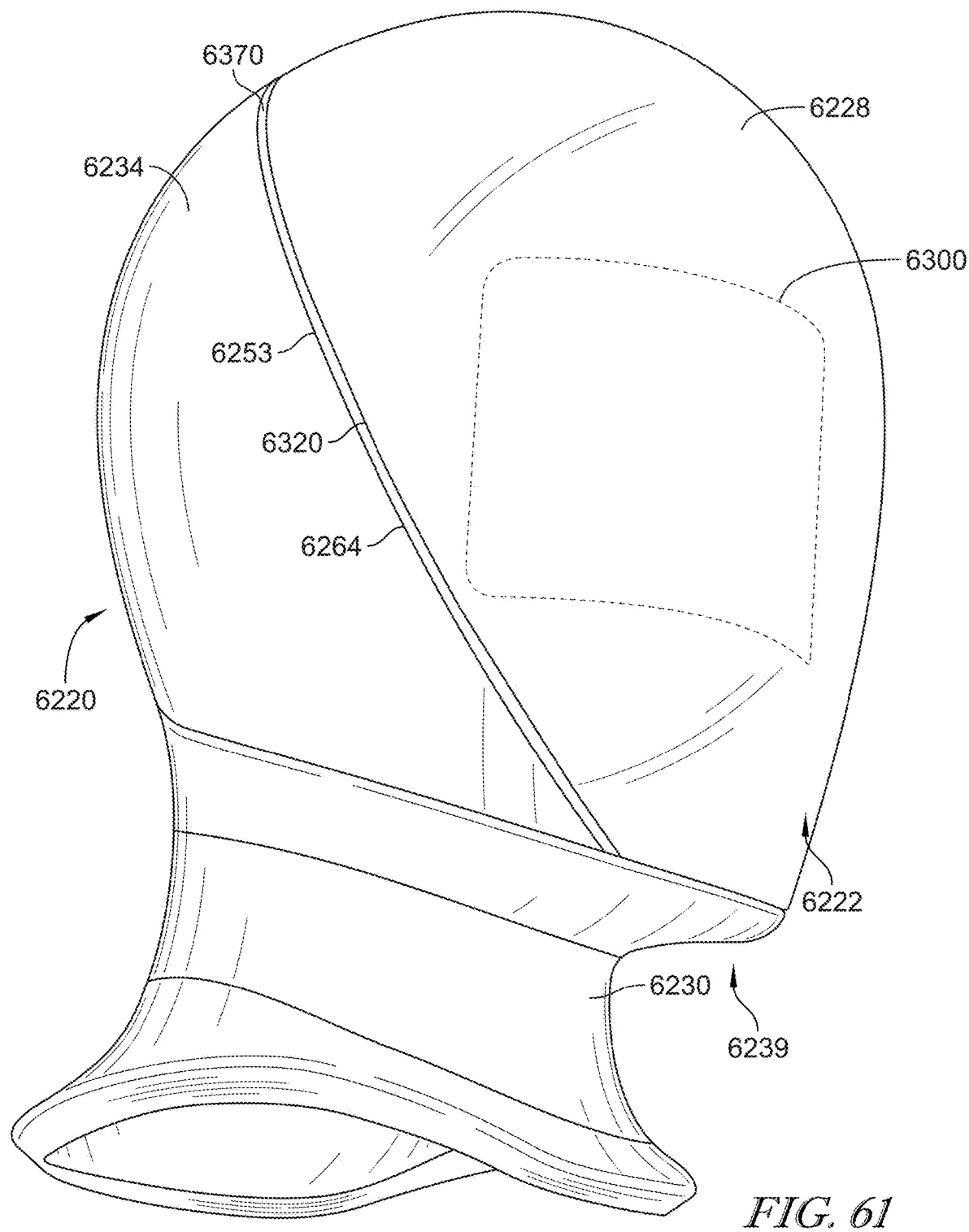
FIG. 61 is a perspective view of a sixth embodiment of a head and neck assembly, wherein the upper recessed sensor zone of the fifth embodiment has been omitted.

The primary difference between head and neck assembly 3202 and head and neck assembly 5202 is the fact that the head 5202a includes only one light emitting assembly 5264 and the head 5202a lacks a lower recessed sensor region in the chin area. As shown in FIG. 60, the light emitting assembly 5264 is a band and extends along the interface 5320 between the frontal shell 5228 and the rear shell 5234. The light emitting assembly 5264 extends along the entire interface 5320 in the illustrative embodiment, but may extend only partway along the interface 5320 in some embodiments. In other words, the light emitting assembly 5264 may extend completely around the frontal shell 5228. The outer surface of the light emitting assembly 5264 may be flush with the outer surfaces of the front and rear shells or may be recessed relative to one or both of the front and/or rear shells.

5. Sixth Embodiment

Similar to the head and neck assemblies 202, 2202, 3202, 4202, 5202 described above in connection with FIGS. 1-27, 28-31, 32-57B, 58-59, and 60, FIG. 61 illustrate a sixth embodiment of a head and neck assembly 6202. For the sake of brevity, the above disclosure in connection with the head and neck assemblies 202, 2202, 3202, 4202, 5202 will not be repeated below, but it should be understood that like numerals generally represent generally similar or like structures in the various embodiments. For example, the disclosure regarding display 300 applies equally to display 6300. Further, it should be understood that the functionality and operation of the head and neck assembly 6202 is similar or identical to the features and functionality disclosed with respect to the head and neck assemblies 202, 2202, 3202, 4202, 5202. It should be understood that any one or more features of the head and neck assemblies 202, 2202, 3202, 4202, 5202 may be used in combination with those disclosed with respect to the head and neck assembly 6202, and that any one or more features of the head and neck assembly 6202 may be used in combination with those disclosed with respect to the head and neck assemblies 202, 2202, 3202, 4202, 5202. The primary difference between head and neck assembly 6202 and head and neck assembly 6202 is the fact that the head 6202a lacks a front recessed sensor region as in embodiments 2-5. Like the fifth embodiment, the head 6202a includes only one light emitting assembly 6264 that extends along the interface 6320 between the frontal shell 6228 and the rear shell 6234.

The primary difference between head and neck assembly 6202 and head and neck assembly 6202 is the fact that the head 6202a lacks a front recessed sensor region as in embodiments 2-5. Like the fifth embodiment, the head 6202a includes only one light emitting assembly 6264 that extends along the interface 6320 between the frontal shell 6228 and the rear shell 6234.

E. Seventh Embodiment

Figure 62:
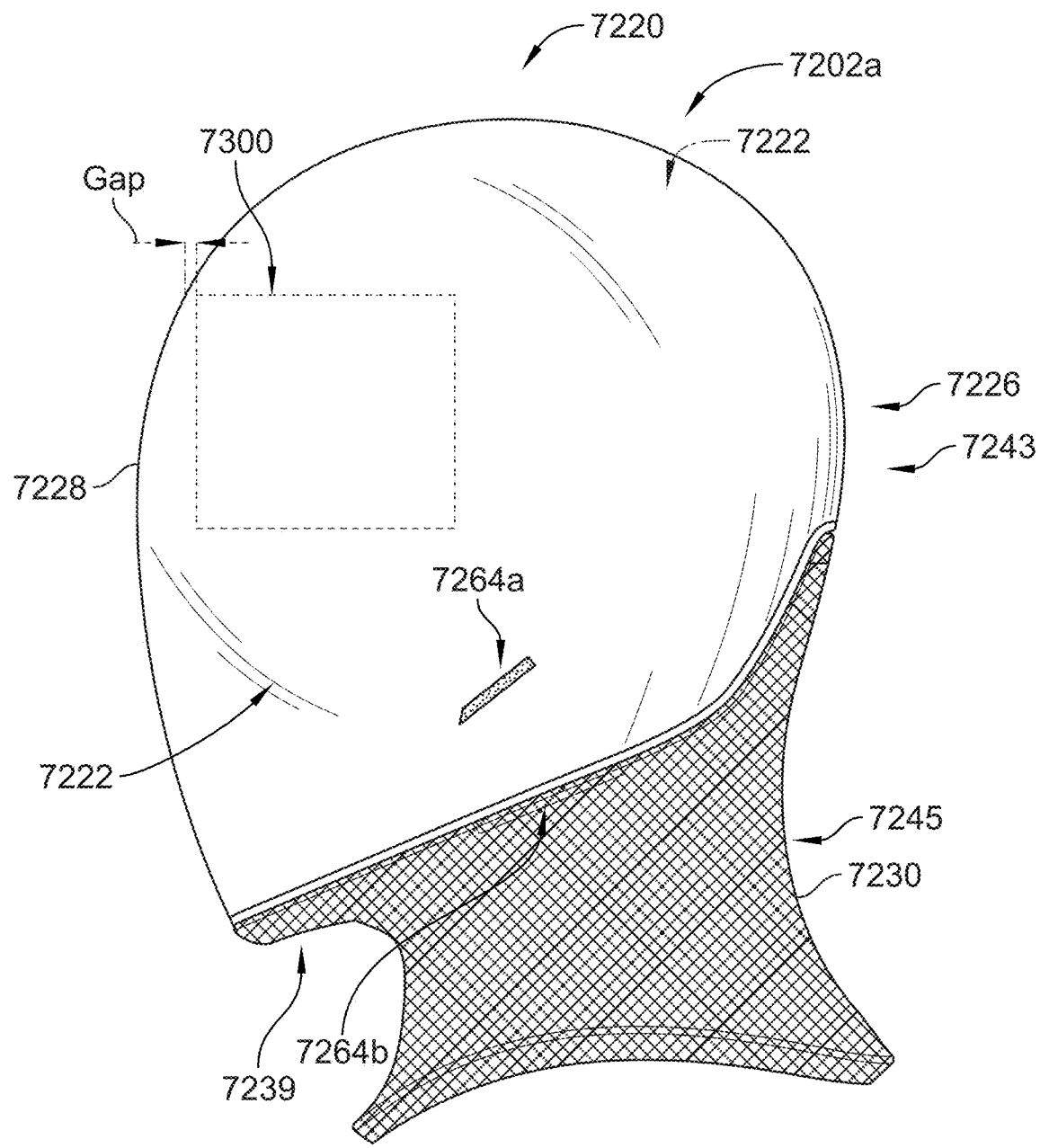
FIG. 62 is a side view of a seventh embodiment of a head and neck assembly wherein the rear shell has been omitted and the frontal shell encases a majority of the head.

Similar to the head and neck assemblies 202, 2202, 3202, 4202, 5202, 6202 described above in connection with FIGS. 1-27, 28-31, 32-57B, 58-59, 60, and 61, FIG. 62 illustrate a seventh embodiment of a head and neck assembly 7202. For the sake of brevity, the above disclosure in connection with the head and neck assemblies 202, 2202, 3202, 4202, 5202, 6202 will not be repeated below, but it should be understood that like numerals generally represent generally similar or like structures in the various embodiments. For example, the disclosure regarding display 300 applies equally to display 7300. Further, it should be understood that the functionality and operation of the head and neck assembly 7202 is similar or identical to the features and functionality disclosed with respect to the head and neck assemblies 202, 2202, 3202, 4202, 5202, 6202. It should be understood that any one or more features of the head and neck assemblies 202, 2202, 3202, 4202, 5202, 6202 may be used in combination with those disclosed with respect to the head and neck assembly 7202, and that any one or more features of the head and neck assembly 7202 may be used in combination with those disclosed with respect to the head and neck assemblies 202, 2202, 3202, 4202, 5202, 6202. The primary difference between head and neck assembly 6202 and head and neck assembly 7202 is the fact the frontal shell 7228 provides substantially all of an exterior surface the head 7202a. As shown in FIG. 62, the head 7202a further includes a light emitting assembly 7264a coupled to the frontal shell 7228. The neck shell 7230 can also include a second light emitting assembly 7264b located adjacent to an edge of the frontal shell 7228.

F. Body Illumination Assembly

As previously described, the head portion 202a includes light emitting assembly 264 located at the shield interface 320. The robot 100 can further include additional illumination assemblies in other areas of the robot 100 such as a torso illumination assembly 330, thigh illumination assembly 332, a neck illumination assembly 334, a shoulder illumination assembly 336, a hand/wrist illumination assembly 338, a knee illumination assembly 340, and a hip illumination assembly 342. The illumination assemblies disclosed herein meet the standards described in FDA CFR Title 21 part 1040.10, titled Performance standards for Light-Emitting Products, and ANSI LIA Z136.1, titled Safe Use of Lasers, at the time of filing this application and are fully incorporated herein by reference.

1. Torso Illumination Assembly

Figure 63A:
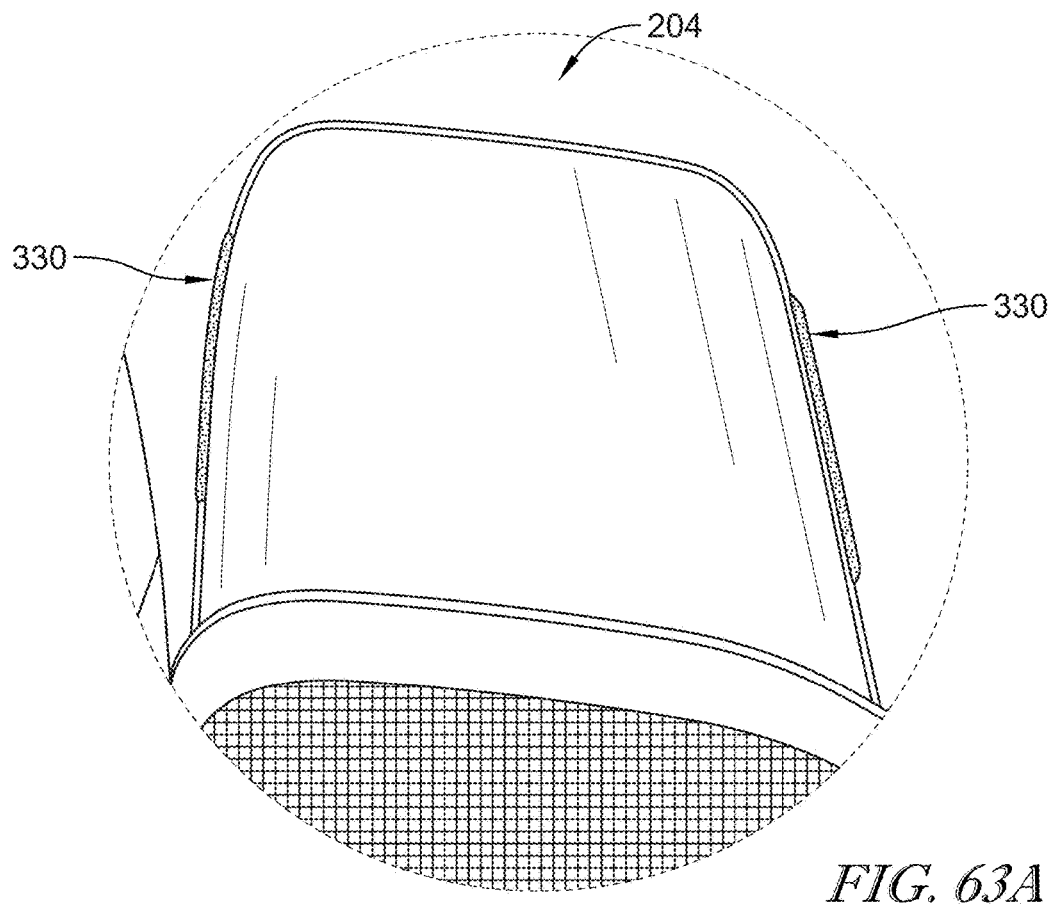
FIG. 63A is an enlarged view of a portion of a torso region of the humanoid robot of FIG. 1, wherein said torso includes a plurality of light emitters.

The torso illumination assembly includes at least one, and preferably a plurality of, light emitters 330 are located along a front surface of the torso 204 generally corresponding to a chest region of the robot 100 as shown in FIG. 63A. The torso light emitters 330 are illustratively embodied as elongated light strips; however, the lights 330 can have any suitable shape or structure. The torso light emitters 330 can be operated in the same way as the light emitting assembly 264 described above. The torso light emitters 330 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

2. Thigh Illumination Assembly

Figure 63B:
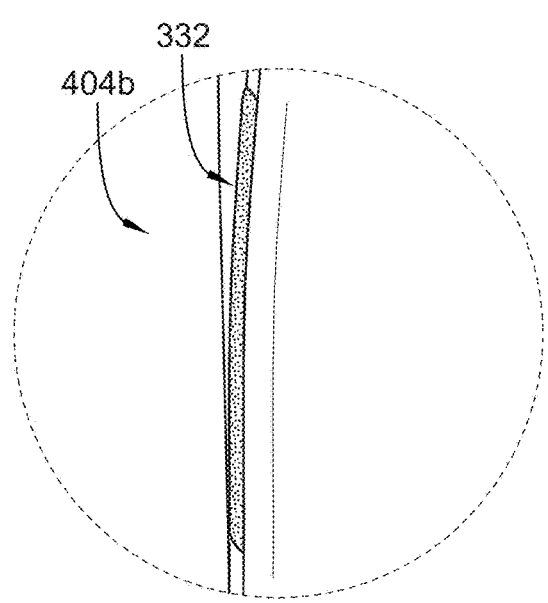
FIG. 63B is an enlarged view of a portion of a right thigh region of the humanoid robot of FIG. 1, wherein said thigh region includes at least one light emitter.
Figure 63C:
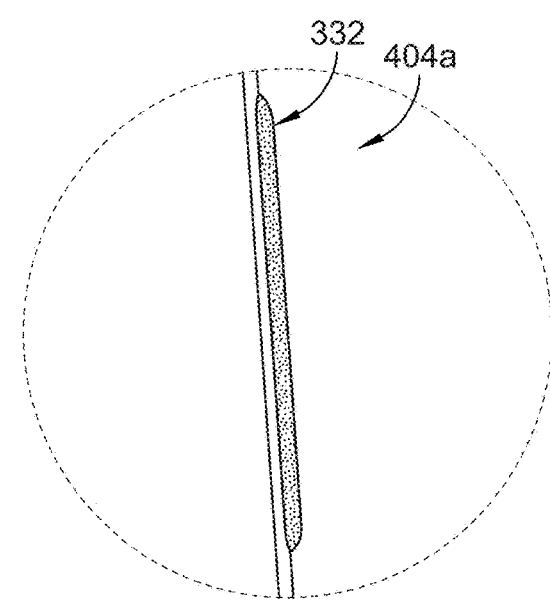
FIG. 63C is an enlarged view of a portion of a left thigh region of the humanoid robot of FIG. 1, wherein said thigh region includes at least one light emitter.
Figure 64:
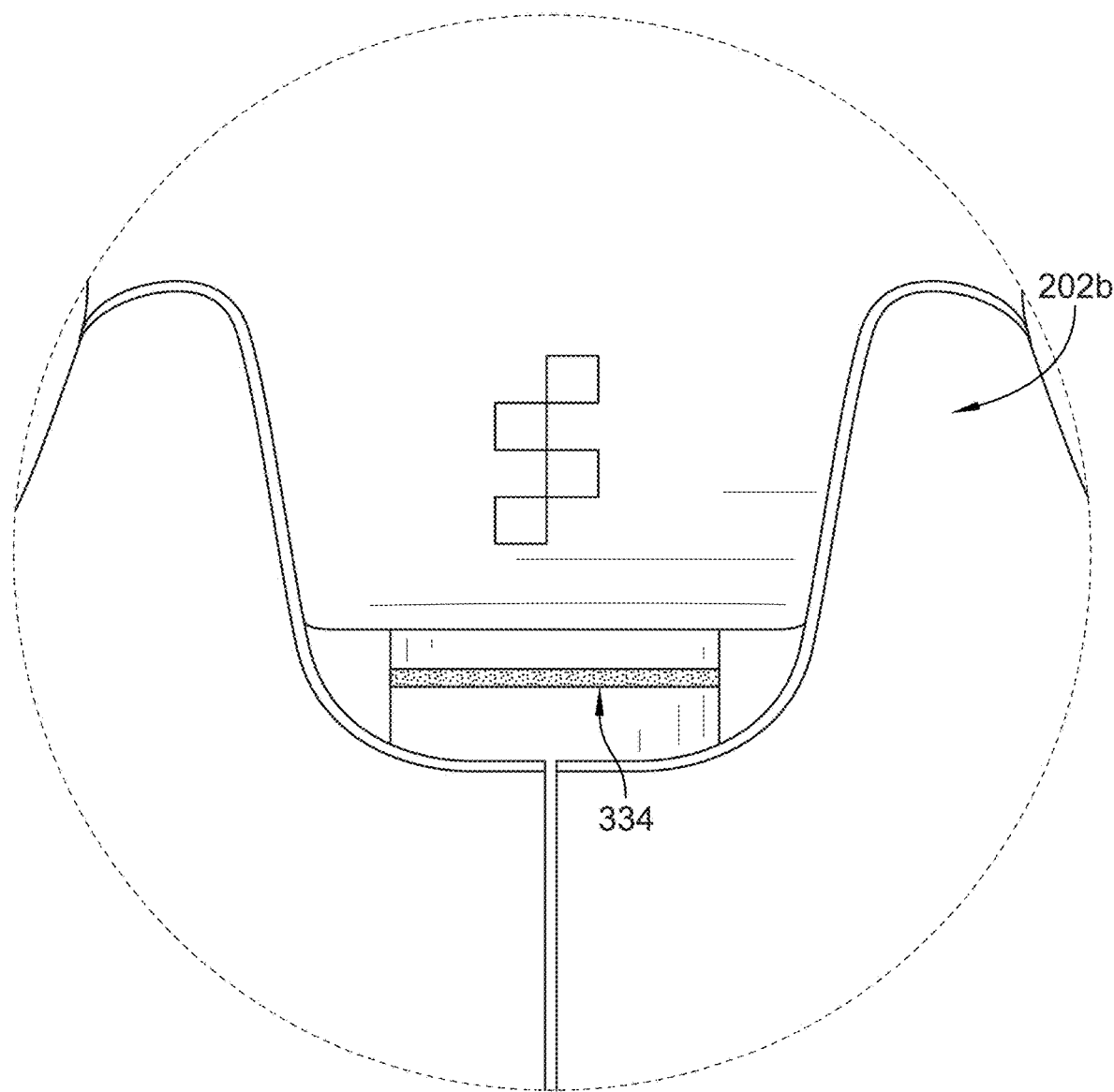
FIG. 64 is an enlarged view of a portion of the head and neck region of the humanoid robot of FIG. 6, wherein said neck includes at least one light emitter.

The thigh illumination assembly includes at least one, and preferably a plurality of, light emitters 332 are located along a front surface of each thigh 404a, 404b generally corresponding to a quadricep region of the robot 100 as shown in FIGS. 63B and 63C. The thigh light emitters 332 are illustratively embodied as elongated light strips; however, the light emitters 332 can have any suitable shape or structure. The thigh light emitters 332 can be operated in the same way as the light emitting assembly 264 described above. The thigh light emitters 332 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

3. Neck Illumination Assembly

The neck illumination assembly includes at least one, and preferably a plurality of, light emitters 334 is located along a rear surface of the neck portion 202b at the base of the head portion 202a as shown in FIG. 63A. The neck light emitters 334 is illustratively embodied as an elongated light strip; however the light emitters 334 can have any suitable shape or structure. The neck light emitters 334 can be operated in the same way as the light emitting assembly 264 described above. The neck light emitters 334 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

4. Shoulder Illumination Assembly

Figure 65A:
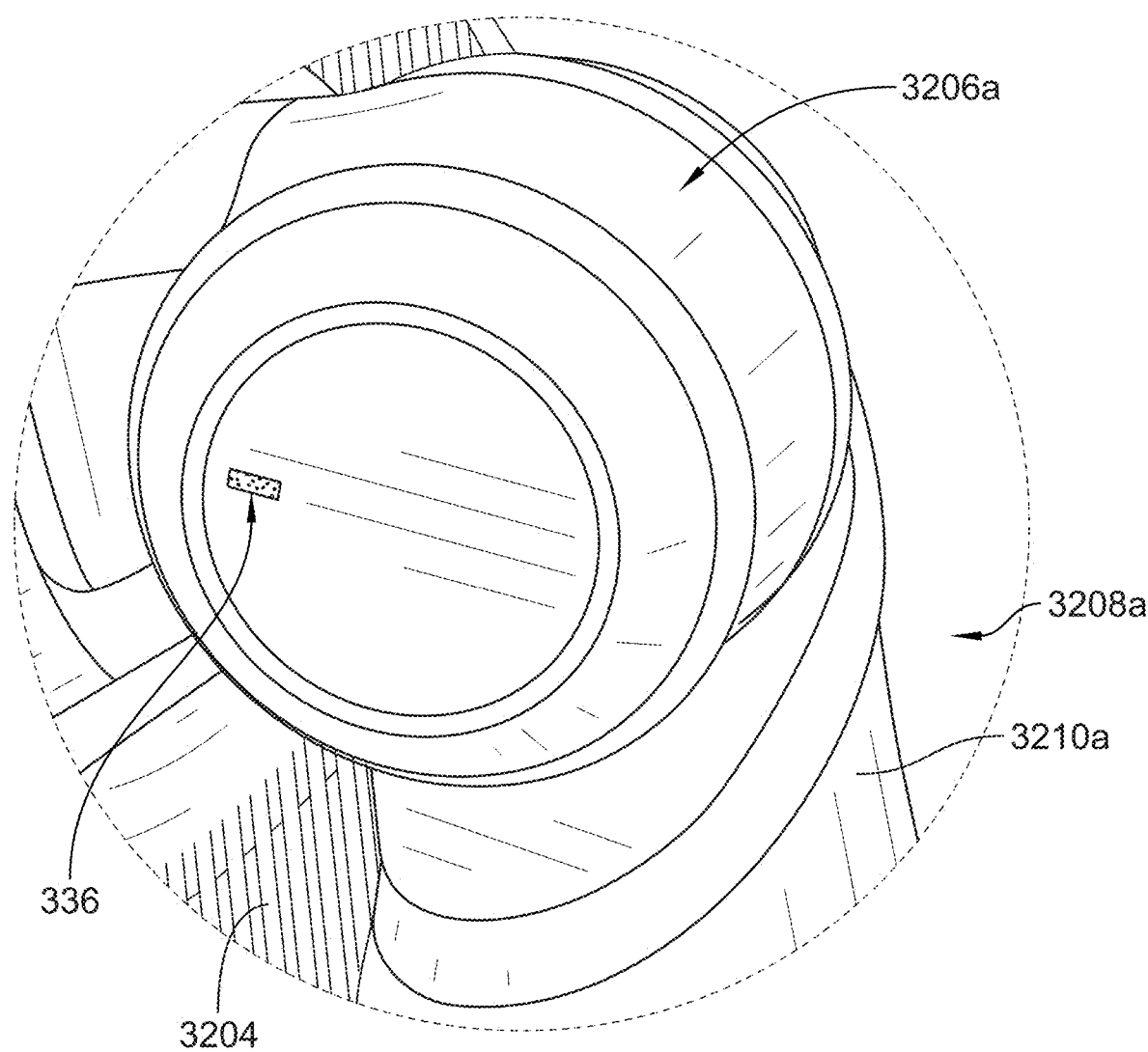
FIG. 65A is an enlarged view of a portion of a shoulder region of the humanoid robot of FIG. 32, wherein said shoulder region includes at least one light emitter.

The shoulder illumination assembly includes at least one, and preferably a plurality of, light emitters 336 are located along a front surface of each shoulder 206a, 206b as shown in FIG. 65A. The shoulder light emitters 336 are illustratively embodied as elongated light strips; however, the lights 336 can have any suitable shape or structure. The shoulder light emitters 336 can be operated in the same way as the light emitting assembly 264 described above. The shoulder light emitters 336 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

5. Hip Illumination Assembly

Figure 65B:
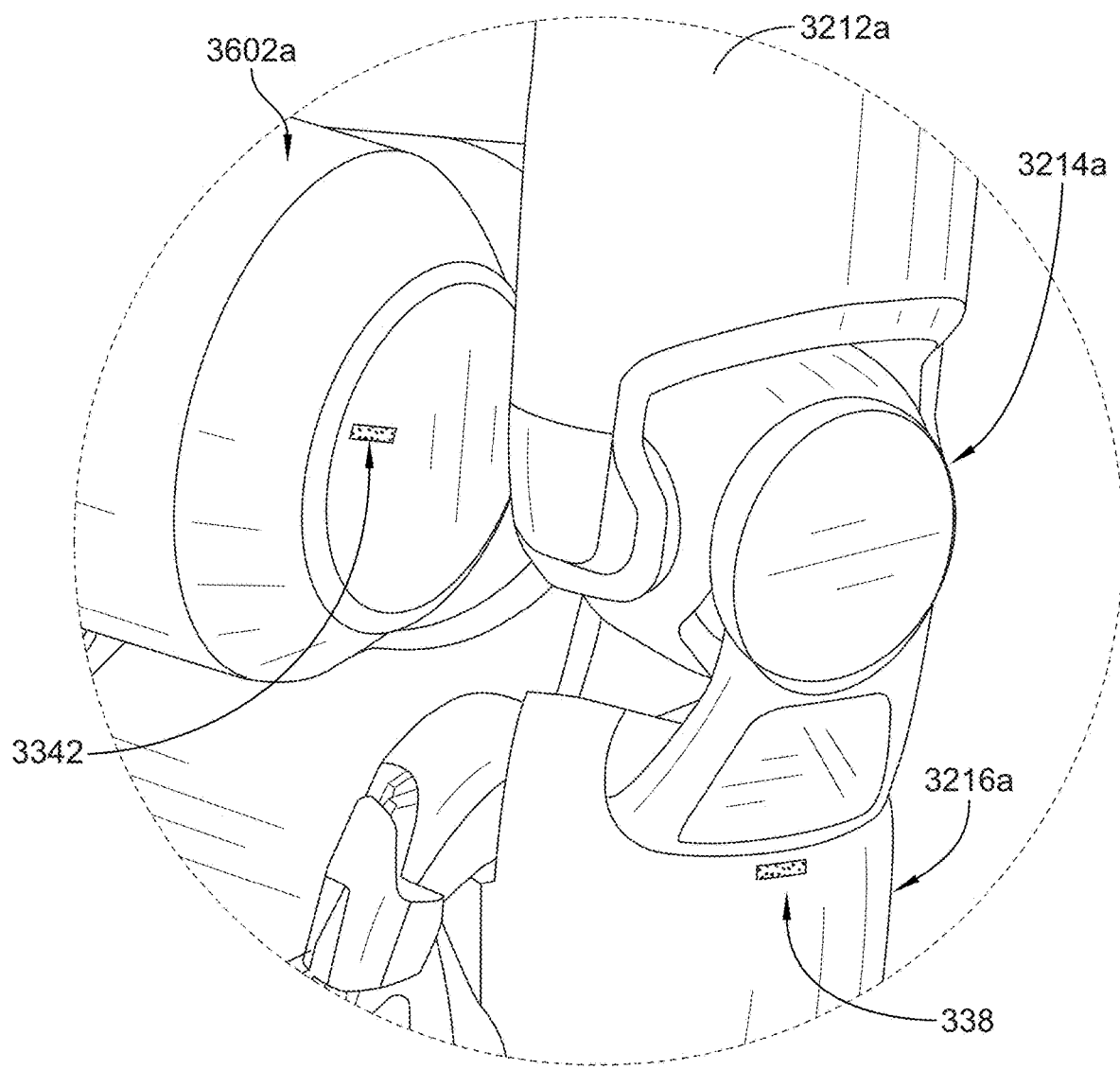
FIG. 65B is an enlarged view of a portion of a wrist region of the humanoid robot of FIG. 32, wherein said wrist region includes at least one light emitter.

The hip illumination assembly includes at least one, and preferably a plurality of, light emitters 342 are located along a surface of each hip 602a, 602b as shown in FIG. 65B. The hip light emitters 342 are illustratively embodied as elongated light strips; however, the lights 342 can have any suitable shape or structure. The hip light emitters 342 can be operated in the same way as the light emitting assembly 264 described above. The hip light emitters 342 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

6. Hand Illumination Assembly

The hand illumination assembly includes at least one, and preferably a plurality of, light emitters 338 are located along a surface of each hand 216a, 216b as shown in FIG. 65B. The hand light emitters 338 are illustratively embodied as elongated light strips, however the lights 338 can have any suitable shape or structure. The hand light emitters 338 can be operated in the same way as the light emitting assembly 264 described above. The hand light emitters 338 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

7. Knee Illumination Assembly

Figure 65C:
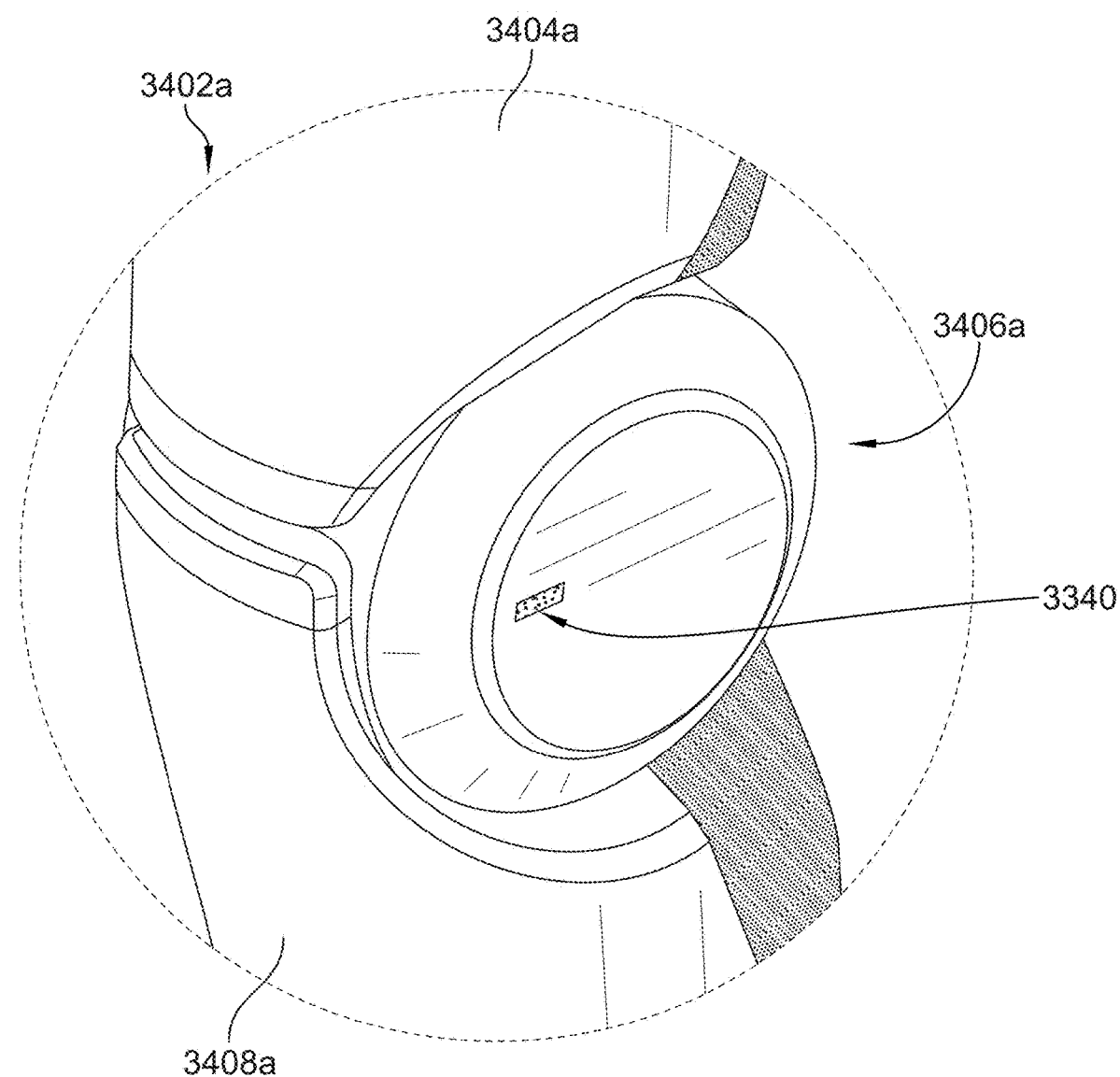
FIG. 65C is an enlarged view of a portion of a knee region of the humanoid robot of FIG. 32, wherein said knee region includes at least one light emitter.

The knee illumination assembly includes at least one, and preferably a plurality of, light emitters 340 are located along a surface of each knee 406a, 406b as shown in FIG. 65C. The knee light emitters 340 are illustratively embodied as elongated light strips, however the lights 340 can have any suitable shape or structure. The knee light emitters 340 can be operated in the same way as the light emitting assembly 264 described above. The knee light emitters 340 can include one or more of the following: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or light feature.

G. Other Electronic Components

As described above, the electronic components of the head may also include a directional microphone, speaker, antennas, light emitting assembly 264, as well as a data storage device and/or computing device comprising a processor and memory. Specifically, the directional microphone is designed to detect sounds and determine a position, which enables the robot to move its head toward the sound. In particular, one or more speakers may be configured to allow the robot to communicate with nearby humans with audible messages or responses. One or more antennas may be configured to transmit and receive data wirelessly for data transfer into and out of the robot. Specifically, the robot may include wireless communication modules (e.g., cellular, Wi-Fi, Bluetooth, WiMAX, HomeRF, Z-Wave, Zigbee, THREAD, RFID, NFC, and/or etc.) that are connected to the antennas. For example, the robot head portion 202a may include a 5G cellular radio coupled to one of the antennas and a Wi-Fi radio (e.g., 5 GHz or 2.4 GHZ) coupled to the other antenna.

The data storage device may include a solid-state hard drive designed to capture all of the data generated by the sensors or a subset of the data generated by the sensors. The subset of the data may be time-based (e.g., the pre-defined time surrounding the start up/shut down of the robot), sensor-based (e.g., only encoder data), movement/configuration-based (e.g., when performing a specific task that requires the robot to put its body in a particular position/configuration), environment-based (e.g., when the robot recognizes a specific item or issue in its environment), or configuration based, error based, or a combination thereof. In addition, the data storage device may be used to store data to train other robots or store data for diagnostic purposes or any other purpose. Finally, the indicator lights may be designed to work with the display 300 to indicate a state of the robot 100 (e.g., working, error, moving, etc.) to a nearby human or may illuminate for other reasons.

It is to be understood that the disclosure is not limited to the exact details of construction, operation, exact materials or embodiments shown and described, as obvious modifications and equivalents will be apparent to one skilled in the art. While the specific embodiments have been illustrated and described, numerous modifications come to mind without significantly departing from the spirit of the disclosure, and the scope of protection is only limited by the scope of the accompanying Claims. It should also be understood that substantially utilized herein means a deviation that is less than 15% and preferably less than 5%. It should also be understood that other configuration or arrangements of the above described components is contemplated by this application.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

It is to be understood that the disclosure is not limited to the exact details of construction, operation, exact materials, or embodiments shown and described, as obvious modifications and equivalents will be apparent to one skilled in the art; for example, the photographs may be digital photographs or paper based photographs that may then be scanned into digital form. While the specific embodiments have been illustrated and described, numerous modifications come to mind without significantly departing from the spirit of the disclosure.

As used herein, the terms "component," "system" and the like in relation to discussions about computer-related processes and systems are intended to refer to a computer-related entity, either hardware, a combination of hardware and software, software, or software in execution. For example, a component may be, but is not limited to being, a process running on a processor, a processor, an object, an instance, an executable, a thread of execution, a program, a computer, or both. By way of illustration, both an application running on a computer and the computer can be a component. One or more components may reside within a process, a thread of execution, or both, and a component may be localized on one computer and/or distributed between two or more computers.

Furthermore, all or portions of the computer-related processes and systems can be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Where the above examples, embodiments and implementations reference examples, it should be understood by those of ordinary skill in the art that other helmet and manufacturing devices and examples could be intermixed or substituted with those provided. In places where the description above refers to particular embodiments of helmets and customization methods, it should be readily apparent that a number of modifications may be made without departing from the spirit thereof and that these embodiments and implementations may be applied to other to helmet customization technologies as well. Accordingly, the disclosed subject matter is intended to embrace all such alterations, modifications and variations that fall within the spirit and scope of the disclosure and the knowledge of one of ordinary skill in the art.

The invention claimed is:

1. A humanoid robot comprising:
    an upper region including: (i) a torso, (ii) a pair of arm assemblies coupled to the torso, and (iii) a head and neck assembly coupled to the torso and having a neck portion and a head portion coupled to the neck portion, and wherein the head portion includes:
        a frontal shell having a rear edge;
        a rear shell having a frontal edge;
        an illumination assembly configured to illuminate an extent of region, and wherein the extent of said region: (i) extends between a rear edge of the frontal shell and an extent of the frontal edge of the rear shell, (ii) is positioned adjacent to an extent of the rear edge of the frontal shell, and (iii) is positioned adjacent to the extent of the frontal edge of the rear shell;
    a central region coupled to the upper region; and,
    a lower region coupled to the central region and spaced apart from the upper region, the lower region including a pair of legs.

2. The humanoid robot of claim 1, wherein the rear shell is coupled to the frontal shell to define a head volume between said frontal shell and said rear shell, and
    wherein the head portion further includes an electronics assembly with a curved display located in the head volume between the frontal shell and the rear shell.

3. The humanoid robot of claim 2, wherein the curved display is configured to display icons that indicate an operating status of the humanoid robot.

4. The humanoid robot of claim 2, wherein the curved display is not configured to display human-like facial features.

5. The humanoid robot of claim 2, wherein the frontal shell includes:
    a first arc length at a first location below the display,
    a second arc length at a second location aligned with a portion of the display, and wherein said second arc length is greater than the first arc length, and a third arc length at a third location above the display, and wherein said third arc length is greater than both the first arc length and the second arc length.

6. The humanoid robot of claim 1, wherein a gap is formed in the region that is positioned between the frontal shell and the rear shell, and wherein the light emitted from the illumination assembly is visible in said gap.

7. The humanoid robot of claim 6, wherein an extent of the head portion is recessed relative to both: (i) a first location on the outer surface of the frontal shell that is positioned adjacent to the gap, and (ii) a second location on the outer surface of the rear shell that is positioned adjacent to said gap.

8. The humanoid robot of claim 1, wherein a rear edge of the frontal shell is spaced a distance from and does not abut a frontal edge of the rear shell at a location.

9. The humanoid robot of claim 8, wherein the light emitted from the illumination assembly obscures said extent of the head portion.

10. The humanoid robot of claim 1, wherein the head portion includes a chin region, a facial region, and a parietal region, and wherein: (i) the rear shell extends into a frontal extent of the chin region, and (ii) the frontal shell extends upward from an extent of the rear shell that is positioned in the chin region, over a majority of the facial region, and beyond a frontal edge of the parietal region.

11. The humanoid robot of claim 1, wherein a portion of the frontal shell includes a tinted coating.

12. The humanoid robot of claim 1, wherein the neck portion with a neck shell that includes a deformable material.

13. The humanoid robot of claim 1, wherein the frontal shell includes an outer surface having an orbital region and a nasal region, wherein said orbital region of the frontal shield is not recessed in comparison to the nasal region of the frontal shield.

14. A humanoid robot comprising:
  an upper region including: (i) a torso, (ii) a pair of arm assemblies coupled to the torso, and (iii) a head and neck assembly coupled to the torso and having a neck portion and a head portion coupled to the neck portion, and wherein the head portion includes:
    a frontal shell having a curvilinear periphery, and an outer surface having a nasal region and an orbital region that is not recessed in comparison to said nasal region;
    an illumination assembly configured to emit light in a location that is adjacent to the periphery of the frontal shell;
  a central region coupled to the upper region, and,
  a lower region coupled to the central region and spaced apart from the upper region, the lower region including a pair of legs.

15. The humanoid robot of claim 14, wherein the head portion includes a centroid and a first substantially horizontal plane that extends through said centroid, and wherein the frontal shell includes:
  a first width defined between opposed edges of the frontal shell at a first location below said first plane,
  a second width defined between opposed edges of the frontal shell at a second location that is colinear with said first plane, and wherein said second width is greater than the first width, and
  a third width defined between opposed edges of the frontal shell at a third location above said first plane, and wherein said third width is greater than the first width and less than the second width.

16. The humanoid robot of claim 14, wherein the head portion further includes a rear shell coupled to the frontal shell to define a head volume between said frontal shell and said rear shell, and wherein the frontal shell includes at least one camera positioned in the head volume.

17. The humanoid robot of claim 14, wherein the head portion further includes a rear shell which cooperates with the frontal shell to define a head volume between said frontal shell and said rear shell, wherein the head portion further includes a light emitter housing positioned adjacent to the rear shell and configured to receive an extent of the illumination assembly.

18. The humanoid robot of claim 14, wherein the head portion further includes: (i) an electronics assembly having a fan, and (ii) a rear shell having an opening formed therein, and wherein the fan is configured to draw air into the head portion through the opening formed in the rear shell to cool said electronics assembly.

19. The humanoid robot of claim 14, wherein the frontal shell does not extend rearward of an auricular region of the head portion.

20. The humanoid robot of claim 1, wherein the frontal shell has an outer periphery that includes a curvilinear extent when viewed from a forward orientation.

21. The humanoid robot of claim 14, wherein the head portion further comprises: (i) a rear shell coupled to the frontal shell to define a head volume between said frontal shell and said rear shell, and, (ii) an electronics assembly with a display located in the head volume.

22. The humanoid robot of claim 21, wherein the display is curved and configured to display icons that indicate an operating status of the humanoid robot.

23. The humanoid robot of claim 21, wherein the display is not configured to display human-like facial features.

* * * * *